US011284694B1

(12) United States Patent
Chan et al.

(10) Patent No.: US 11,284,694 B1
(45) Date of Patent: Mar. 29, 2022

(54) CASE FOR PORTABLE ELECTRONIC COMPUTING DEVICE

(71) Applicant: Pioneer Square Brands, Inc., Seattle, WA (US)

(72) Inventors: Jaimie Emerald Chan, Renton, WA (US); Michael Cooper Ferren, Camas, WA (US); Brian Lewis Piper, Seattle, WA (US)

(73) Assignee: PIONEER SQUARE BRANDS, INC., McLean, VA (US)

( * ) Notice: Subject to any disclaimer, the term of this patent is extended or adjusted under 35 U.S.C. 154(b) by 0 days.

(21) Appl. No.: 17/393,748

(22) Filed: Aug. 4, 2021

(51) Int. Cl.
  *A45C 13/30* (2006.01)
  *H04B 1/3888* (2015.01)
  *A45C 11/00* (2006.01)
  *A45F 5/10* (2006.01)

(52) U.S. Cl.
  CPC .............. *A45C 13/30* (2013.01); *A45C 11/00* (2013.01); *A45F 5/10* (2013.01); *H04B 1/3888* (2013.01); *A45C 2011/003* (2013.01); *A45C 2013/303* (2013.01); *A45F 2005/1013* (2013.01)

(58) Field of Classification Search
  CPC ... A45C 13/30; A45C 11/00; A45C 2011/003; A45C 2013/303; H04B 1/3888; A45F 2005/1013; A45F 5/10
  USPC .................................................... 455/575.6
  See application file for complete search history.

(56) References Cited

U.S. PATENT DOCUMENTS

| 8,720,752 | B2 * | 5/2014 | Huang | B25G 3/36 224/218 |
| 9,372,507 | B2 * | 6/2016 | Dekock | G06F 1/1626 |
| 9,407,743 | B1 * | 8/2016 | Hirshberg | F16M 13/022 |
| 10,201,221 | B1 * | 2/2019 | Chang | A45F 5/10 |
| 10,447,831 | B2 * | 10/2019 | Roncetti | H04M 1/04 |
| 10,561,228 | B2 * | 2/2020 | Britt | G06F 1/1628 |
| 10,610,004 | B1 * | 4/2020 | Yeo | A45F 5/10 |
| 2006/0274493 | A1 * | 12/2006 | Richardson | H05K 5/068 361/679.4 |
| 2011/0309117 | A1 * | 12/2011 | Roberts | H04M 1/04 224/217 |
| 2012/0024917 | A1 * | 2/2012 | Case | A45F 5/021 224/259 |
| 2012/0063066 | A1 * | 3/2012 | Floit | A45F 3/14 361/679.01 |
| 2014/0001081 | A1 * | 1/2014 | Rosen | A45C 11/00 206/588 |

(Continued)

*Primary Examiner* — Peter N Helvey
(74) *Attorney, Agent, or Firm* — Grandview Law

(57) ABSTRACT

Systems and methods are involved for a tablet computing assembly, the system includes (I) a tablet case assembly including a case rear side and a first front surface portion that receives the tablet computing assembly; (II) a track pin adjustably coupled to the case rear side; and (III) a hand strap coupled to the at least one track pin, (A) the hand strap being adjustably coupled to the case rear side via the track pin, (B) the hand strap being adjustably coupled to the case rear side to allow for at least one positional adjustment of the hand strap relative to the first rear surface portion, and (C) the hand strap being removably coupled to the case rear side of the tablet case assembly without disassembly of the tablet case assembly. In addition, other aspects are described in the claims, drawings, and text forming a part of the present disclosure.

16 Claims, 54 Drawing Sheets

(56) References Cited

U.S. PATENT DOCUMENTS

| | | | | |
|---|---|---|---|---|
| 2014/0049060 | A1* | 2/2014 | Rayner | F16M 13/04 |
| | | | | 294/25 |
| 2015/0011269 | A1* | 1/2015 | Liu | H04M 1/0202 |
| | | | | 455/575.1 |
| 2015/0335138 | A1* | 11/2015 | Juarbe | H04M 1/04 |
| | | | | 224/218 |
| 2016/0028428 | A1* | 1/2016 | Sturniolo | A45C 11/00 |
| | | | | 455/575.8 |
| 2016/0345715 | A1* | 12/2016 | Lin | G06F 1/1656 |
| 2017/0244438 | A1* | 8/2017 | Tomobe | H04B 1/385 |
| 2017/0265634 | A1* | 9/2017 | Widiaman | A45C 13/10 |
| 2019/0227595 | A1* | 7/2019 | Ferren | F16M 13/04 |
| 2019/0243419 | A1* | 8/2019 | Charlesworth | H04B 1/385 |
| 2019/0350351 | A1* | 11/2019 | Mody | B29C 65/48 |

* cited by examiner

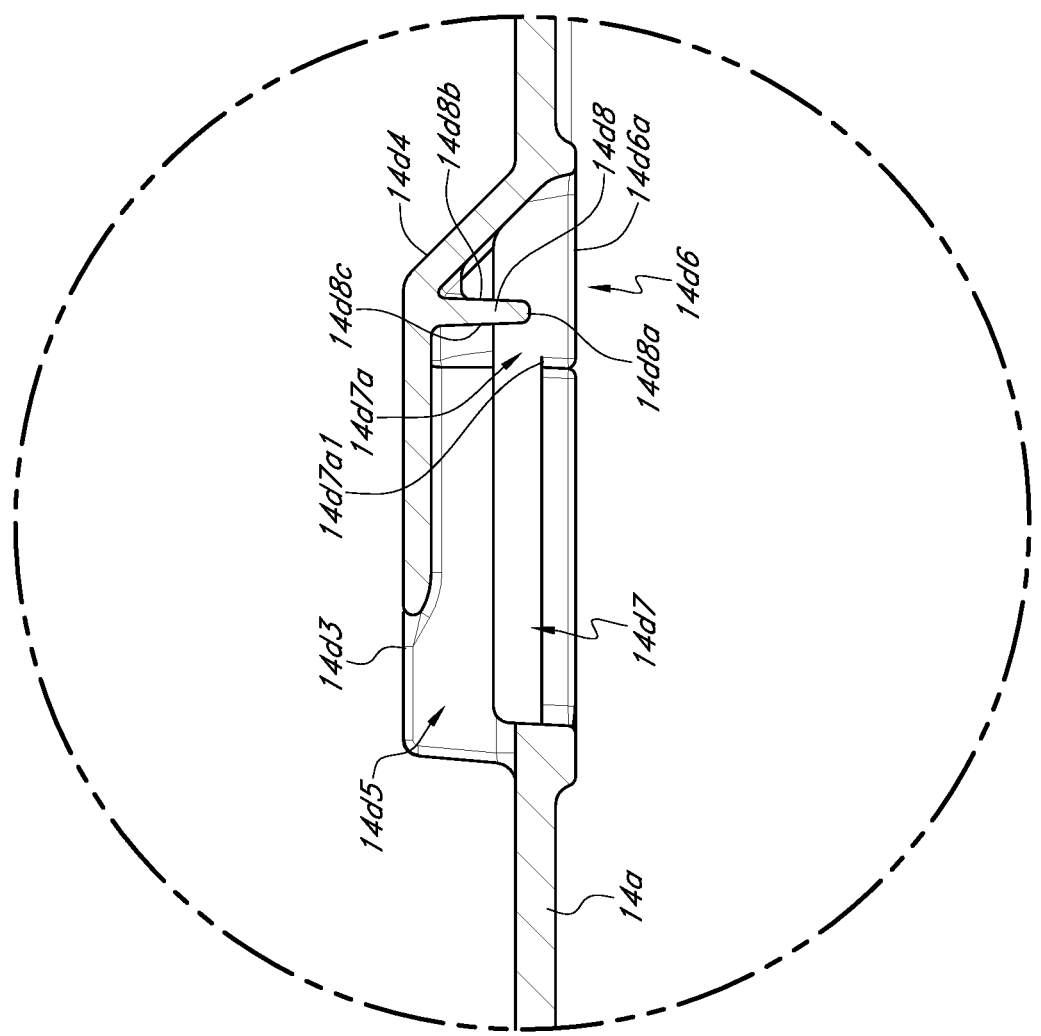

CASE FOR PORTABLE ELECTRONIC COMPUTING DEVICE

SUMMARY

In one or more aspects, a system can include a system for a tablet computing assembly including (I) a tablet case assembly including a first side wall, a second side wall, a third side wall, a fourth side wall, and a case front side, the case front side including a first front surface portion, wherein the first side wall, the second side wall, the third side wall, the fourth side wall extend perpendicularly to the first front surface portion to at least in part receive the tablet computing assembly, (A) the tablet case assembly including a case rear side, a first attachment assembly, and a second attachment assembly, the case rear side including a first rear surface portion, wherein the first attachment assembly, and the second attachment assembly extend outwardly away from the first rear surface portion; and (II) a hand strap including a first end portion, a second end portion, an exterior side, and an interior side, (A) the first end portion of the hand strap being adjustably and removably coupled to the second attachment assembly of the tablet case assembly, and (B) the first end portion of the hand strap being adjustably and removably coupled to the second attachment assembly of the tablet case assembly and the second end portion of the hand strap being adjustably and removably coupled to first attachment assembly of the tablet case assembly to allow for at least one positional adjustment of the hand strap relative to the first rear surface portion of the case rear side of the tablet case assembly, (1) at least a portion the exterior side of the hand strap facing in a first direction away from the first rear surface portion of the case rear side of the tablet case assembly, (2) at least a portion of the interior side of the hand strap facing in a second direction toward the first rear surface portion of the case rear side of the tablet case assembly, (3) the first direction being opposite in direction of the second direction, (4) the at least one positional adjustment of the hand strap relative to the first rear surface portion of the case rear side of the tablet case assembly including (a) a first positional adjustment having a first gap distance between the first rear surface portion of the case rear side of the tablet case assembly and at least a portion of the interior side of the hand strap, (b) a second positional adjustment having a second gap distance between the first rear surface portion of the case rear side of the tablet case assembly and at least a portion of the interior side of the hand strap, (c) a third positional adjustment having a third gap distance between the first rear surface portion of the case rear side of the tablet case assembly and at least a portion of the interior side of the hand strap, (d) the first gap distance being smaller than the second gap distance, and (e) the second gap distance being smaller than the third gap distance. Wherein the hand strap includes a thickness dimension along the first direction and a width dimension perpendicular to the first direction, the thickness dimension being smaller than the width dimension. Wherein the interior side of the hand strap includes a plurality of at least one ridge portion and at least one flush portion, the plurality of at least one ridge portion projecting from the at least one flush portion. Further including at least one track pin including a first end portion and second end portion wherein the first end portion of the hand strap includes at least one protrusion with at least one aperture portion to receive the at least one track pin. Wherein the second attachment assembly includes a first track groove sized and shaped to couple with the first end portion of the at least one track pin and a second track groove sized and shaped to couple with the first end portion of the at least one track pin. Wherein the first end portion of the hand strap further includes at least one protrusion and a gap, the gap being positioned between the at least one protrusion and the at least one protrusion to allow for access to a mid-portion of the at least one track pin being received by the at least one aperture portion of the at least one protrusion of the hand strap. Wherein the second attachment assembly further includes a stop tab as unflexed, (A) the stop tab as unflexed positioned to be in contact with the first end portion of the hand strap when the hand strap is in the first positional adjustment, and (B) the stop tab as unflexed positioned to be in non-contact with the first end portion of the hand strap 10 when the hand strap is in the second positional adjustment. Wherein the second attachment assembly further includes a first receiving groove and a second track groove, the first receiving groove positioned non-parallel to and in communication with the first track groove, the first receiving groove including a first receiving groove entry opening, the second receiving groove positioned non-parallel to and in communication with the second track groove, and the second receiving groove including a second receiving groove entry opening. Further including at least one track pin, the at least one track pin including a first end portion and second end portion, the first end portion of the hand strap being coupled with the least one track pin, (A) the second attachment assembly further including a stop tab as flexed with a stop-tab-as-flexed end when (1) the first end portion of the hand strap is in a first location in contact with the stop tab as unflexed, (2) the first end portion of the track pin is coupled with at least a portion of the first receiving groove of the second attachment assembly, and (3) the second end portion of the track pin is coupled with at least a portion of the second receiving groove of the second attachment assembly; and (B) the second attachment assembly further including the stop tab as unflexed with a stop-tab-as-unflexed end when (1) the first end portion of the track pin is coupled with at least a portion of the first track groove of the second attachment assembly, and (2) the second end portion of the track pin is coupled with at least a portion of the second track groove of the second attachment assembly. The second attachment assembly further including a first transition area, the first transition area including a restriction point, wherein (A) the first receiving groove is positioned in communication with the first track groove and the second receiving groove is positioned in communication with the second track groove through at least in part the first transition area, and (B) the stop-tab-as-flexed end of the stop tab as flexed being distanced from the restriction point a first distance and the stop-tab-as-unflexed end of the stop tab as unflexed being distanced from the restriction point a second distance, the first distance being greater than the second distance. Wherein the stop tab as flexed of the second attachment assembly receives a first force imparted by the first end portion of the hand strap, the first force being greater than a threshold force. Wherein the stop tab as unflexed of the second attachment assembly receives one of the following forces imparted by the first end portion of the hand strap: a second force being smaller than the threshold force and a third force being zero. Wherein (A) when (1) the first end portion of the track pin is coupled with at least a portion of the first track groove of the second attachment assembly, and (2) the second end portion of the track pin is coupled with at least a portion of the second track groove of the second attachment assembly, and (3) the stop tab as unflexed remains in an unflexed condition, (B) then (1) the first end portion of the track pin remains coupled with at least a portion of the first track groove of the second attachment assembly, and (2) the second end portion of the track pin remains coupled with at least a portion of the second track groove of the second attachment assembly. Wherein the second attachment assembly further includes a first side wall and a second side wall parallel to and spaced apart from the first side wall, the first side wall including the first receiving groove and the first track groove, and the second side wall including the second track groove and the second receiving groove. Wherein the second attachment assembly further includes a spanning member, the spanning member coupled to the first side wall and coupled to the second side wall. Wherein the stop tab as unflexed is coupled to the spanning member and the stop tab as flexed is coupled to the spanning member. Wherein the first end portion of the hand strap being adjustably and removably coupled to the second attachment assembly of the tablet case assembly and the second end portion of the hand strap being adjustably and removably coupled to first attachment assembly of the tablet case assembly without disassembly of any portion of the tablet case assembly from any other portion of the tablet case assembly. Wherein the hand strap includes a first material and the tablet case assembly includes a second material, the first material including at least one of the following: a thermoplastic elastomer material, a silicone material, and a thermoplastic polyurethane and the second material including at least plastic material of a hardness greater than the first material.

In one or more aspects a system can include a system for a tablet computing assembly, the system including (I) a tablet case assembly including a first front surface portion, the first front surface portion configured to at least in part receive the tablet computing assembly to be positioned in a parallel orientation with respect to a largest physical dimension of the tablet computing assembly, (A) the tablet case assembly including a case rear side, the case rear side including a first rear surface portion oriented in parallel with the first front surface portion; and (II) a hand strap including a first end portion, (A) wherein the first end portion of the hand strap being adjustably coupled to the first rear surface portion of the case rear side of the tablet case assembly to allow for at least one positional adjustment of the hand strap relative to the first rear surface portion of the case rear side of the tablet case assembly, and (B) the first end portion of the hand strap being removably coupled to the first rear surface portion of the case rear side of the tablet case assembly.

In one or more aspects a system can include a system for a tablet computing assembly, the system including (I) a tablet case assembly including a case rear side and a first front surface portion, the first front surface portion to at least in part receive the tablet computing assembly; (II) at least one track pin adjustably coupled to the case rear side of the tablet case assembly; and (III) a hand strap coupled to the at least one track pin, (A) the hand strap being adjustably coupled to the case rear side of the tablet case assembly via the at least one track pin being adjustably coupled to the case rear side of the tablet case assembly, (B) the hand strap being adjustably coupled to the case rear side of the tablet case assembly to allow for at least one positional adjustment of the hand strap relative to the first rear surface portion of the case rear side of the tablet case assembly, and (C) the hand strap being removably coupled to the case rear side of the tablet case assembly without requirement of disassembly of any portions of the tablet case assembly.

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of a case for portable electronic computing device systems, articles of manufacture, compositions of matter for same that may provide context, for instance, in introducing one or more processes and/or devices described herein.

FIG. 6E is an enlarged side elevational cross-sectional view of a dashed-circle portion of the tablet case assembly of FIG. 6D labeled "6E" shown in FIG. 6D.

DETAILED DESCRIPTION

Figure 1:
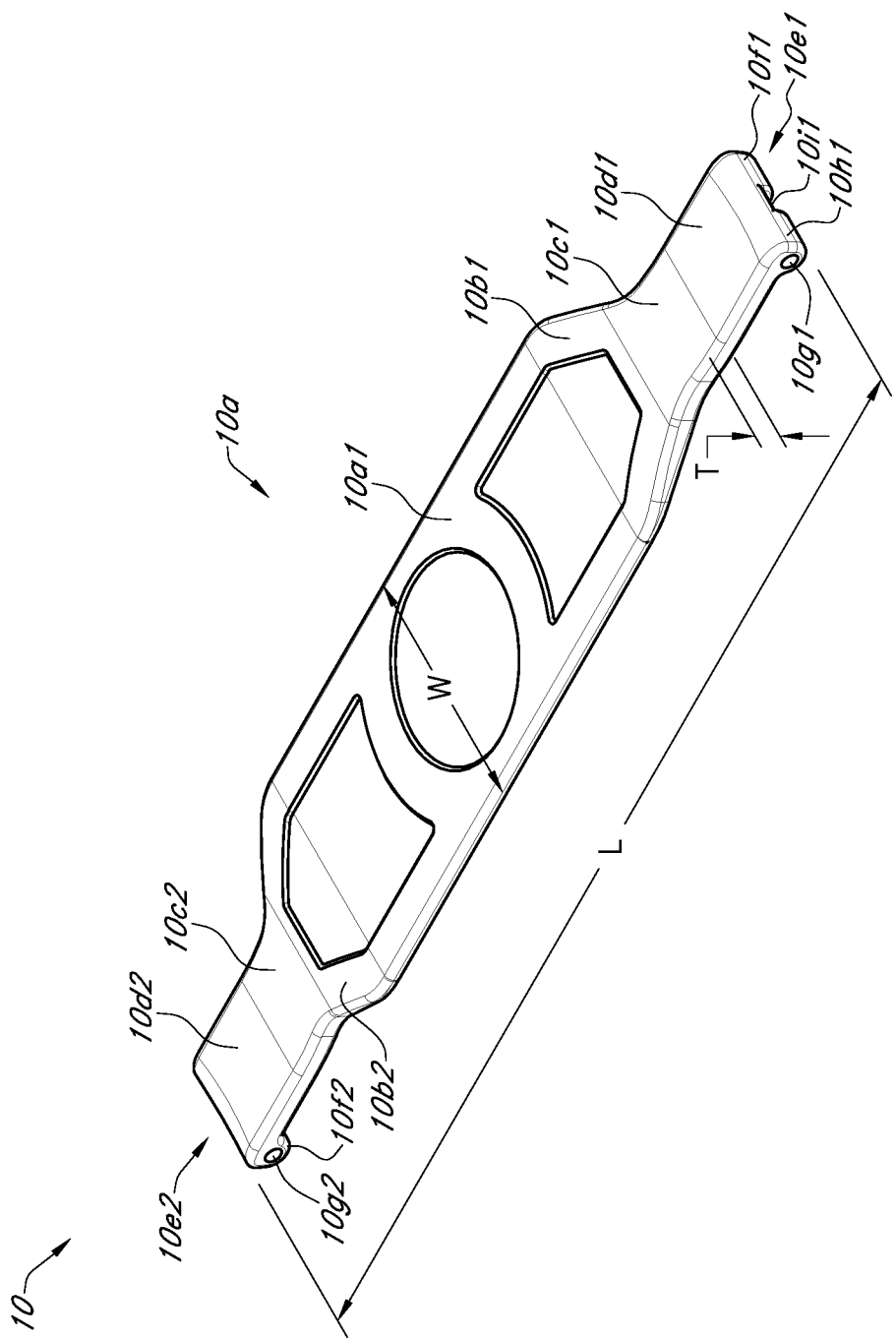
FIG. 1 is an anterior perspective view of a hand strap for a tablet case assembly for a portable electronic computing device.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Figure 31:
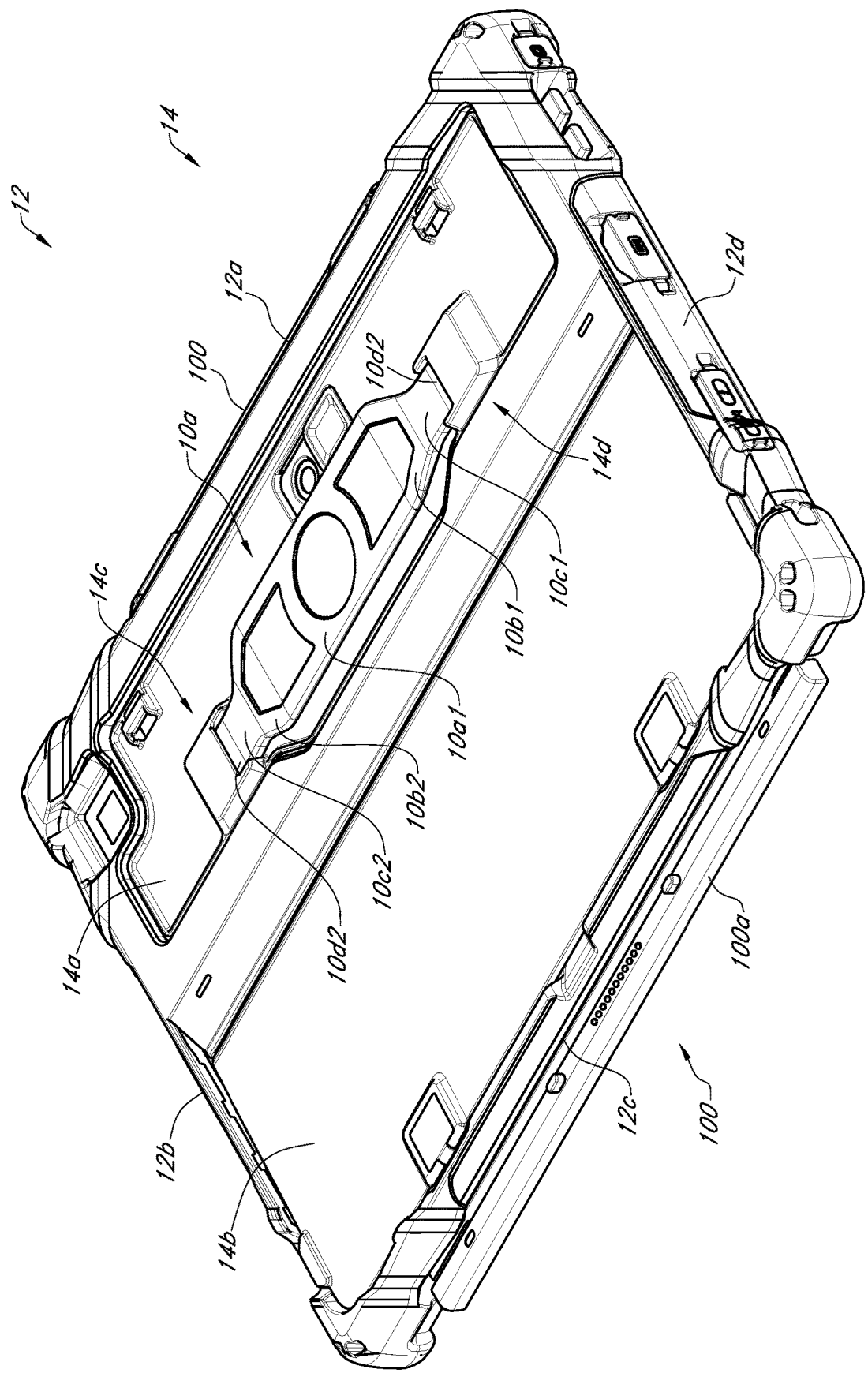
FIG. 31 is a posterior perspective view of the tablet case assembly of FIG. 4 depicted as containing tablet computing assembly along with hand strap of FIG. 1 engaged with the track pin of FIG. 9 with the hand strap depicted as coupled in first positional adjustment with the tablet case assembly.

Turning to FIG. 1, depicted therein is an anterior perspective view of hand strap 10 for tablet case assembly 12 for portable electronic computing device 100 (shown in FIG. 31). For implementations, hand strap 10 is shown to include width dimension W, thickness dimension T, length dimension L, exterior side 10a, center portion 10a1, first proximate taper portion 10b1, second proximate taper portion 10b2, first distal taper portion 10c1, second distal taper portion 10c2, first narrow portion 10d1, second narrow portion 10d2, first end portion 10e1, second end portion 10e2, protrusion 10f1, protrusion 10f2, aperture portion 10g1, aperture portion 10g2, protrusion 10h1, and gap 10i1.

Figure 2:
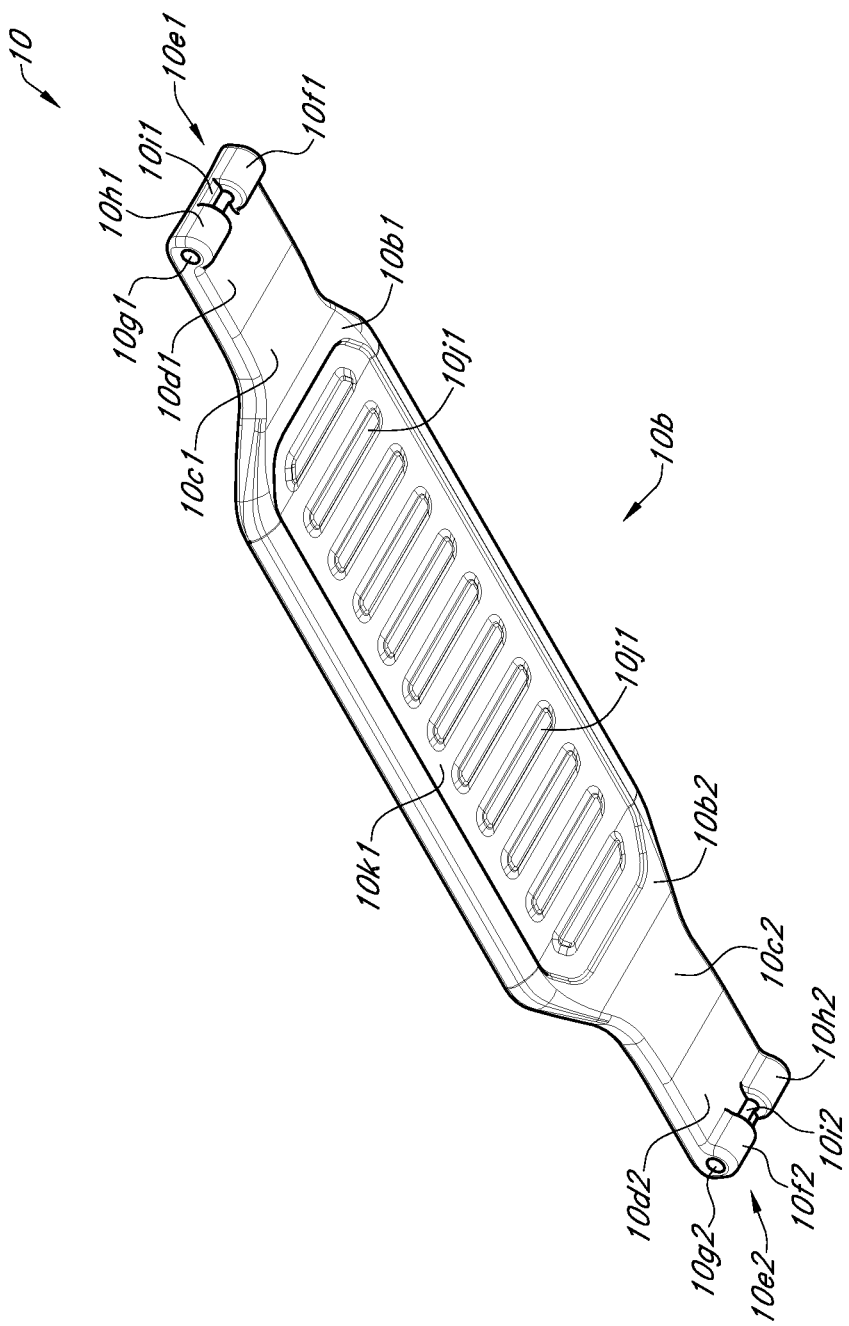
FIG. 2 is a posterior perspective view of the hand strap of FIG. 1 for a tablet case assembly for a portable electronic computing device.

Turning to FIG. 2, depicted therein is posterior perspective view of hand strap 10 of FIG. 1 for tablet case assembly 12 for portable electronic computing device 100. For implementations, hand strap 10 is shown to include interior side 10b, protrusion 10h2, gap 10i2, ridge portion 10j1, and flush portion 10k1.

Figure 3:
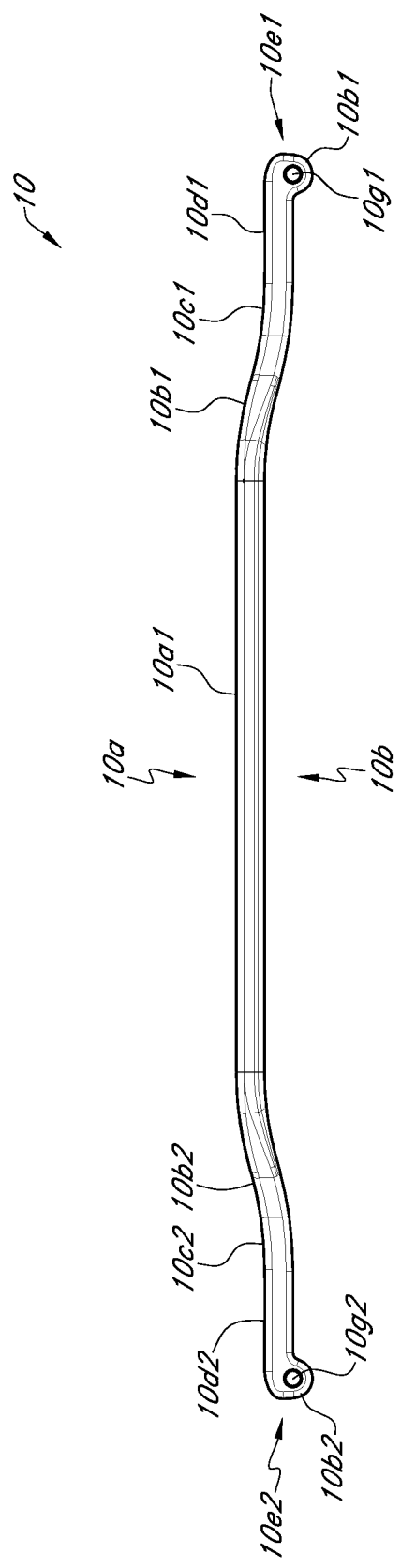
FIG. 3 is a side elevational view of a hand strap of FIG. 1 for a tablet case assembly for a portable electronic computing device.

Turning to FIG. 3, depicted therein is side elevational view of hand strap 10 of FIG. 1 for tablet case assembly 12 for portable electronic computing device 100.

Figure 4:
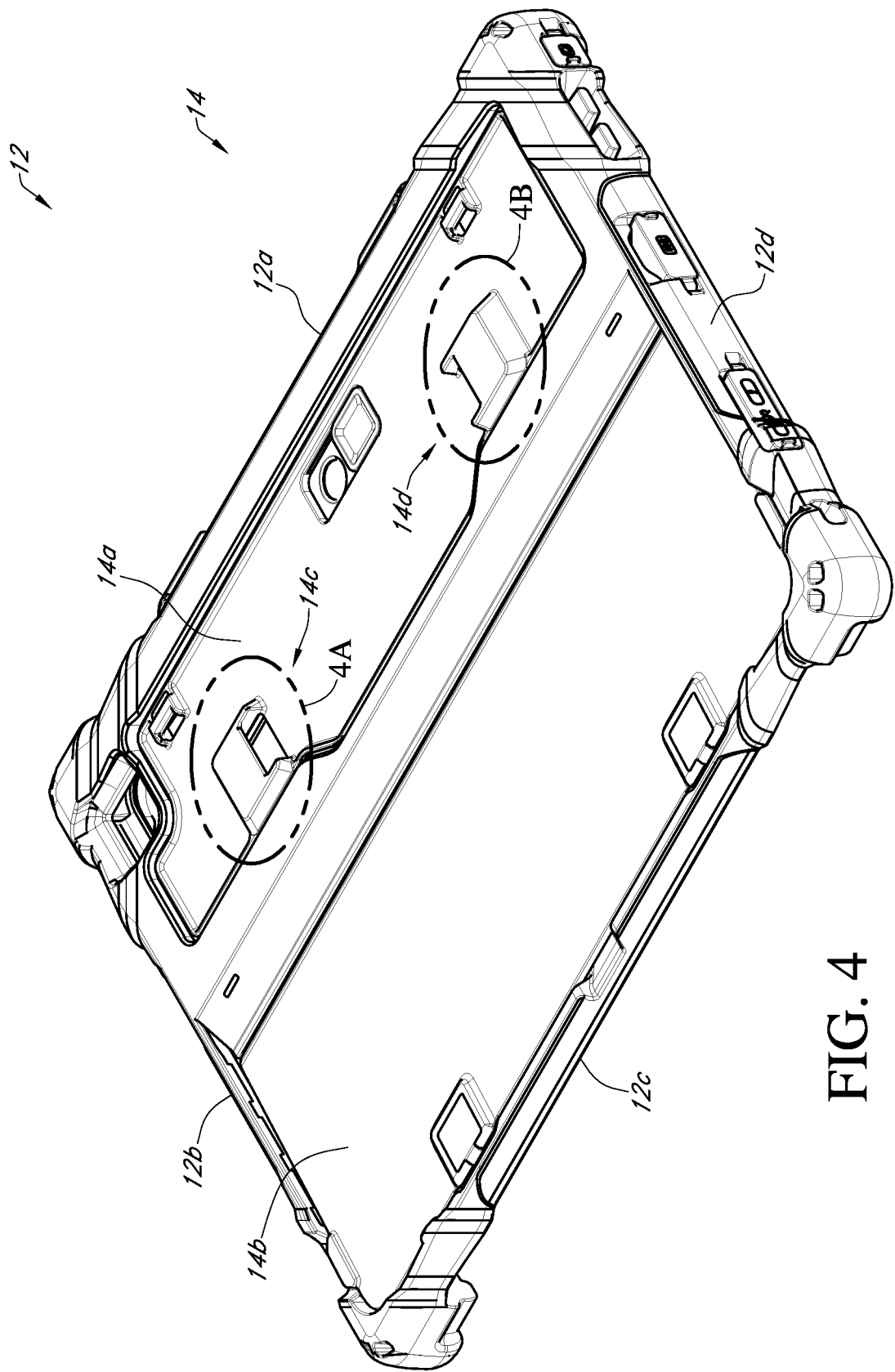
FIG. 4 is a posterior perspective view of a tablet case assembly for a portable electronic computing device fashioned to receive the hand strap of FIG. 1.

Turning to FIG. 4, depicted therein is posterior perspective view of tablet case assembly 12 for portable electronic computing device 100 fashioned to receive hand strap 10 of FIG. 1. For implementations, tablet case assembly 12 is shown to include first side wall 12a, second side wall 12b, third side wall 12c, fourth side wall 12d. For implementations, tablet case assembly 12 is shown to include case rear side 14. For implementations, case rear side 14 is shown to include first rear surface portion 14a, second rear surface portion 14b, first attachment assembly 14c, and second attachment assembly 14d. The discussion below applies interchangeably between first attachment assembly 14c, and second attachment assembly 14d even though second attachment assembly 14d is at times emphasized more.

Figure 4A:
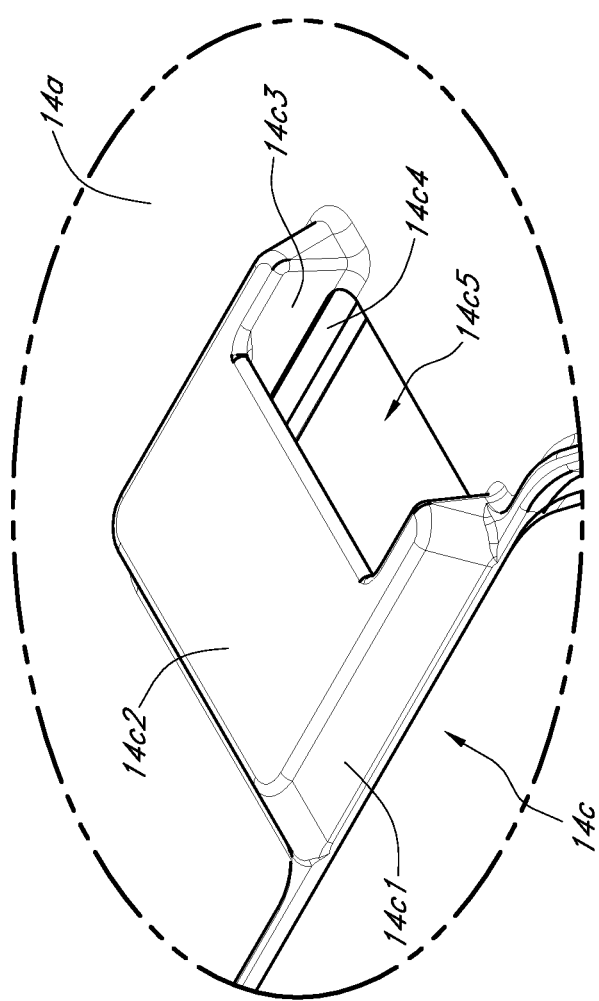
FIG. 4A is an enlarged perspective view of a dashed-circle portion of the tablet case assembly of FIG. 4 labeled "4A" shown in FIG. 4.

Turning to FIG. 4A, depicted therein is an enlarged perspective view of dashed-circle portion of tablet case assembly 12 of FIG. 4 labeled "4A" shown in FIG. 4. For implementations, case rear side 14 is shown to include first side wall 14c1, spanning member 14c2, second side wall 14c3, first track groove 14c4, and front opening 14c5.

Figure 4B:
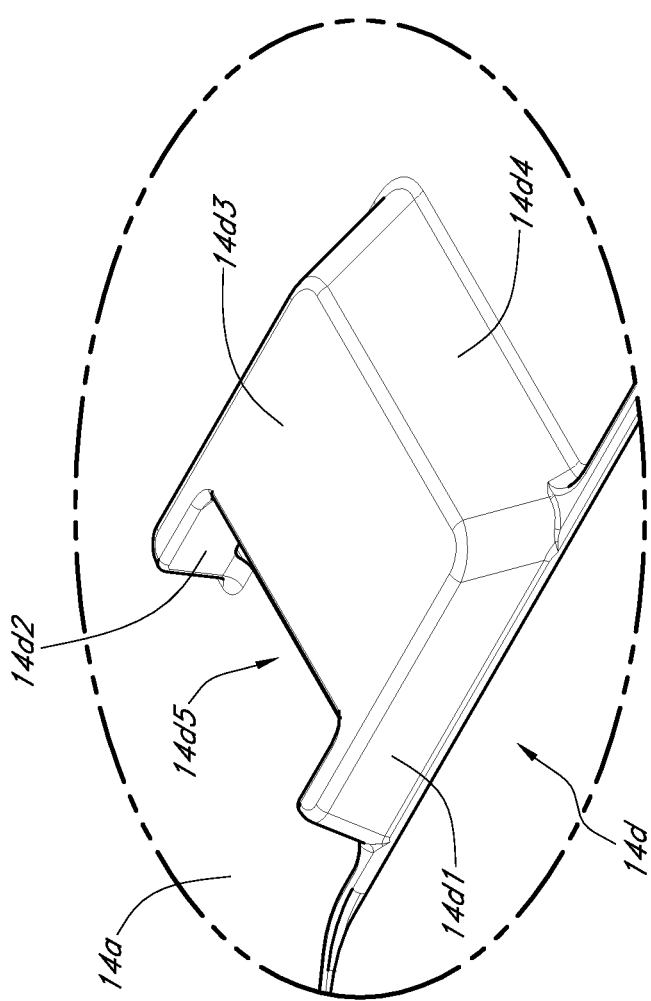
FIG. 4B is an enlarged perspective view of a dashed-circle portion of the tablet case assembly of FIG. 4 labeled "4B" shown in FIG. 4.

Turning to FIG. 4B, depicted therein is an enlarged perspective view of dashed-circle portion of tablet case assembly 12 of FIG. 4 labeled "4B" shown in FIG. 4. For implementations, case rear side 14 is shown to include first side wall 14d1, second side wall 14d2, spanning member 14d3, rear wall 14d4, and front opening 14d5.

Figure 5:
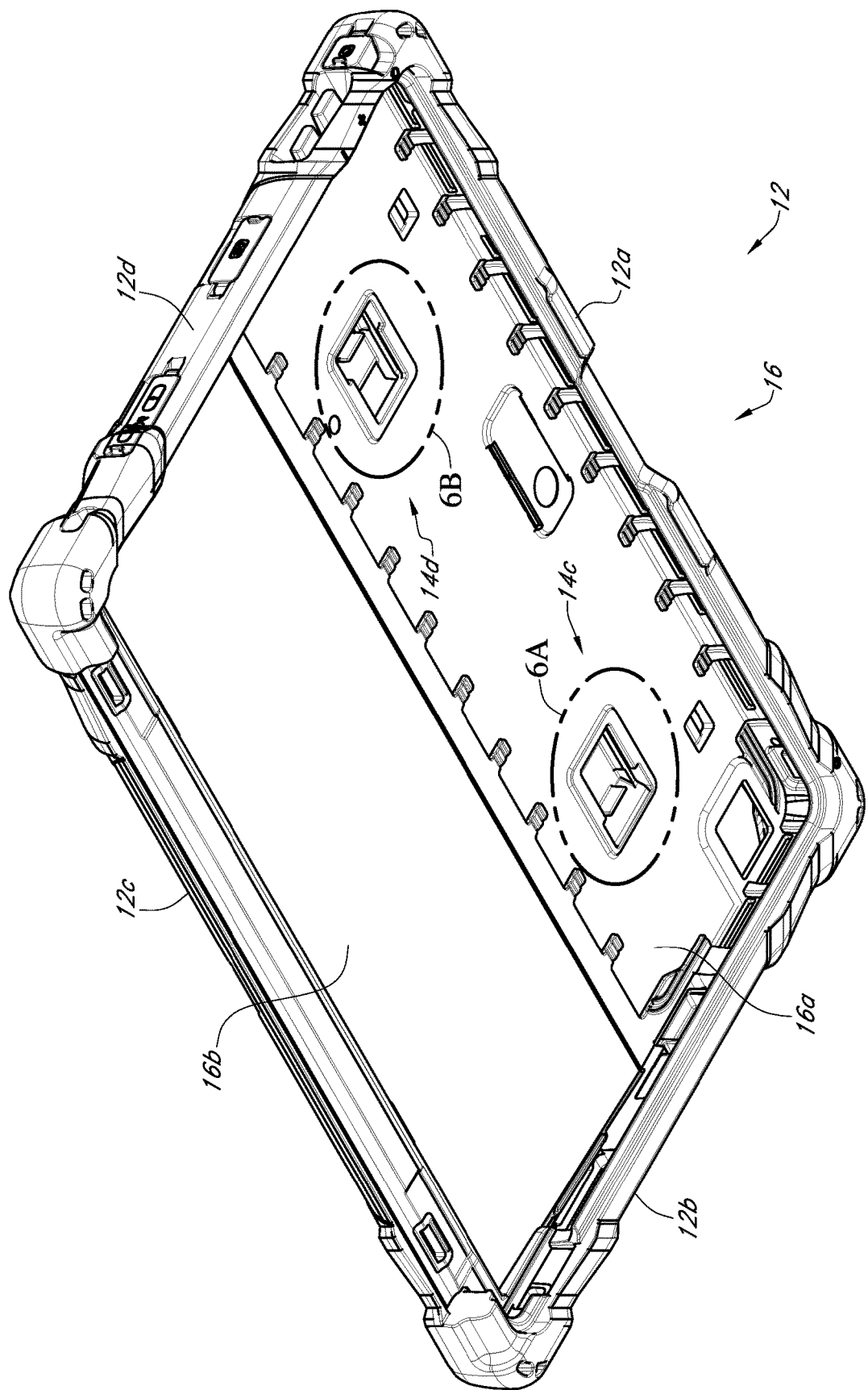
FIG. 5 is an anterior perspective view of the tablet case assembly of FIG. 4.

Turning to FIG. 5, depicted therein is an anterior perspective view of tablet case assembly 12 of FIG. 4. For implementations, tablet case assembly 12 is also shown to include case front side 16. For implementations, case front side 16 is shown to include first front surface portion 16a, and second front surface portion 16b.

Figure 6A:
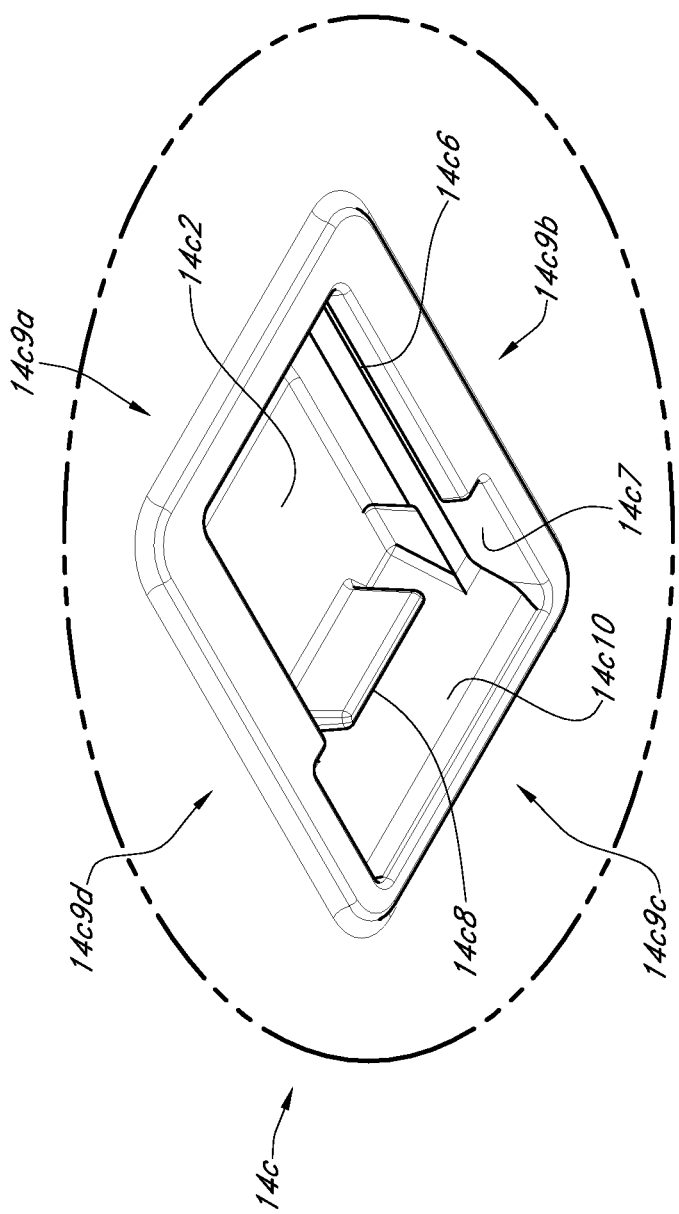
FIG. 6A is an enlarged anterior perspective view of a dashed-circle portion of the tablet case assembly of FIG. 5 labeled "6A" shown in FIG. 5.

Turning to FIG. 6A, depicted therein is an enlarged anterior perspective view of dashed-circle portion of tablet case assembly 12 of FIG. 5 labeled "6A" shown in FIG. 5. In implementations, case rear side 14 is shown to include rear wall 14c10, second track groove 14c6, first receiving groove 14c7, stop tab as unflexed 14c8 (experiences forces applied thereto less than a threshold force in which the threshold force would cause flexing), first side 14c9a, second side 14c9b, third side 14c9c, and fourth side 14c9d.

Figure 6B:
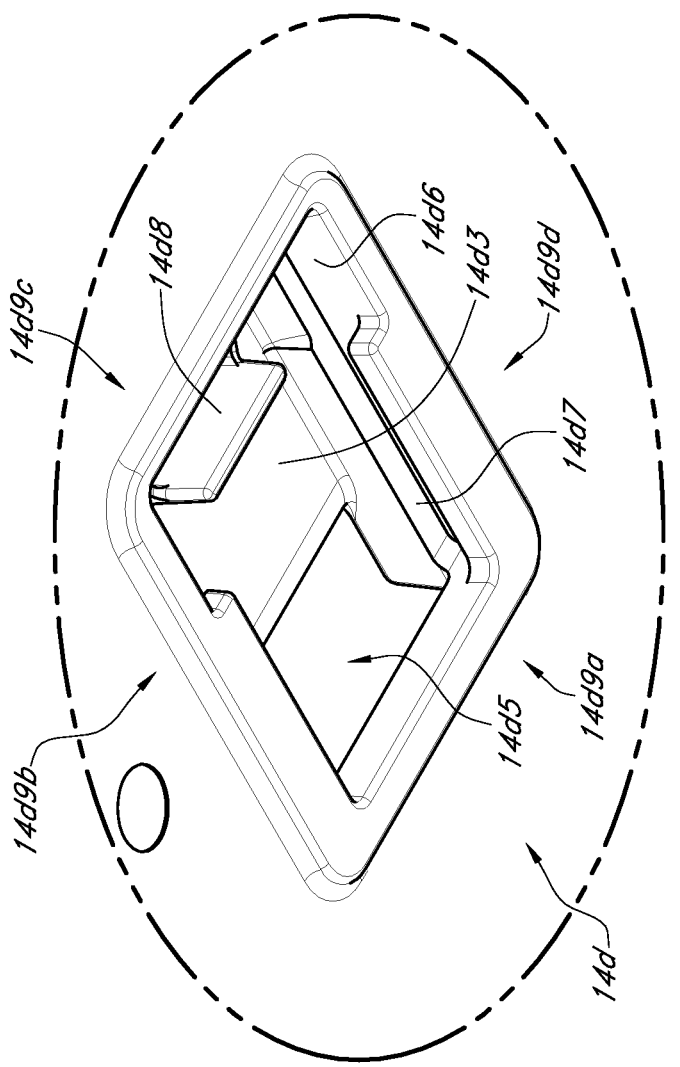
FIG. 6B is an enlarged anterior perspective view of a dashed-circle portion of the tablet case assembly of FIG. 5 labeled "6B" shown in FIG. 5.

Turning to FIG. 6B, depicted therein is an enlarged anterior perspective view of dashed-circle portion of tablet case assembly 12 of FIG. 5 labeled "6B" shown in FIG. 5. In implementations, case rear side 14 is shown to include first receiving groove 14d6, first track groove 14d7, stop tab as unflexed 14*d*8, first side 14*d*9*a*, second side 14*d*9*b*, third side 14*d*9*c*, and fourth side 14*d*9*d*.

Figure 6C:
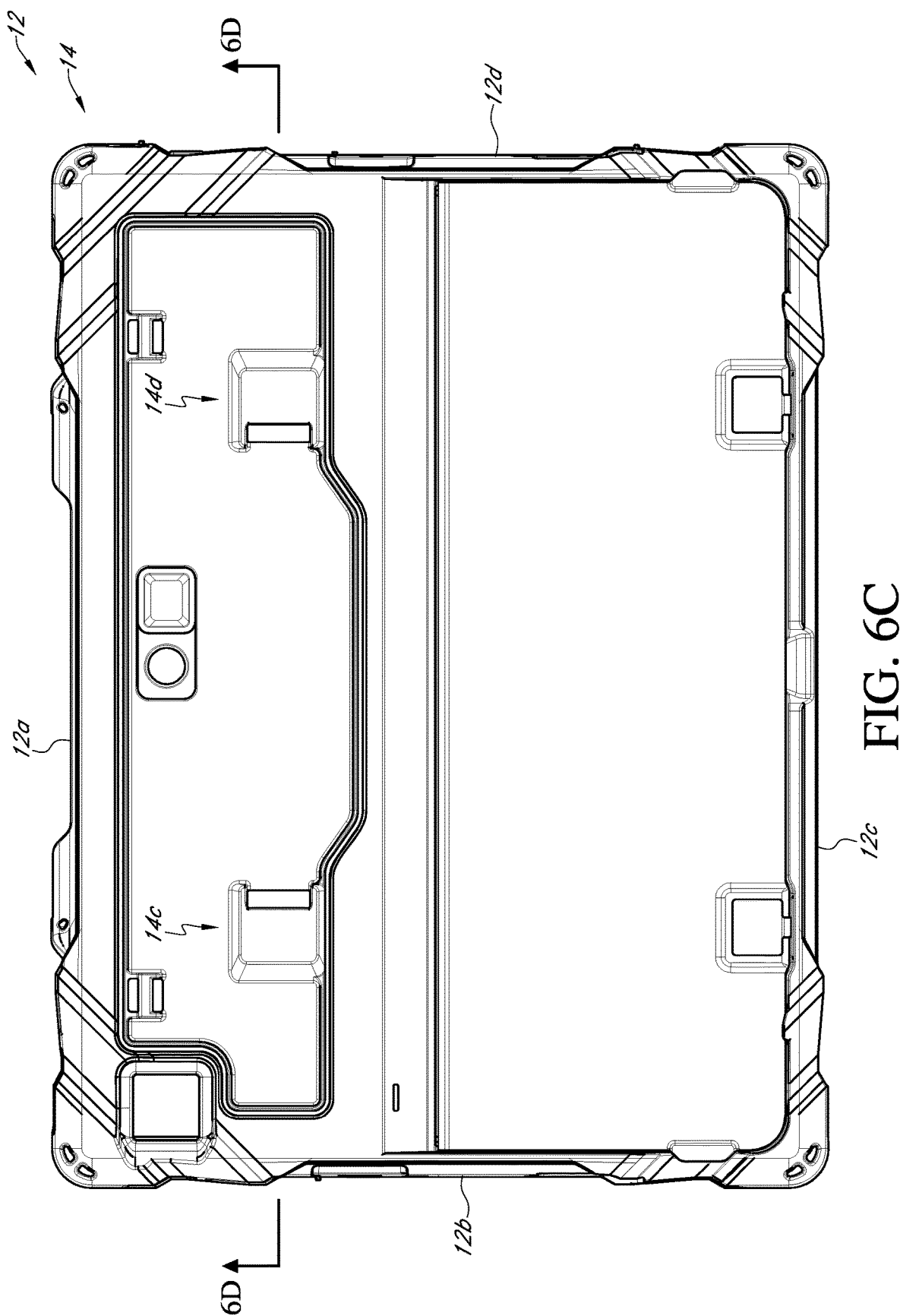
FIG. 6C is a top plan posterior view of the tablet case assembly of FIG. 4.

Turning to FIG. 6C, depicted therein is top plan posterior view of tablet case assembly 12 of FIG. 4.

Figure 6D:
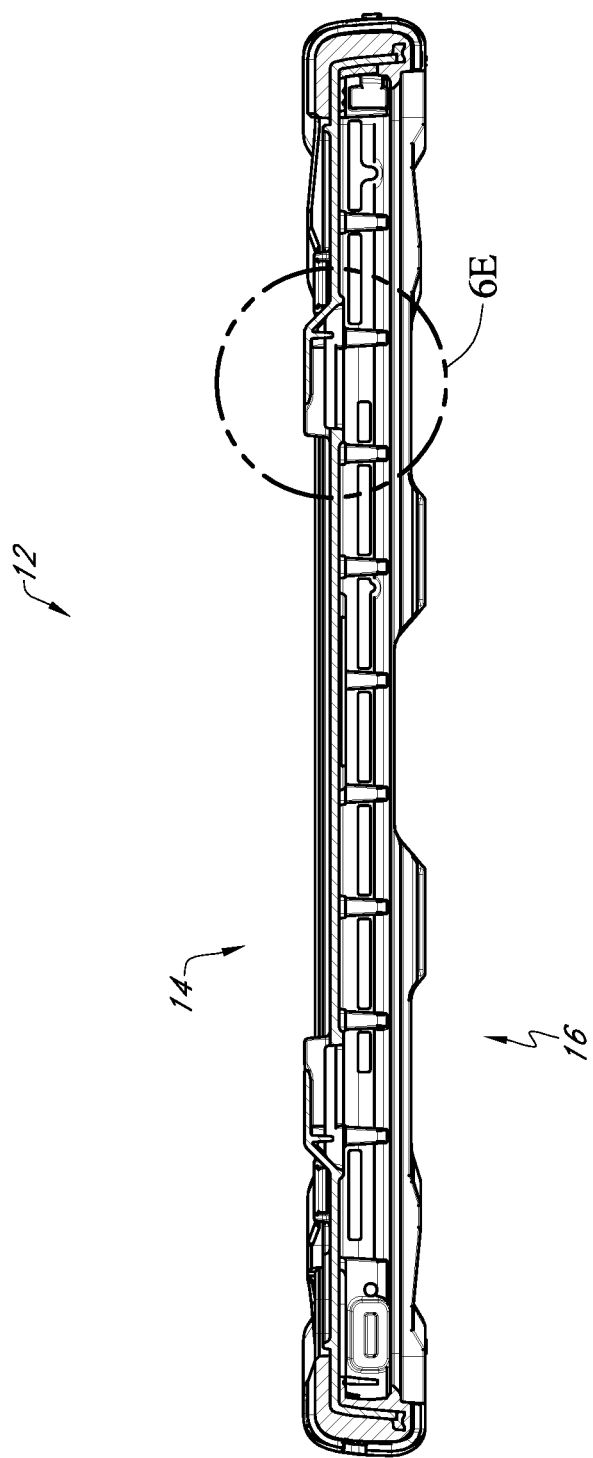
FIG. 6D is a side elevational cross-sectional view of the tablet case assembly of FIG. 6C taken along the cut line 6D-6D shown in FIG. 6C.

Turning to FIG. 6D, depicted therein is side elevational cross-sectional view of tablet case assembly 12 of FIG. 6C taken along cut line 6D-6D shown in FIG. 6C.

Turning to FIG. 6E, depicted therein is an enlarged side elevational cross-sectional view of dashed-circle portion of tablet case assembly 12 of FIG. 6D labeled "6E" shown in FIG. 6D. In implementations, case rear side 14 is shown to include first receiving groove entry opening 14*d*6*a*, first transition area 14*d*7*a*, restriction point 14*d*7*a*1, stop-tab-as-unflexed end 14*d*8*a*, stop-tab-as-unflexed distal surface 14*d*8*b*, and stop-tab-as-unflexed proximate surface 14*d*8*c*.

Figure 7:
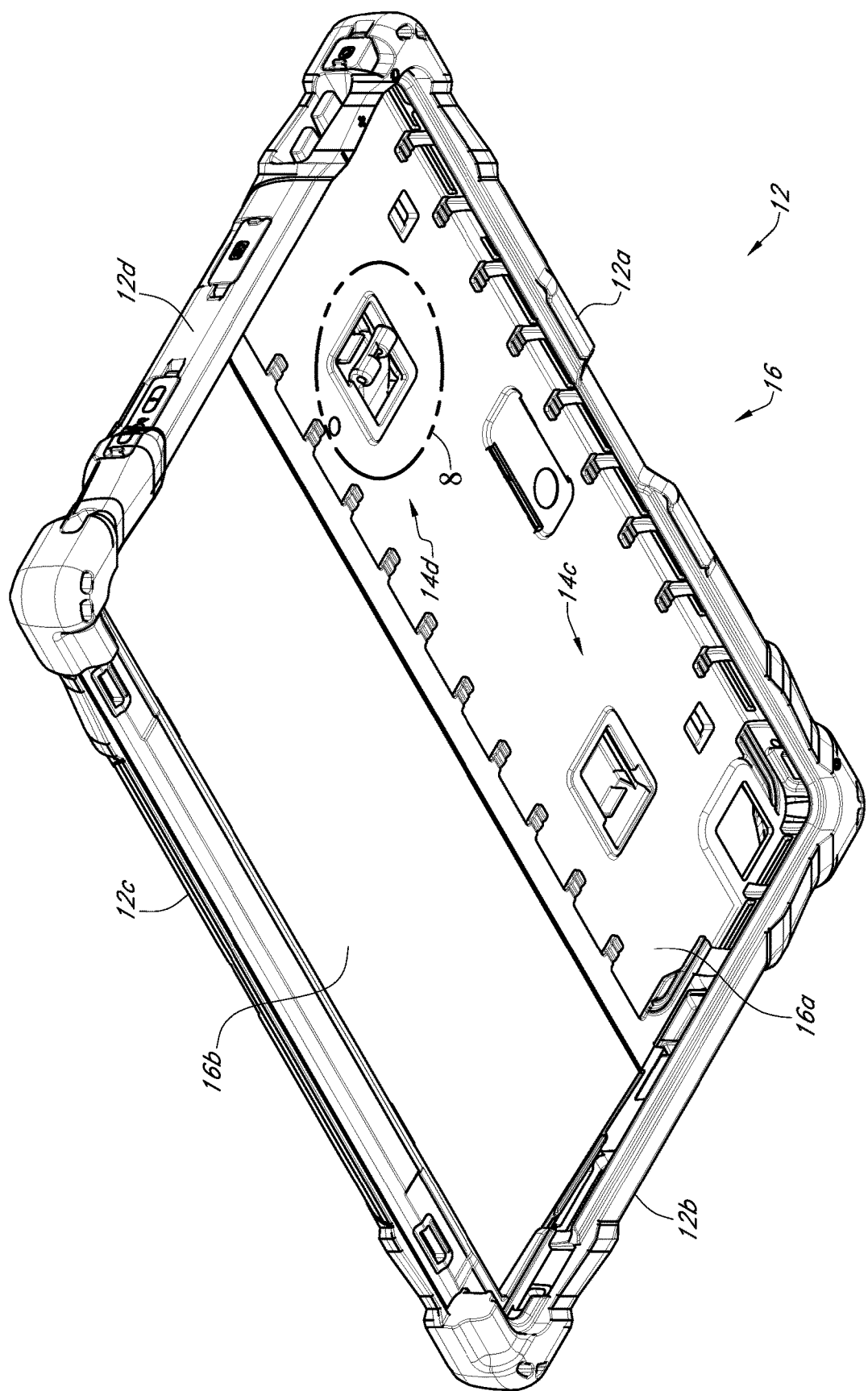
FIG. 7 is an anterior perspective view of the tablet case assembly of FIG. 4 along with the hand strap of FIG. 1 being introduced for coupling with the tablet case assembly.

Turning to FIG. 7, depicted therein is an anterior perspective view of tablet case assembly 12 of FIG. 4 along with hand strap 10 of FIG. 1 being introduced for coupling with tablet case assembly 12.

Figure 8:
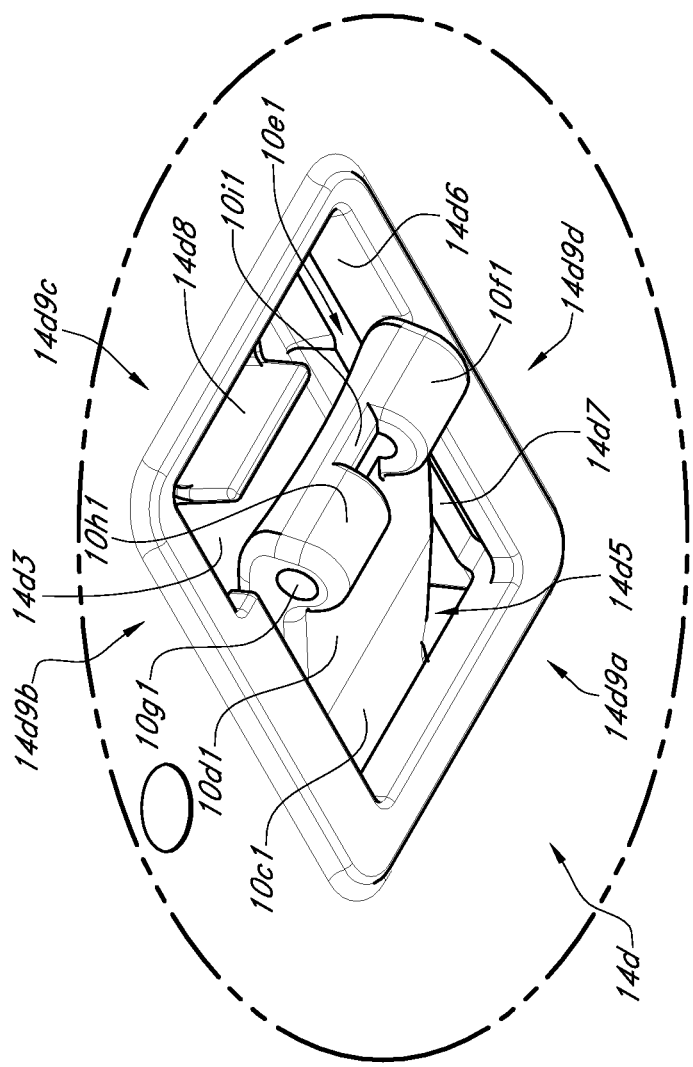
FIG. 8 is an enlarged perspective view of a dashed-circle portion of the tablet case assembly and the hand strap of FIG. 7 labeled "8" shown in FIG. 7.

Turning to FIG. 8, depicted therein is an enlarged perspective view of dashed-circle portion of tablet case assembly 12 and hand strap 10 of FIG. 7 labeled "8" shown in FIG. 7.

Figure 9:
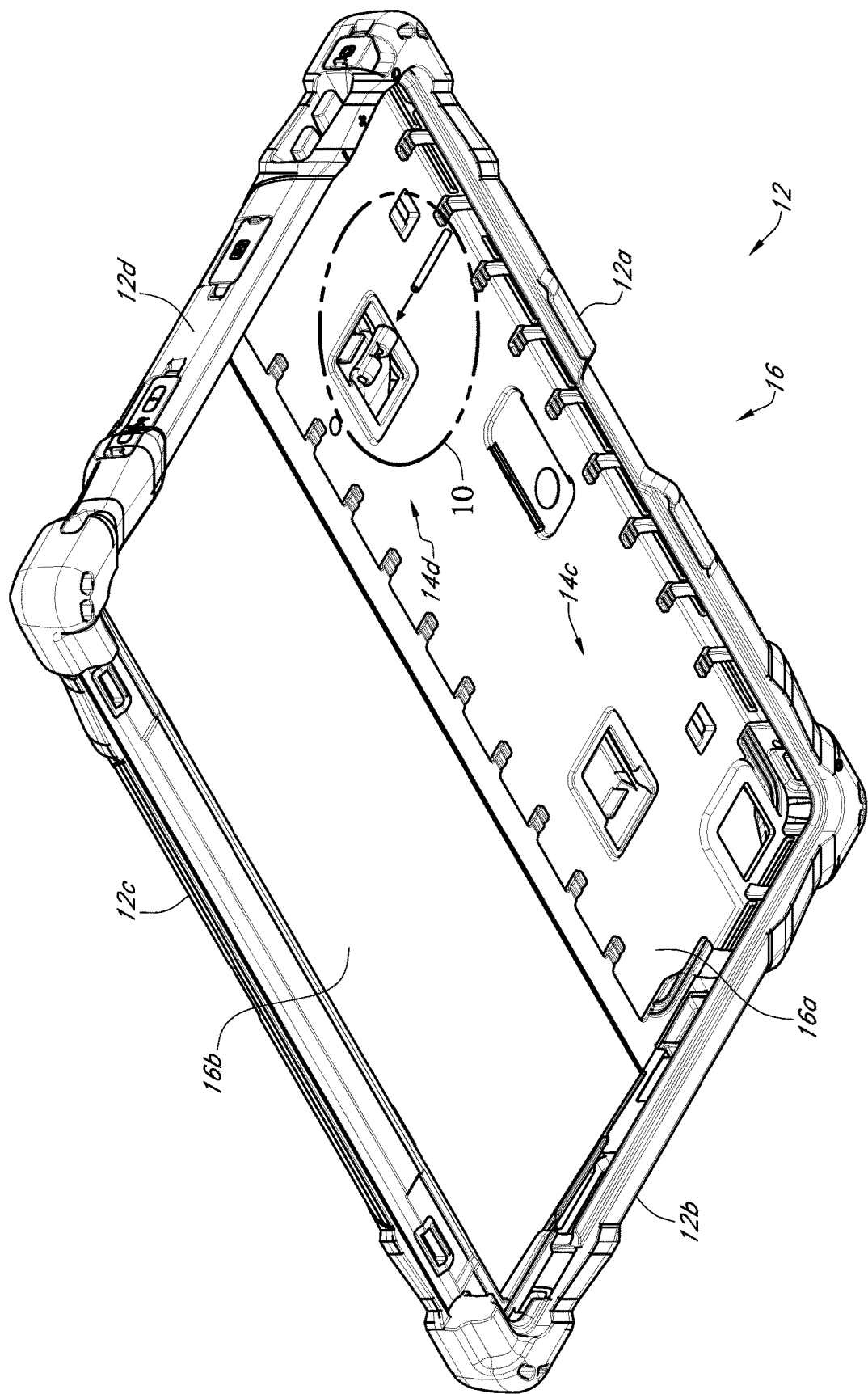
FIG. 9 is an anterior perspective view of the tablet case assembly of FIG. 4 along with the hand strap of FIG. 1 and a track pin being introduced for coupling with the tablet case assembly.

Turning to FIG. 9, depicted therein is an anterior perspective view of tablet case assembly 12 of FIG. 4 along with hand strap 10 of FIG. 1 and track pin 10/1*a* being introduced for coupling with tablet case assembly 12.

Figure 10:
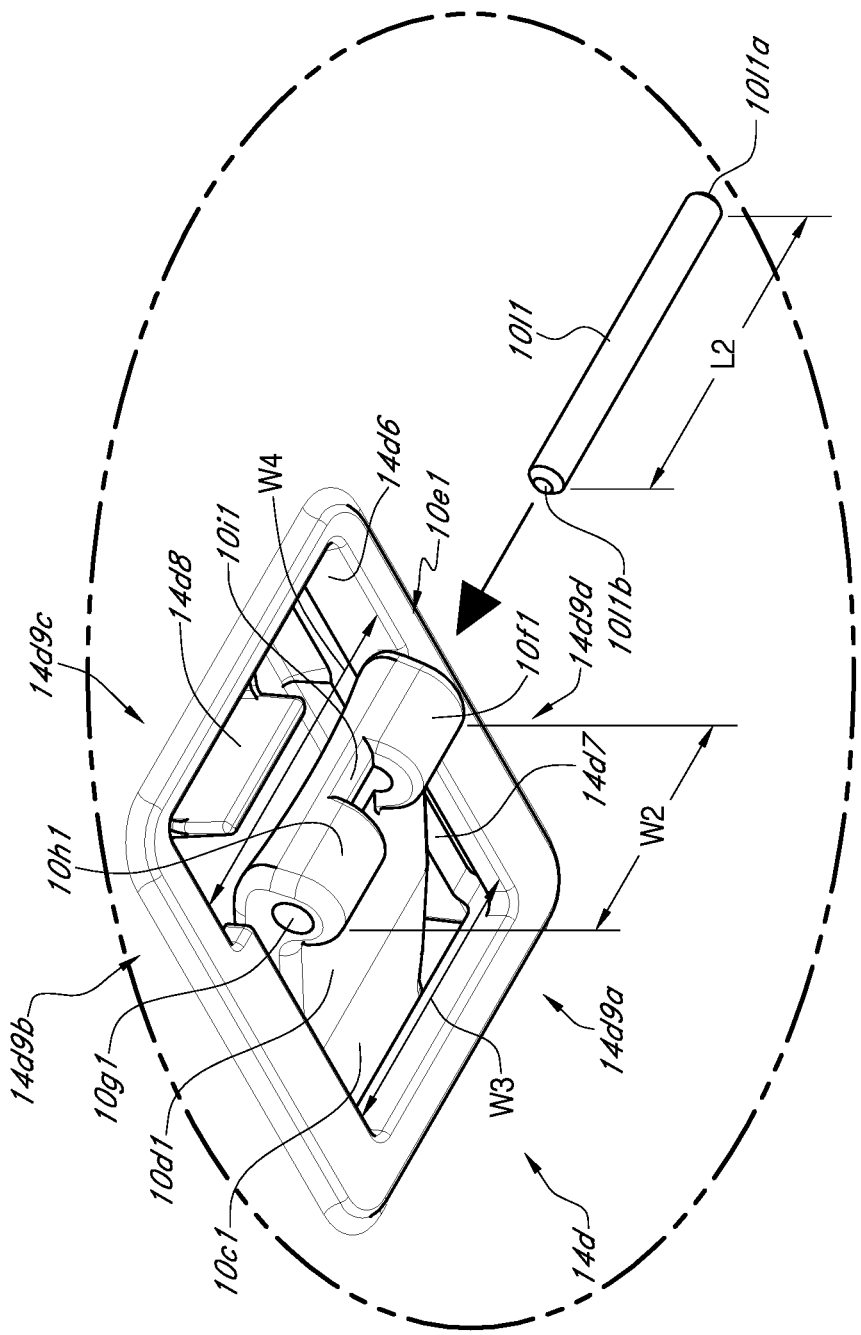
FIG. 10 is an enlarged perspective view of a dashed-circle portion of the tablet case assembly, hand strap and track pin of FIG. 9 labeled "10" shown in FIG. 9.

Turning to FIG. 10, depicted therein is an enlarged perspective view of dashed-circle portion of tablet case assembly 12, hand strap 10 and track pin 10/1*a* of FIG. 9 labeled "10" shown in FIG. 9. In implementations, track pin 10/1 is shown to include first end portion 10/1*a*, second end portion 10/1*b*, and pin length L2. In implementations, case rear side 14 is shown to include clearance width W3 and receiving groove entry width W4. In implementations, hand strap 10 is shown to include strap end width W2. In implementations, starting with smallest dimension and ending with largest dimension can be ordered as strap end width W2, clearance width W3, pin length L2, and receiving groove entry width W4.

Figure 11:
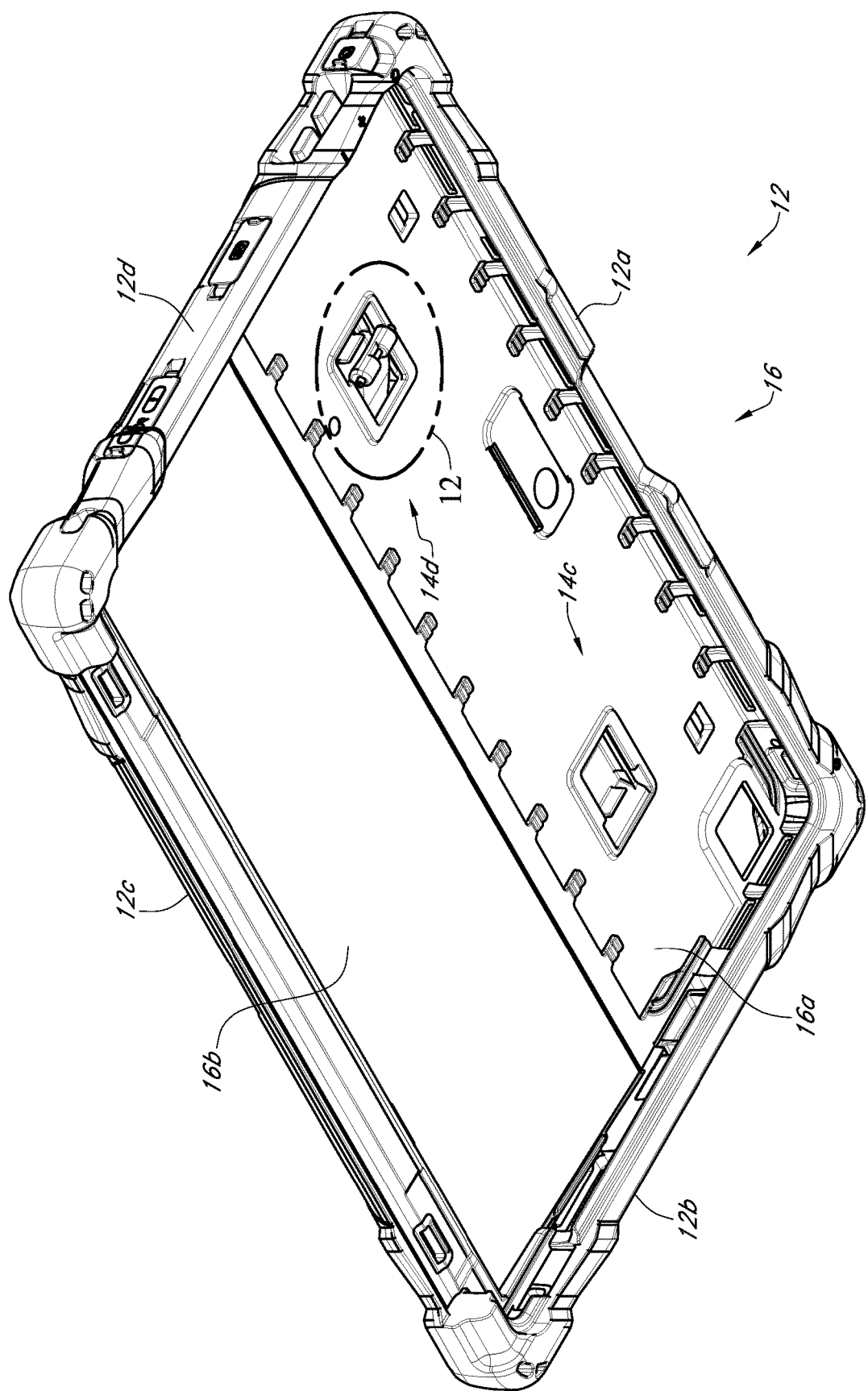
FIG. 11 is an anterior perspective view of the tablet case assembly of FIG. 4 along with hand strap of FIG. 1 engaged with the track pin of FIG. 9 for coupling with the tablet case assembly.

Turning to FIG. 11, depicted therein is an anterior perspective view of tablet case assembly 12 of FIG. 4 along with hand strap 10 of FIG. 1 engaged with track pin 10/1*a* of FIG. 9 for coupling with tablet case assembly 12.

Figure 12:
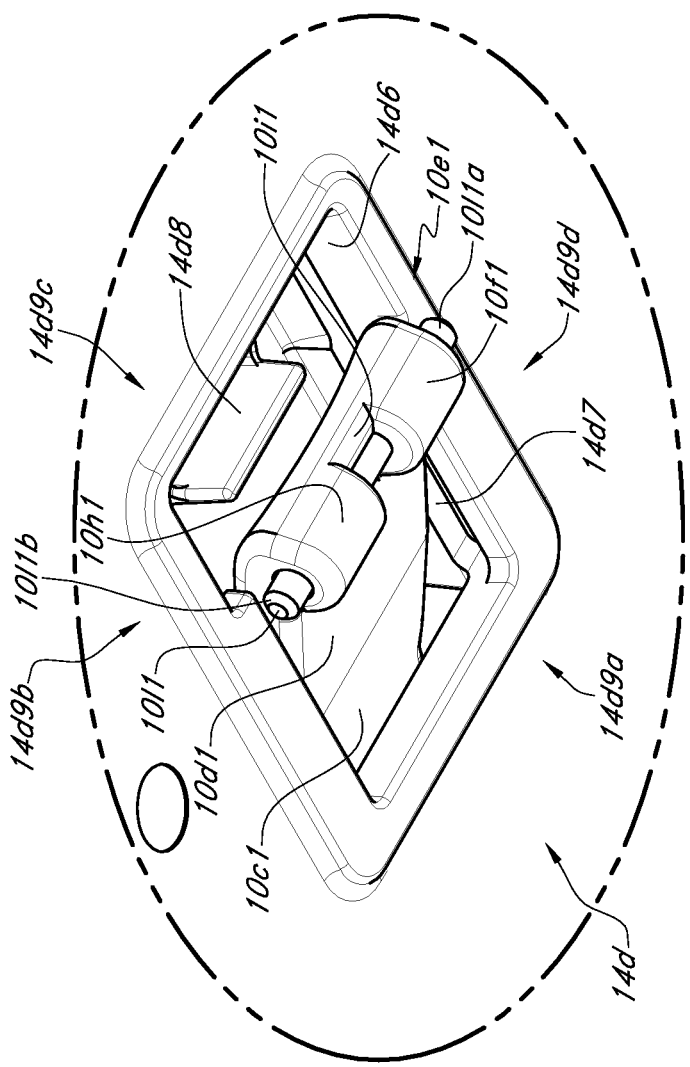
FIG. 12 is an enlarged perspective view of a dashed-circle portion of the tablet case assembly, hand strap and track pin of FIG. 11 labeled "12" shown in FIG. 11.

Turning to FIG. 12, depicted therein is an enlarged perspective view of dashed-circle portion of tablet case assembly 12, hand strap 10 and track pin 10/1*a* of FIG. 11 labeled "12" shown in FIG. 11.

Figure 12A:
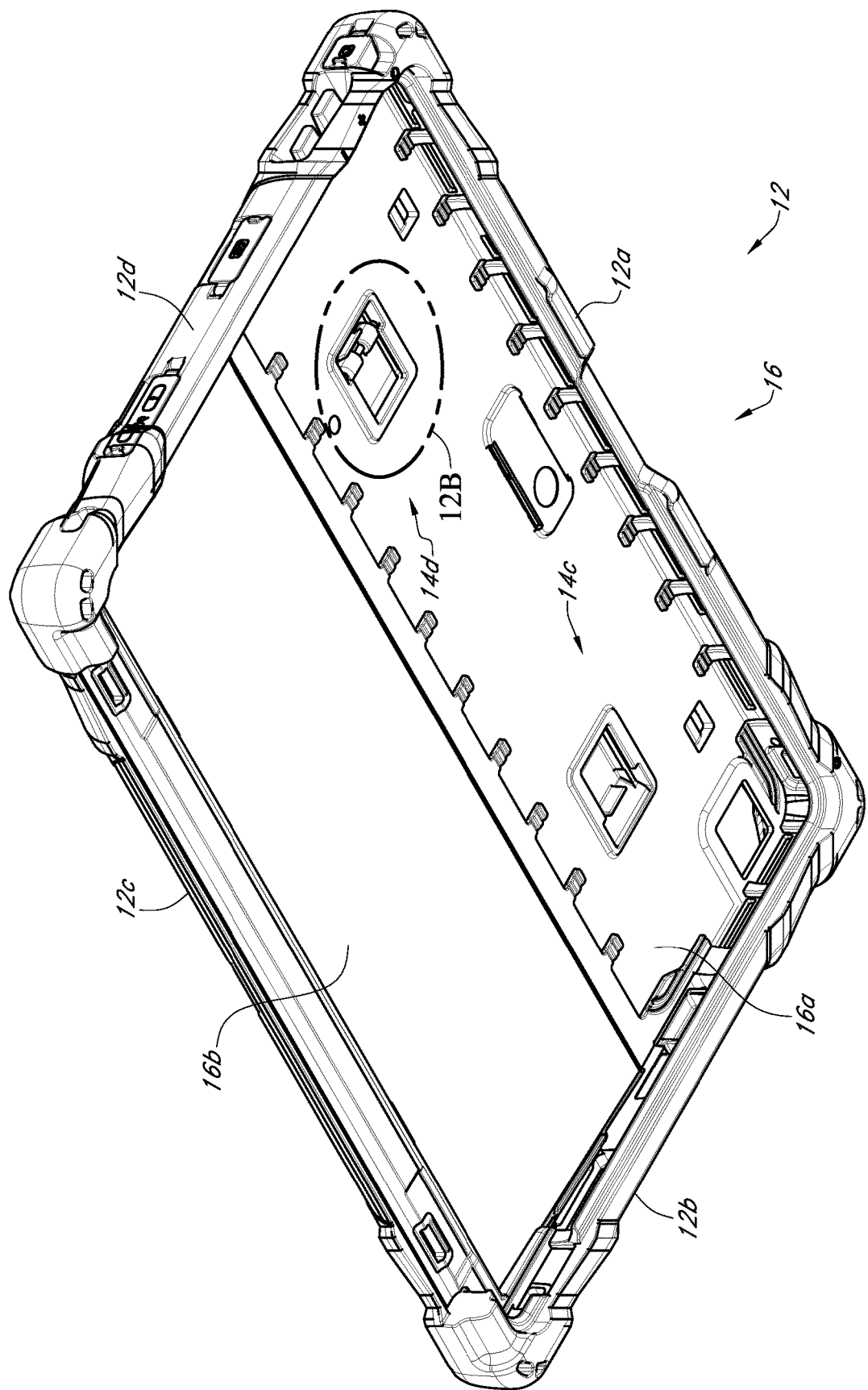
FIG. 12A is an anterior perspective view of the tablet case assembly of FIG. 4 along with hand strap of FIG. 1 engaged with the track pin of FIG. 9 with the hand strap and track pin being pushed against stop tab for coupling with the tablet case assembly.

Turning to FIG. 12A, depicted therein is an anterior perspective view of tablet case assembly 12 of FIG. 4 along with hand strap 10 of FIG. 1 engaged with track pin 10/1*a* of FIG. 9 with hand strap 10 and track pin 10/1*a* being pushed against stop tab as flexed 14*d*10 for coupling with tablet case assembly 12.

Figure 12B:
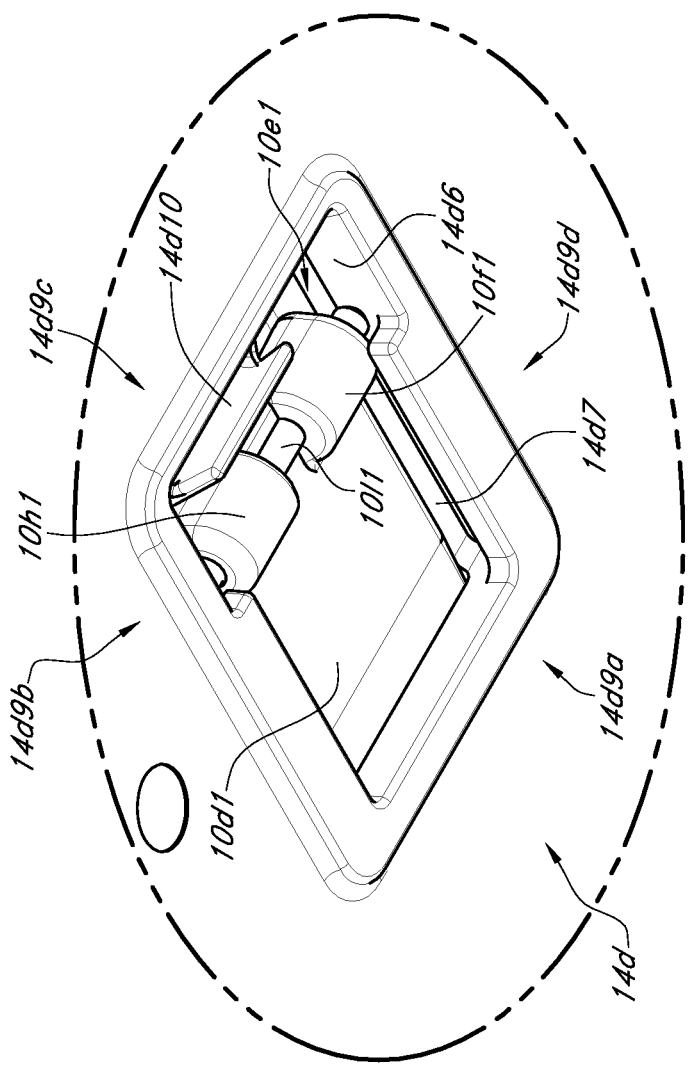
FIG. 12B is an enlarged perspective view of a dashed-circle portion of the tablet case assembly, hand strap, track pin, and stop tab of FIG. 12A labeled "12B" shown in FIG. 12A.

Turning to FIG. 12B, depicted therein is an enlarged perspective view of dashed-circle portion of tablet case assembly 12, hand strap 10, track pin 10/1*a*, and stop tab as flexed 14*d*10 of FIG. 12 labeled "12B" shown in FIG. 12A.

Figure 12C:
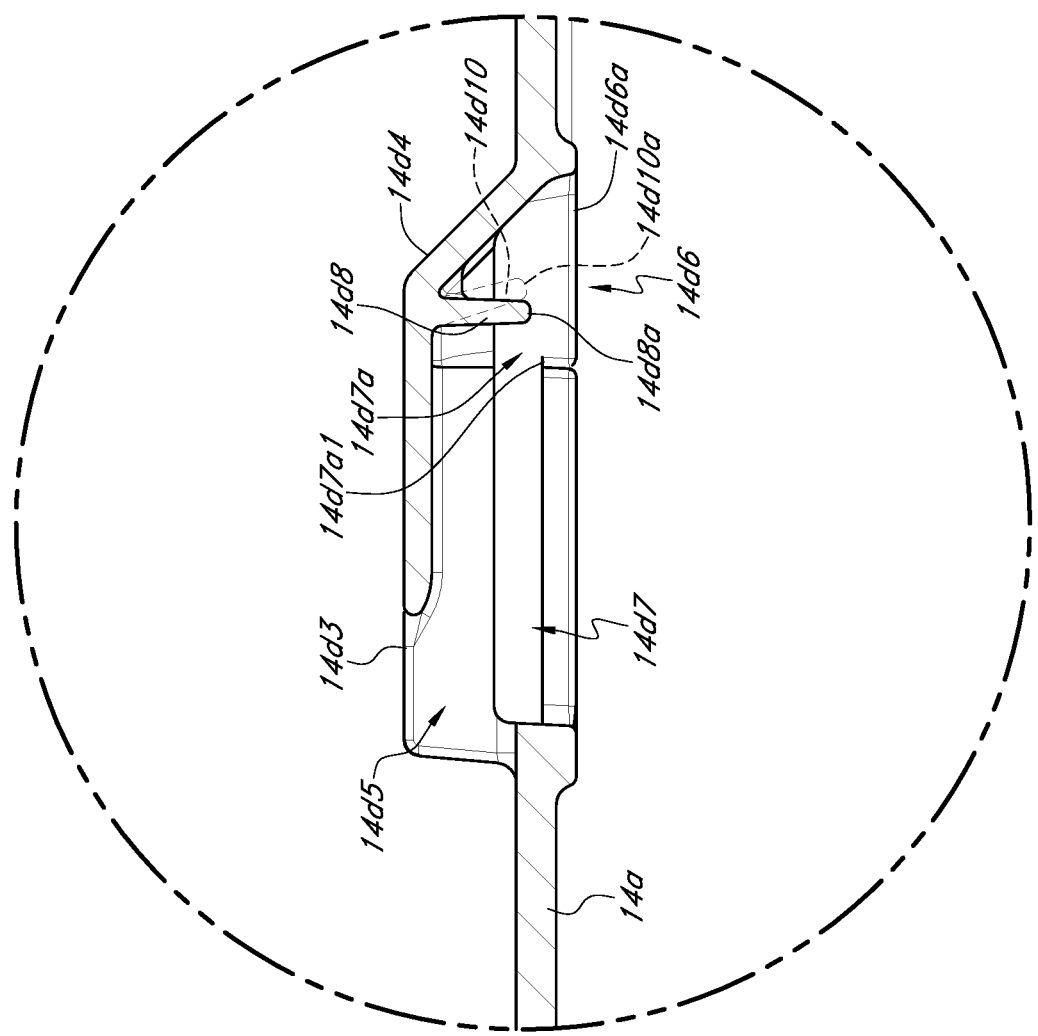
FIG. 12C is an enlarged perspective view of a dashed-circle portion of the tablet case assembly of FIG. 6D labeled "6E" shown in FIG. 6D with additional elaboration regarding stop tab of FIG. 12A.

Turning to FIG. 12C, depicted therein is an enlarged perspective view of dashed-circle portion of tablet case assembly 12 of FIG. 6D labeled "6E" shown in FIG. 6D with additional elaboration regarding stop tab as flexed of FIG. 12A. In implementations, case rear side 14 is shown to represent sufficient force applied to stop-tab-as-unflexed proximate surface 14*d*8*c* to change stop tab as unflexed 14*d*8 with stop-tab-as-unflexed end 14*d*8*a* to stop tab as flexed 14*d*10 with stop-tab-as-flexed end 14*d*10*a* while sufficient force is being applied.

Figure 13:
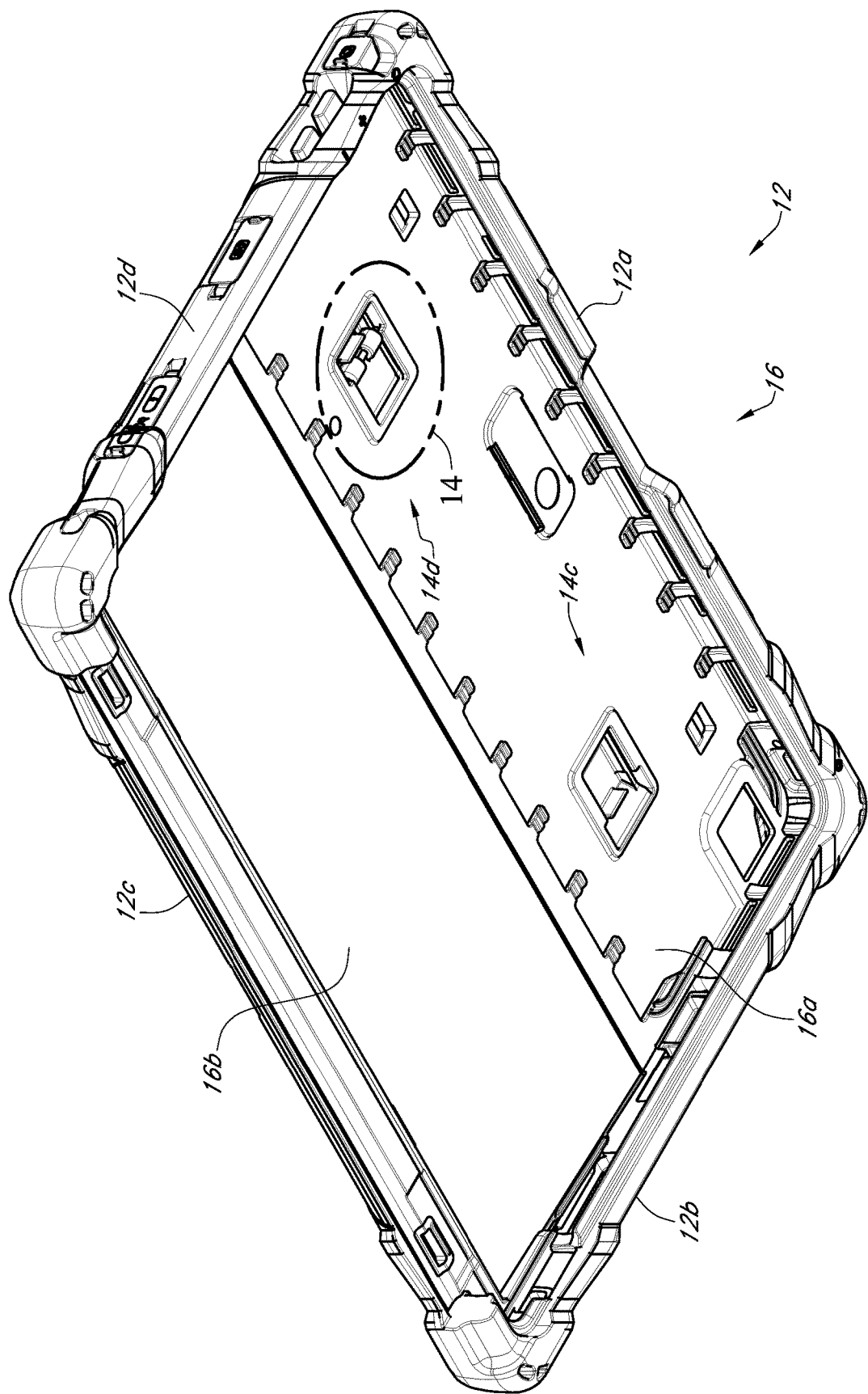
FIG. 13 is an anterior perspective view of the tablet case assembly of FIG. 4 along with hand strap of FIG. 1 engaged with the track pin of FIG. 9 with the hand strap depicted as coupled in first positional adjustment with the tablet case assembly.

Turning to FIG. 13, depicted therein is an anterior perspective view of tablet case assembly 12 of FIG. 4 along with hand strap 10 of FIG. 1 engaged with track pin 10/1*a* of FIG. 9 with hand strap 10 depicted as coupled in first positional adjustment with tablet case assembly 12.

Figure 14:
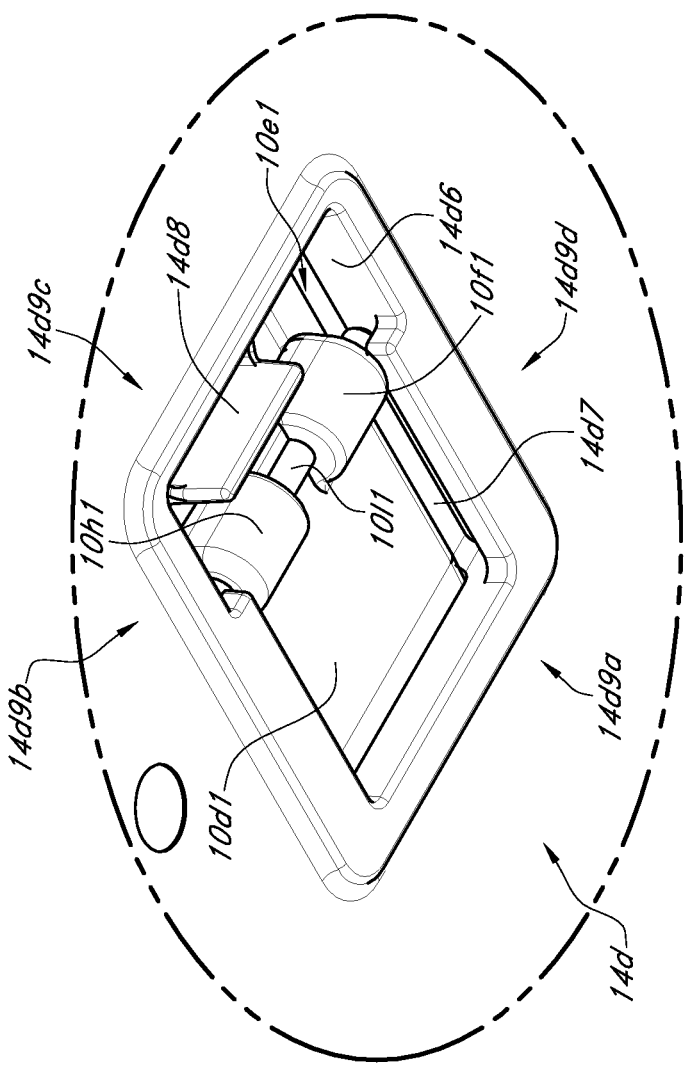
FIG. 14 is an enlarged perspective view of a dashed-circle portion of the tablet case assembly, hand strap, and track pin of FIG. 13 labeled "14" shown in FIG. 13 with the hand strap depicted as coupled in first positional adjustment with the tablet case assembly.

Turning to FIG. 14, depicted therein is an enlarged perspective view of dashed-circle portion of tablet case assembly 12, hand strap 10, and track pin 10/1*a* of FIG. 13 labeled "14" shown in FIG. 13 with hand strap 10 depicted as coupled in first positional adjustment with tablet case assembly 12.

Figure 15:
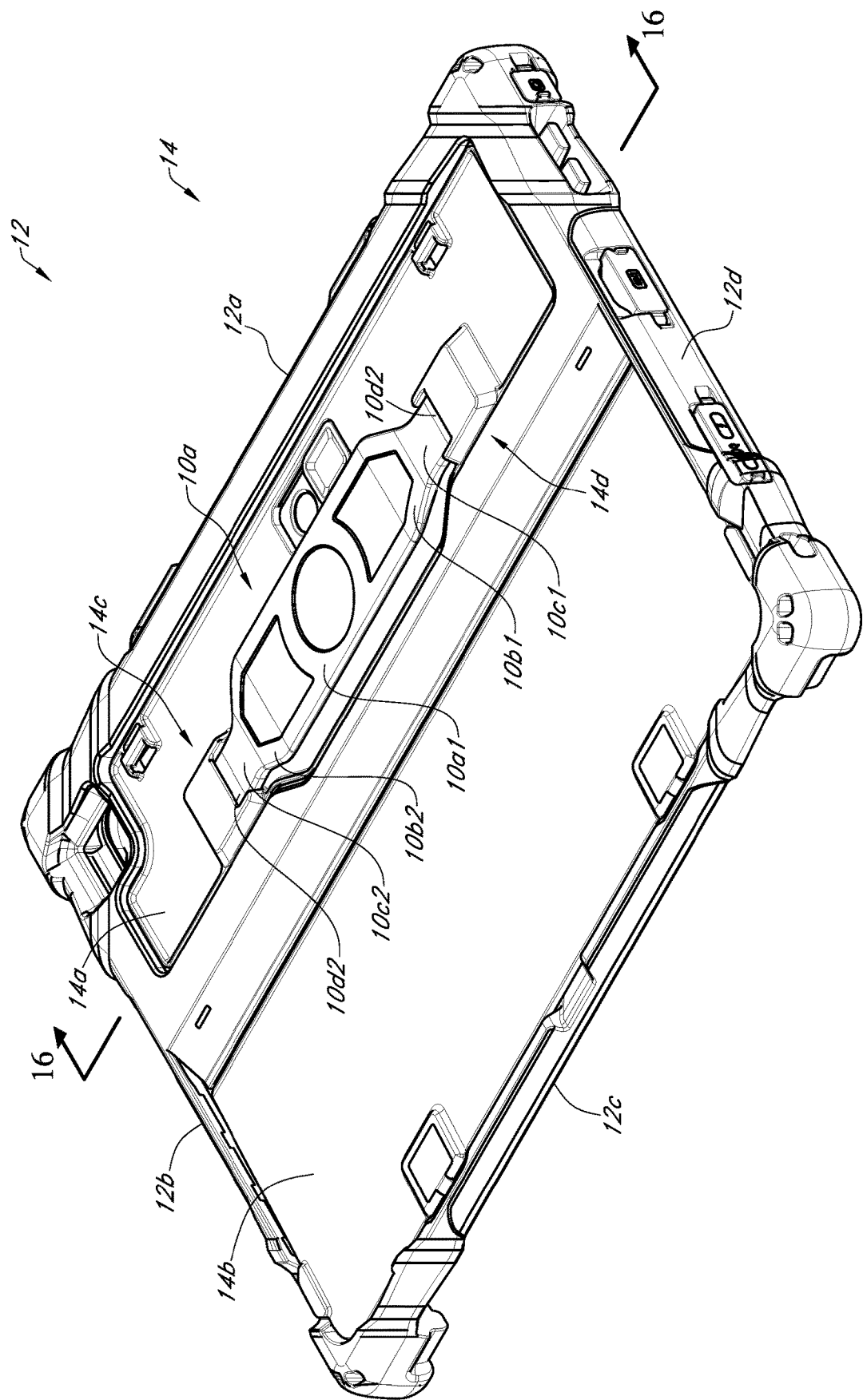
FIG. 15 is a posterior perspective view of the tablet case assembly of FIG. 4 along with hand strap of FIG. 1 engaged with the track pin of FIG. 9 with the hand strap depicted as coupled in first positional adjustment with the tablet case assembly.

Turning to FIG. 15, depicted therein is posterior perspective view of tablet case assembly 12 of FIG. 4 along with hand strap 10 of FIG. 1 engaged with track pin 10/1*a* of FIG. 9 with hand strap 10 depicted as coupled in first positional adjustment with tablet case assembly 12.

Figure 16:
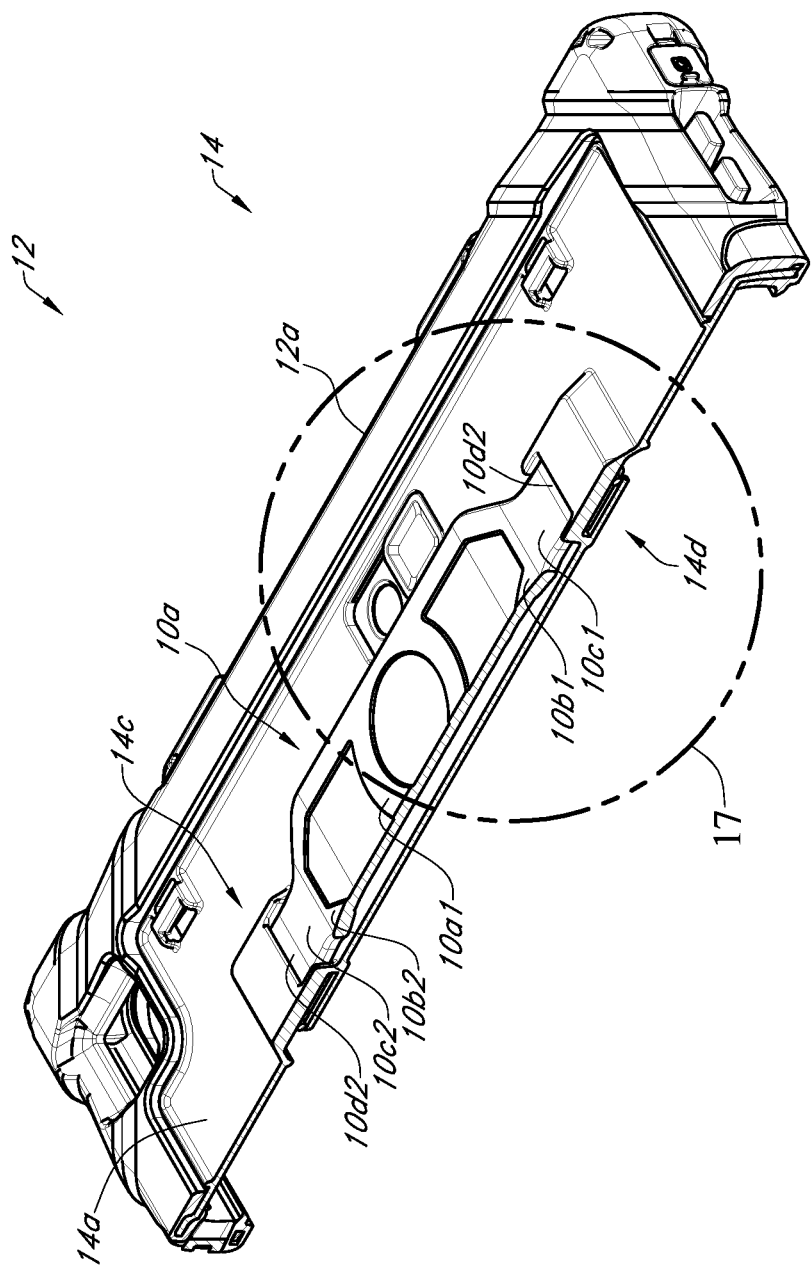
FIG. 16 is a cross-sectional posterior perspective view of the tablet case assembly, hand strap, and track pin of FIG. 15 taken along the cut line 16-16 shown in FIG. 15 with the hand strap depicted as coupled in first positional adjustment with the tablet case assembly.

Turning to FIG. 16, depicted therein is cross-sectional posterior perspective view of tablet case assembly 12, hand strap 10, and track pin 10/1*a* of FIG. 15 taken along cut line 16-16 shown in FIG. 15 with hand strap 10 depicted as coupled in first positional adjustment with tablet case assembly 12.

Figure 17:
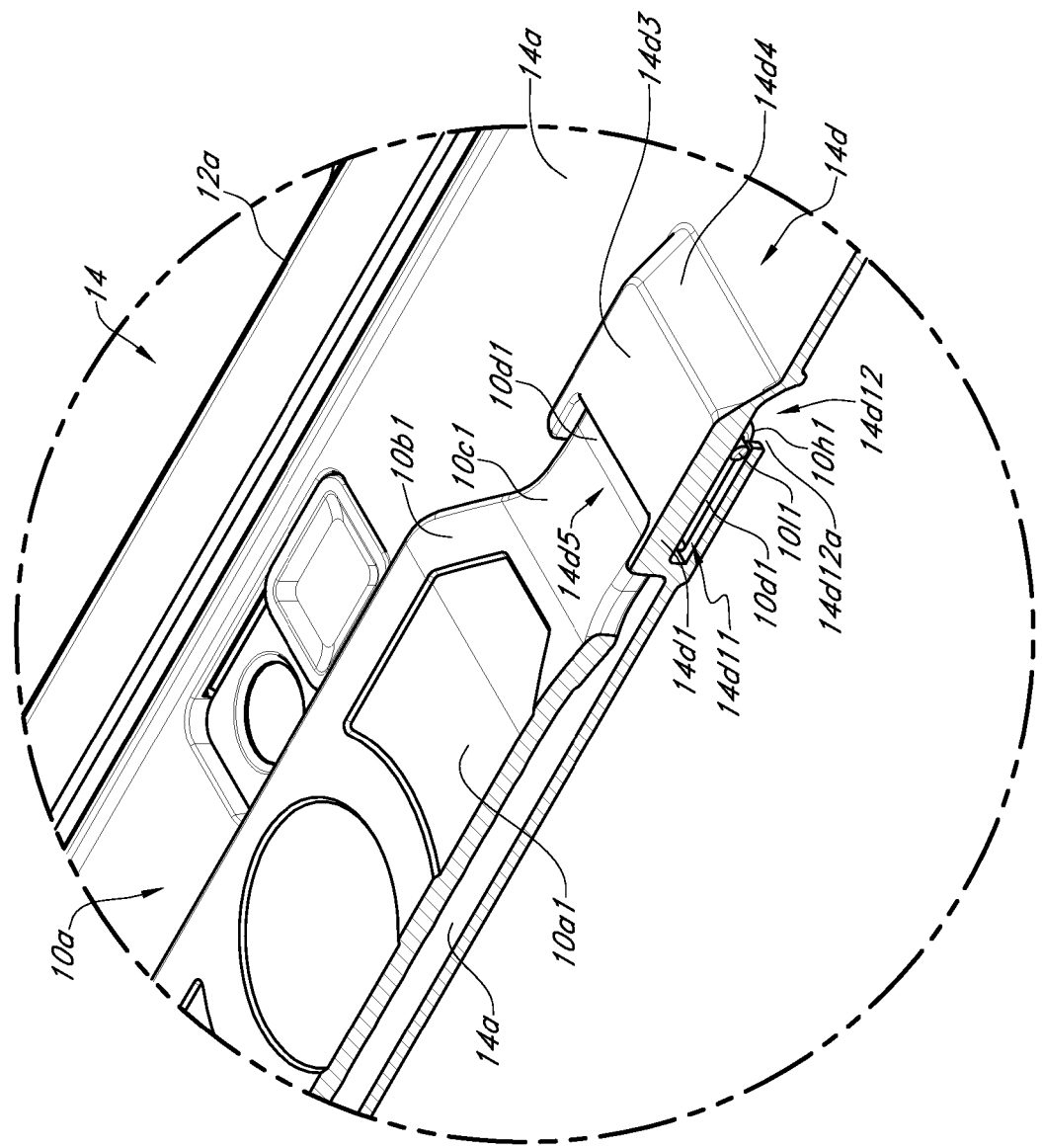
FIG. 17 is an enlarged perspective view of a dashed-circle portion of the tablet case assembly, hand strap, and track pin of FIG. 16 labeled "17" shown in FIG. 16 with the hand strap depicted as coupled in first positional adjustment with the tablet case assembly.

Turning to FIG. 17, depicted therein is an enlarged perspective view of dashed-circle portion of tablet case assembly 12, hand strap 10, and track pin 10/1*a* of FIG. 16 labeled "17" shown in FIG. 16 with hand strap 10 depicted as coupled in first positional adjustment with tablet case assembly 12. In implementations, case rear side 14 is shown to include second track groove 14*d*11, second receiving groove 14*d*12, and second receiving groove entry opening 14*d*12*a*.

Figure 18:
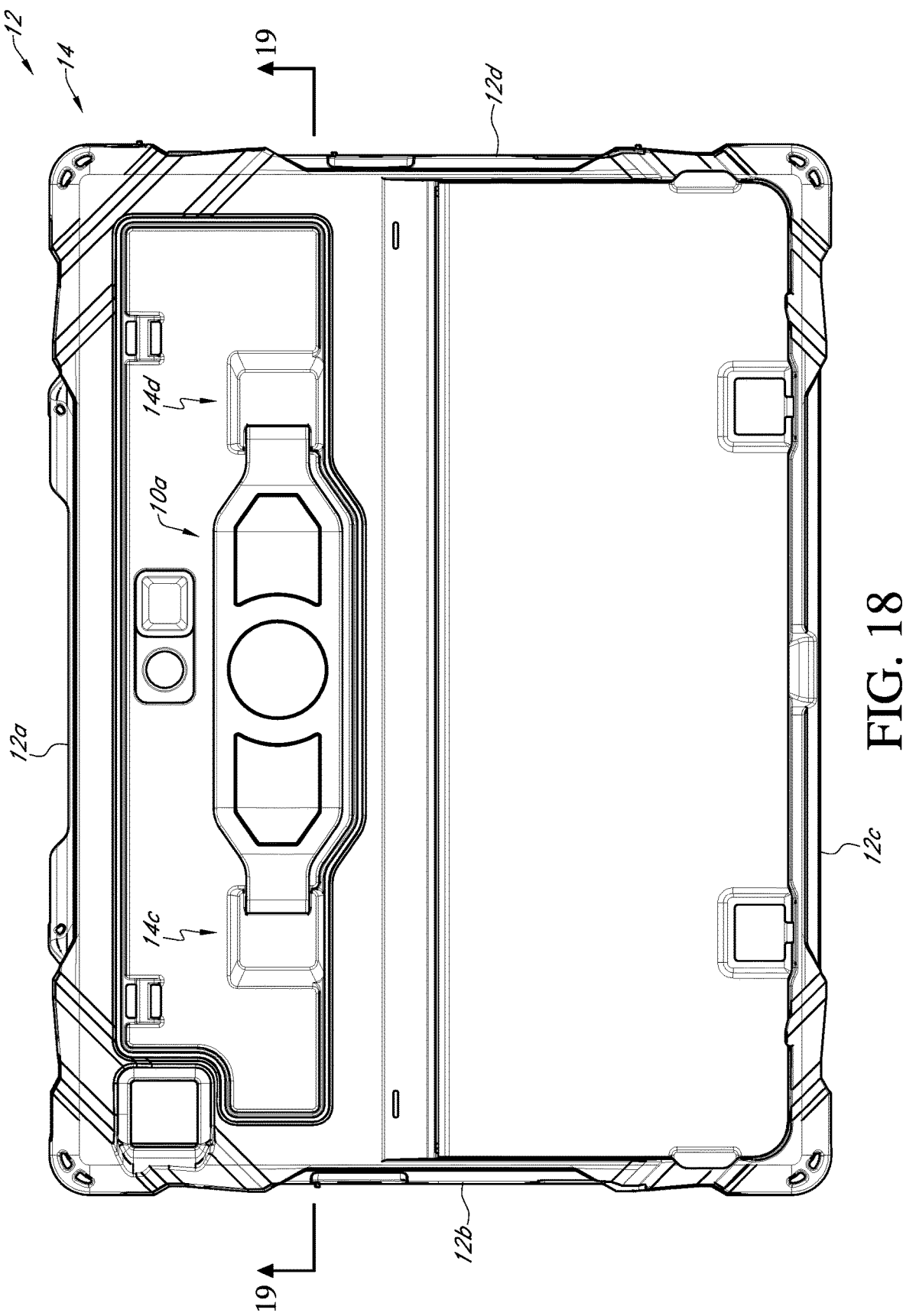
FIG. 18 is a top plan view of the tablet case assembly of FIG. 4 along with hand strap of FIG. 1 engaged with the track pin of FIG. 9 with the hand strap depicted as coupled in first positional adjustment with the tablet case assembly.

Turning to FIG. 18, depicted therein is top plan view of tablet case assembly 12 of FIG. 4 along with hand strap 10 of FIG. 1 engaged with track pin 10/1*a* of FIG. 9 with hand strap 10 depicted as coupled in first positional adjustment with tablet case assembly 12.

Figure 19:
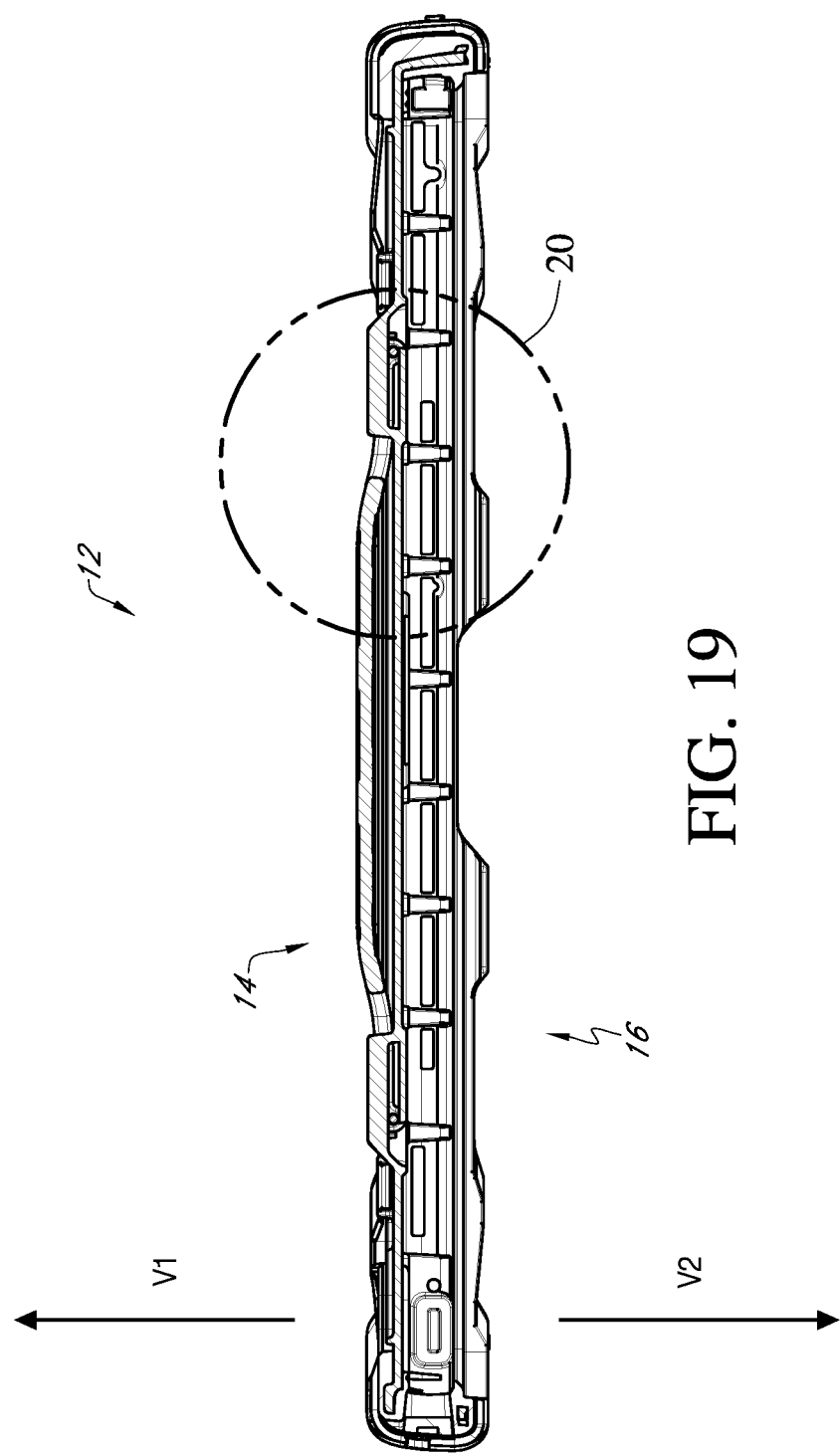
FIG. 19 is a side elevational cross-sectional view of the tablet case assembly, hand strap, and track pin of FIG. 18 taken along the cut line 18-18 shown in FIG. 18 with the hand strap depicted as coupled in first positional adjustment with the tablet case assembly.

Turning to FIG. 19, depicted therein is side elevational cross-sectional view of tablet case assembly 12, hand strap 10, and track pin 10/1*a* of FIG. 18 taken along cut line 18-18 shown in FIG. 18 with hand strap 10 depicted as coupled in first positional adjustment with tablet case assembly 12. In implementations, tablet case assembly 12 is shown to include first direction V1, and second direction V2.

Figure 20:
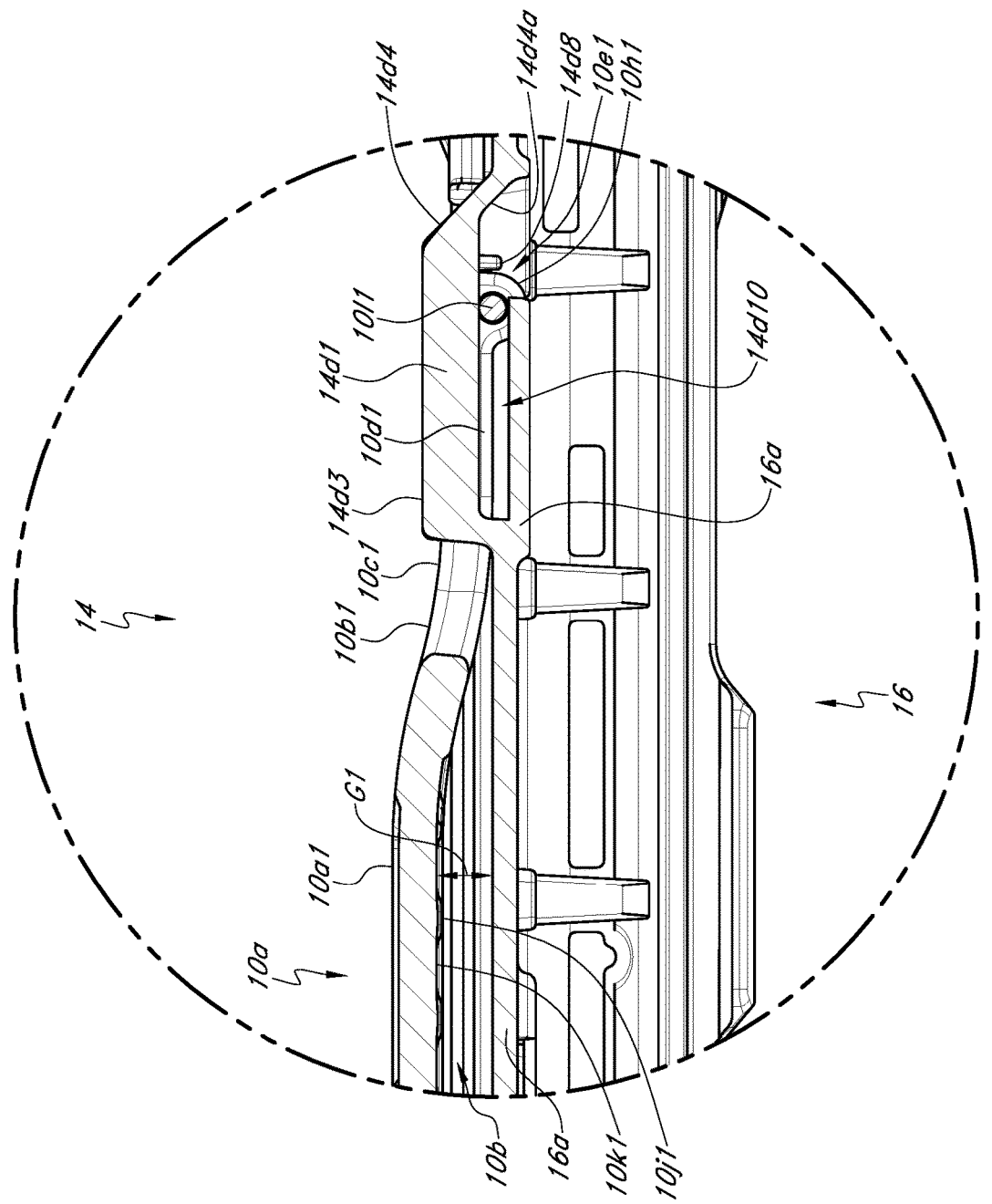
FIG. 20 is an enlarged elevational cross-sectional view of a dashed-circle portion of the tablet case assembly, hand strap, and track pin of FIG. 19 labeled "20" shown in FIG. 19 with the hand strap depicted as coupled in first positional adjustment with the tablet case assembly.

Turning to FIG. 20, depicted therein is an enlarged elevational cross-sectional view of dashed-circle portion of tablet case assembly 12, hand strap 10, and track pin 10/1*a* of FIG. 19 labeled "20" shown in FIG. 19 with hand strap 10 depicted as coupled in first positional adjustment with first gap distance G1 from tablet case assembly 12. In implementations, case rear side 14 is shown to include rear wall interior surface 14*d*4*a*.

Figure 21:
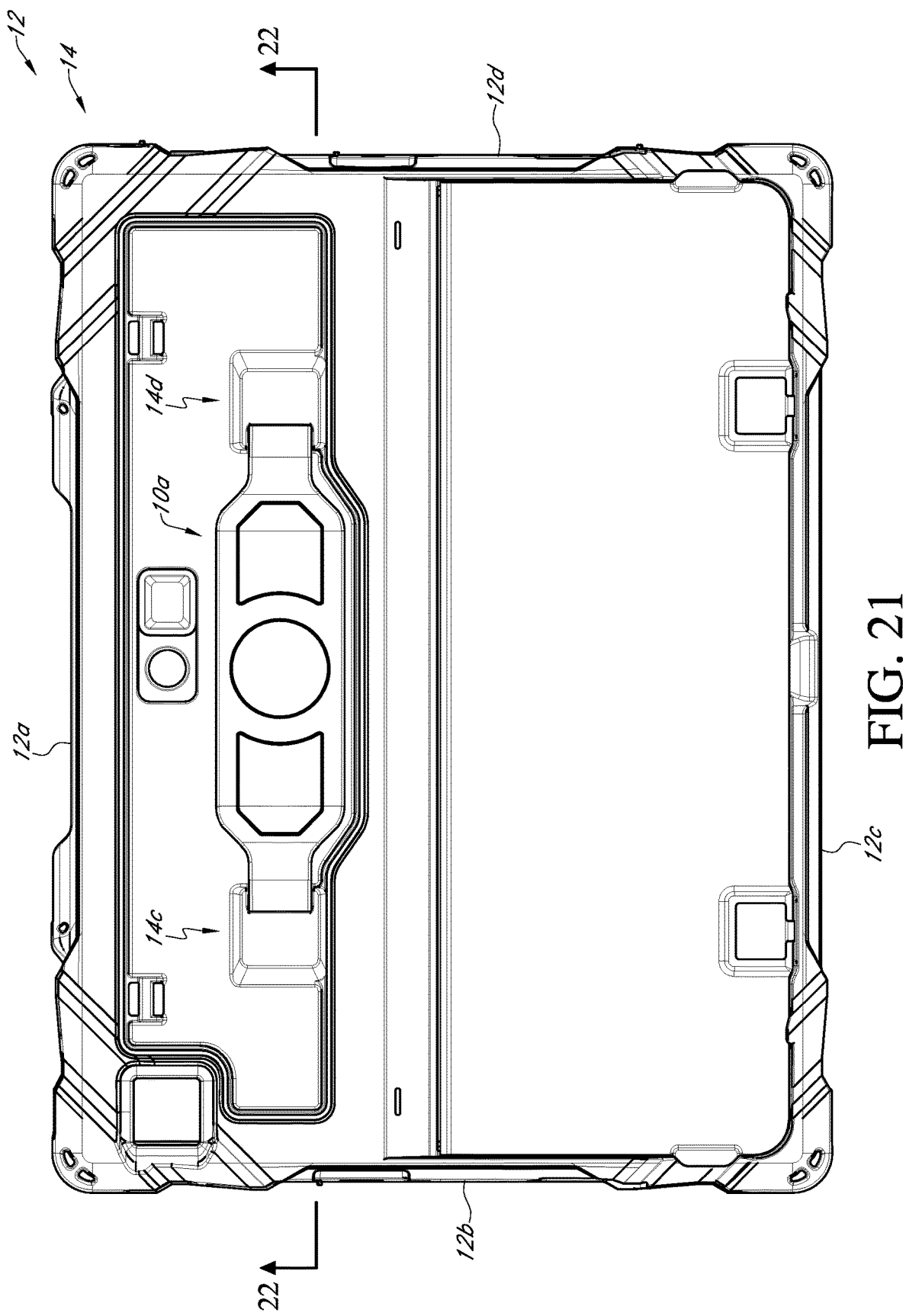
FIG. 21 is a top plan view of the tablet case assembly of FIG. 4 along with hand strap of FIG. 1 engaged with the track pin of FIG. 9 with the hand strap depicted as coupled in second positional adjustment with the tablet case assembly.

Turning to FIG. 21, depicted therein is top plan view of tablet case assembly 12 of FIG. 4 along with hand strap 10 of FIG. 1 engaged with track pin 10/1*a* of FIG. 9 with hand strap 10 depicted as coupled in second positional adjustment with tablet case assembly 12.

Figure 22:
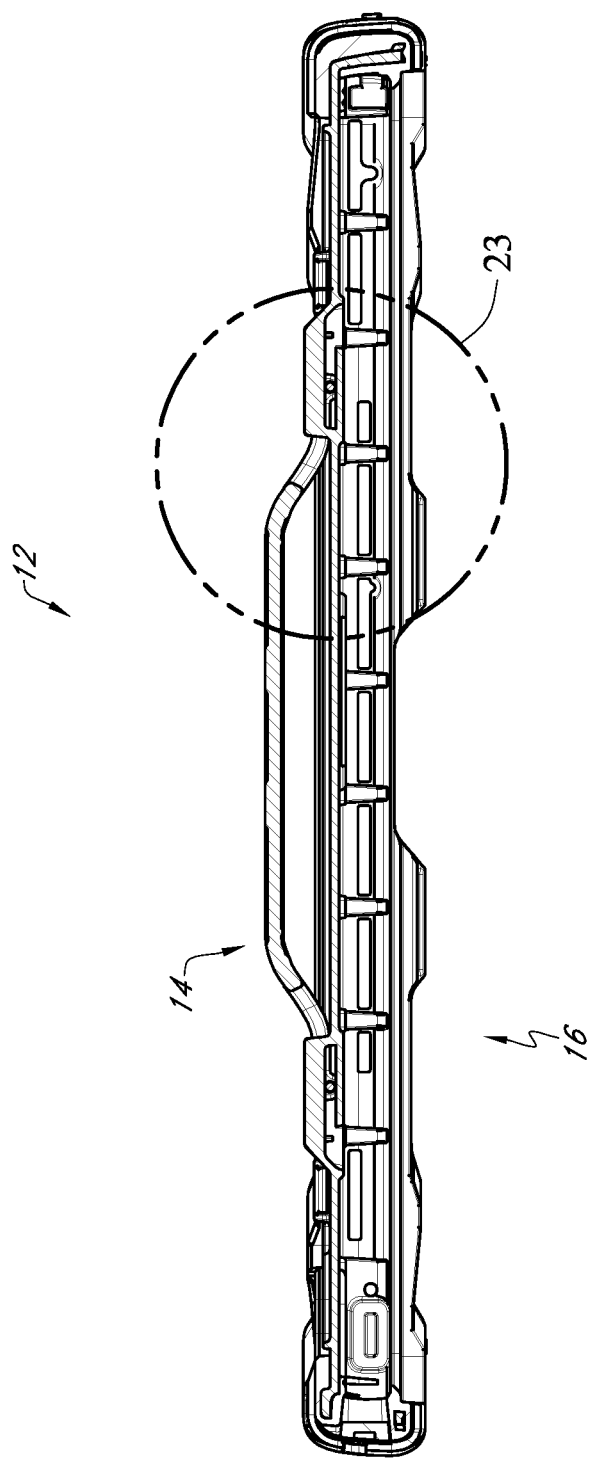
FIG. 22 is a side elevational cross-sectional view of the tablet case assembly, hand strap, and track pin of FIG. 21 taken along the cut line 22-22 shown in FIG. 21 with the hand strap depicted as coupled in second positional adjustment with the tablet case assembly.

Turning to FIG. 22, depicted therein is side elevational cross-sectional view of tablet case assembly 12, hand strap 10, and track pin 10/1*a* of FIG. 21 taken along cut line 22-22 shown in FIG. 21 with hand strap 10 depicted as coupled in second positional adjustment with tablet case assembly 12.

Figure 23:
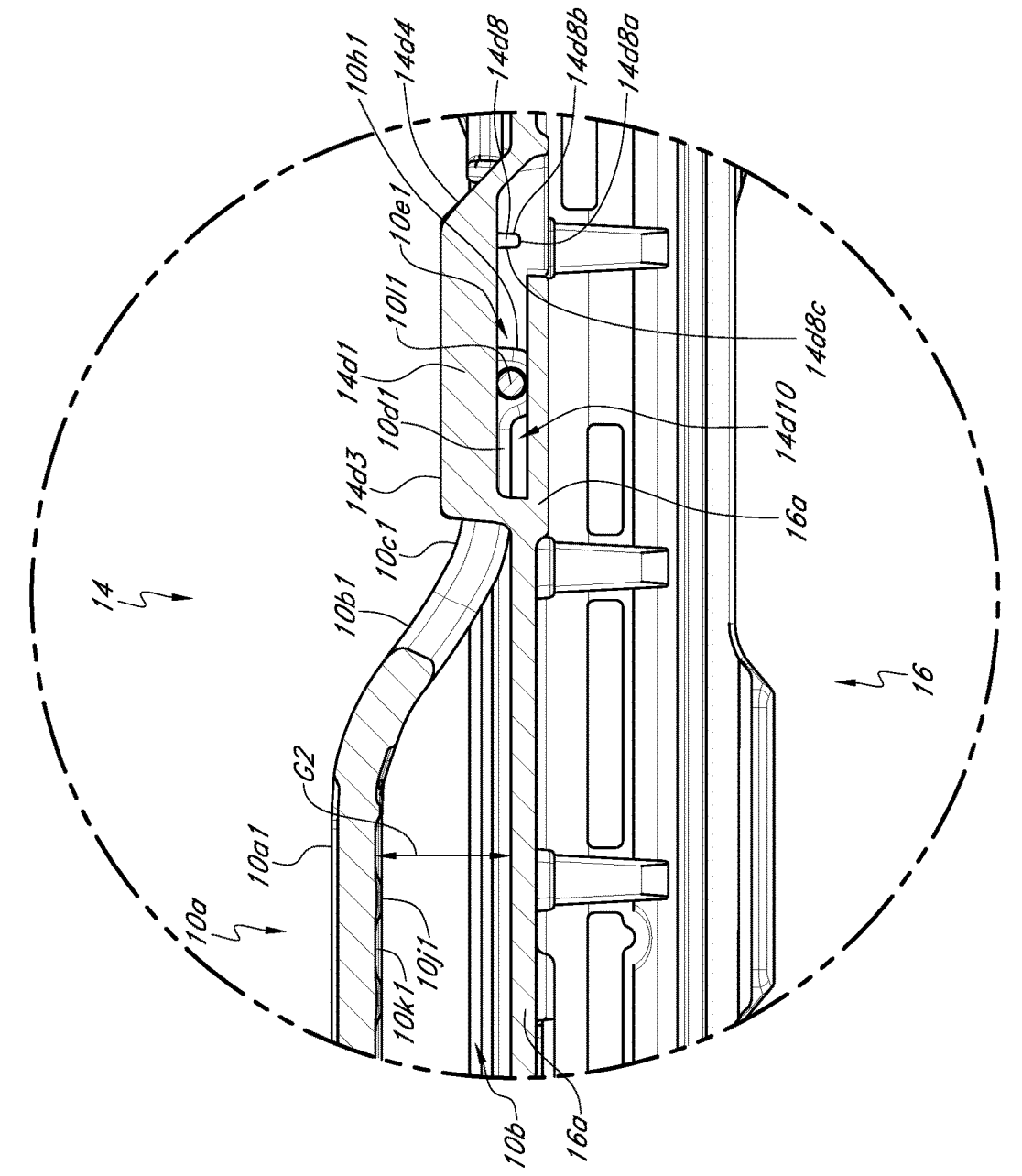
FIG. 23 is an enlarged cross-sectional view of a dashed-circle portion of the tablet case assembly, hand strap, and track pin of FIG. 22 labeled "23" shown in FIG. 22 with the hand strap depicted as coupled in second positional adjustment with the tablet case assembly.

Turning to FIG. 23, depicted therein is an enlarged cross-sectional view of dashed-circle portion of tablet case assembly 12, hand strap 10, and track pin 10/1*a* of FIG. 22 labeled "23" shown in FIG. 22 with hand strap 10 depicted as coupled in second positional adjustment with second gap distance G2 from tablet case assembly 12.

Figure 24:
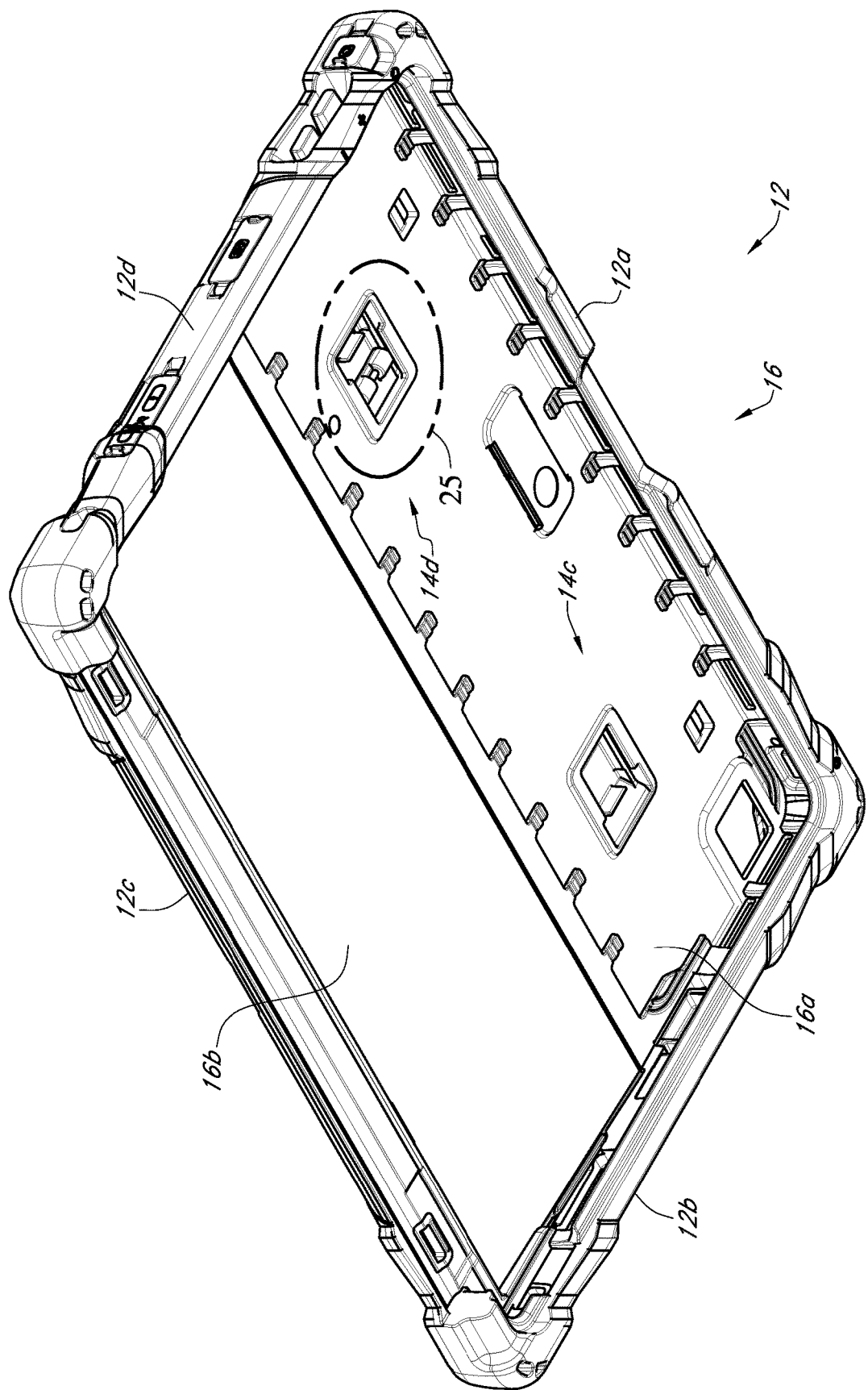
FIG. 24 is an anterior perspective view of the tablet case assembly of FIG. 4 along with hand strap of FIG. 1 engaged with the track pin of FIG. 9 with the hand strap depicted as coupled in second positional adjustment with the tablet case assembly.

Turning to FIG. 24, depicted therein is an anterior perspective view of tablet case assembly 12 of FIG. 4 along with hand strap 10 of FIG. 1 engaged with track pin 10/1a of FIG. 9 with hand strap 10 depicted as coupled in second positional adjustment with tablet case assembly 12.

Figure 25:
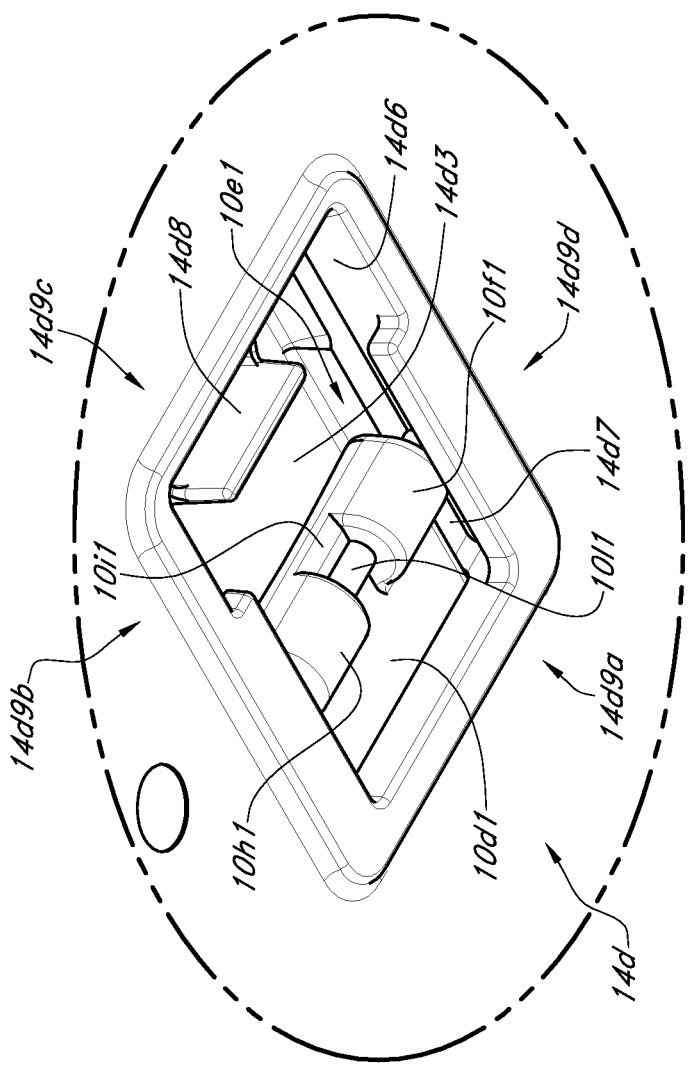
FIG. 25 is an enlarged perspective view of a dashed-circle portion of the tablet case assembly, hand strap, and track pin of FIG. 24 labeled "25" shown in FIG. 25 with the hand strap depicted as coupled in second positional adjustment with the tablet case assembly.

Turning to FIG. 25, depicted therein is an enlarged perspective view of dashed-circle portion of tablet case assembly 12, hand strap 10, and track pin 10/1a of FIG. 24 labeled "25" shown in FIG. 25 with hand strap 10 depicted as coupled in second positional adjustment with tablet case assembly 12.

Figure 26:
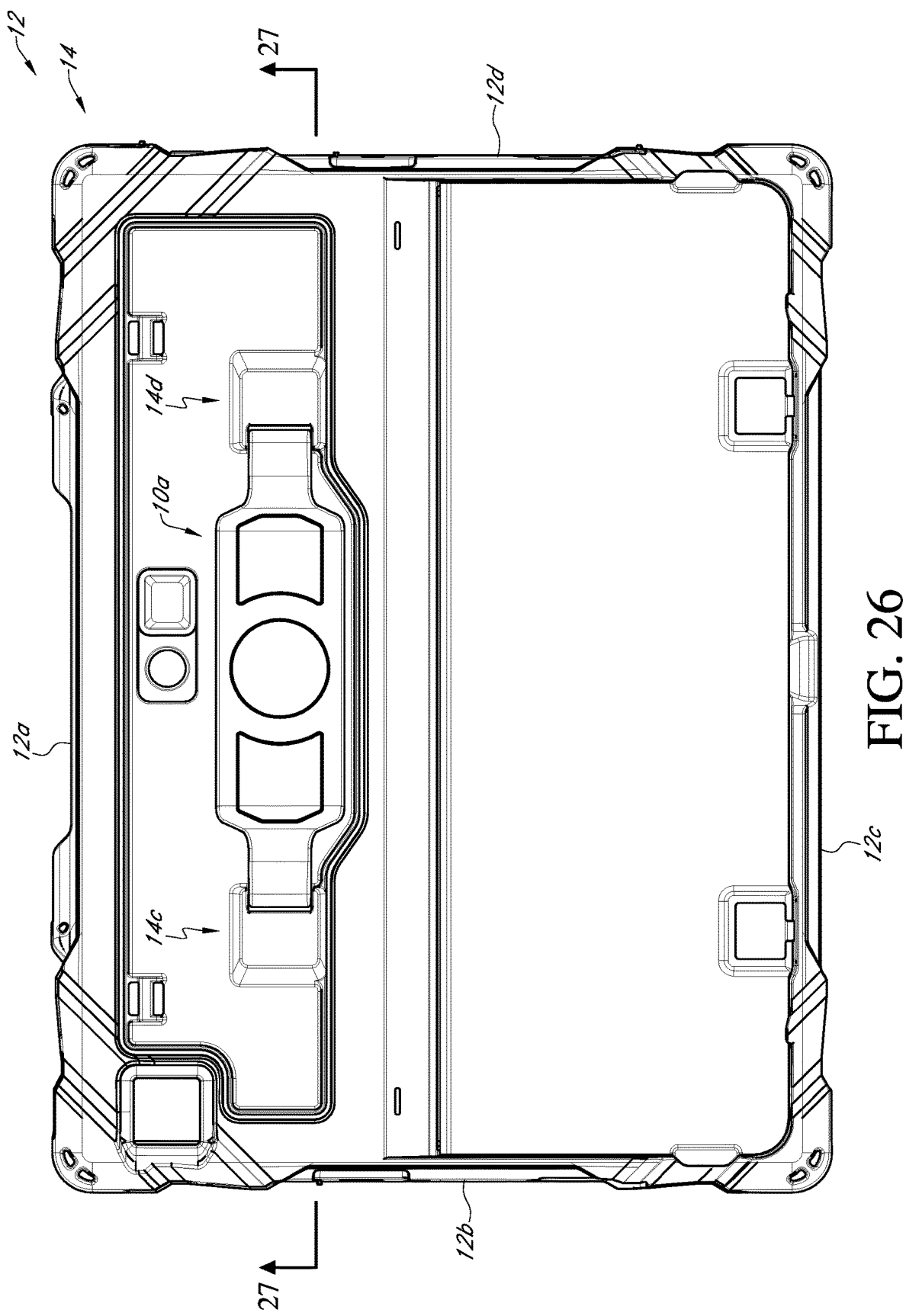
FIG. 26 is a top plan view of the tablet case assembly of FIG. 4 along with hand strap of FIG. 1 engaged with the track pin of FIG. 9 with the hand strap depicted as coupled in third positional adjustment with the tablet case assembly.

Turning to FIG. 26, depicted therein is top plan view of tablet case assembly 12 of FIG. 4 along with hand strap 10 of FIG. 1 engaged with track pin 10/1a of FIG. 9 with hand strap 10 depicted as coupled in third positional adjustment with tablet case assembly 12.

Figure 27:
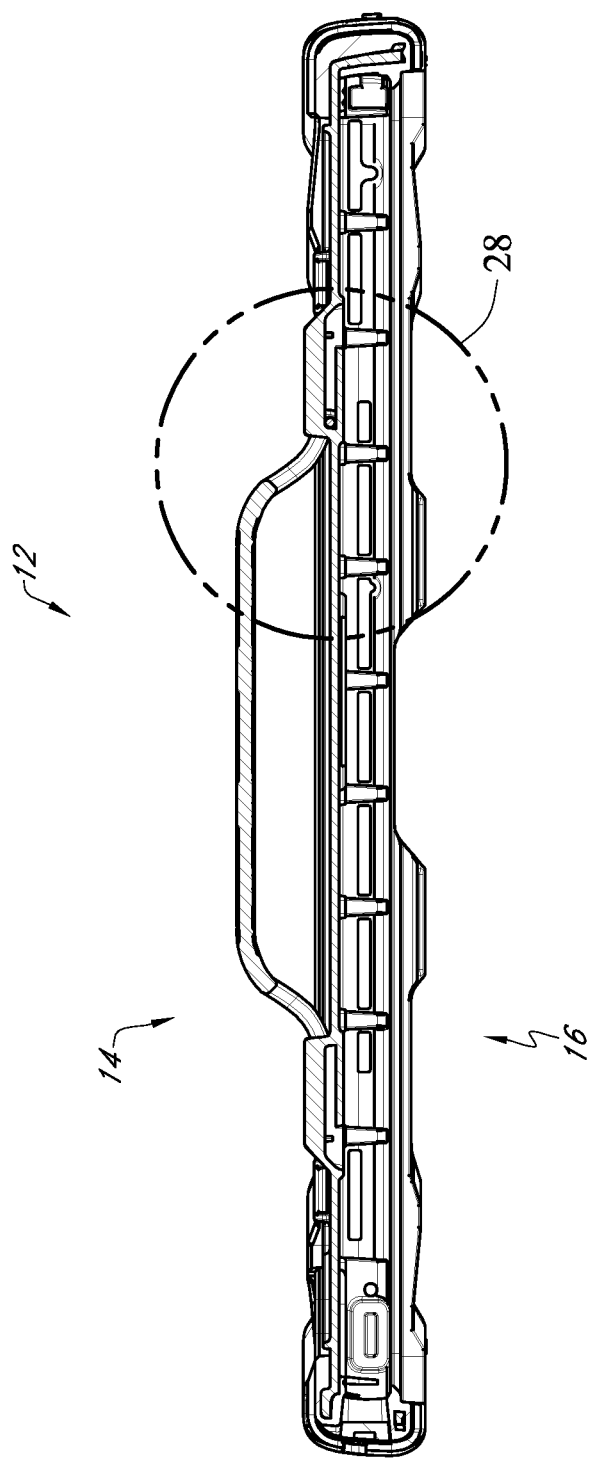
FIG. 27 is a side elevational cross-sectional view of the tablet case assembly, hand strap, and track pin of FIG. 26 taken along the cut line 27-27 shown in FIG. 26 with the hand strap depicted as coupled in third positional adjustment with the tablet case assembly.

Turning to FIG. 27, depicted therein is side elevational cross-sectional view of tablet case assembly 12, hand strap 10, and track pin 10/1a of FIG. 26 taken along cut line 27-27 shown in FIG. 26 with hand strap 10 depicted as coupled in third positional adjustment with tablet case assembly 12.

Figure 28:
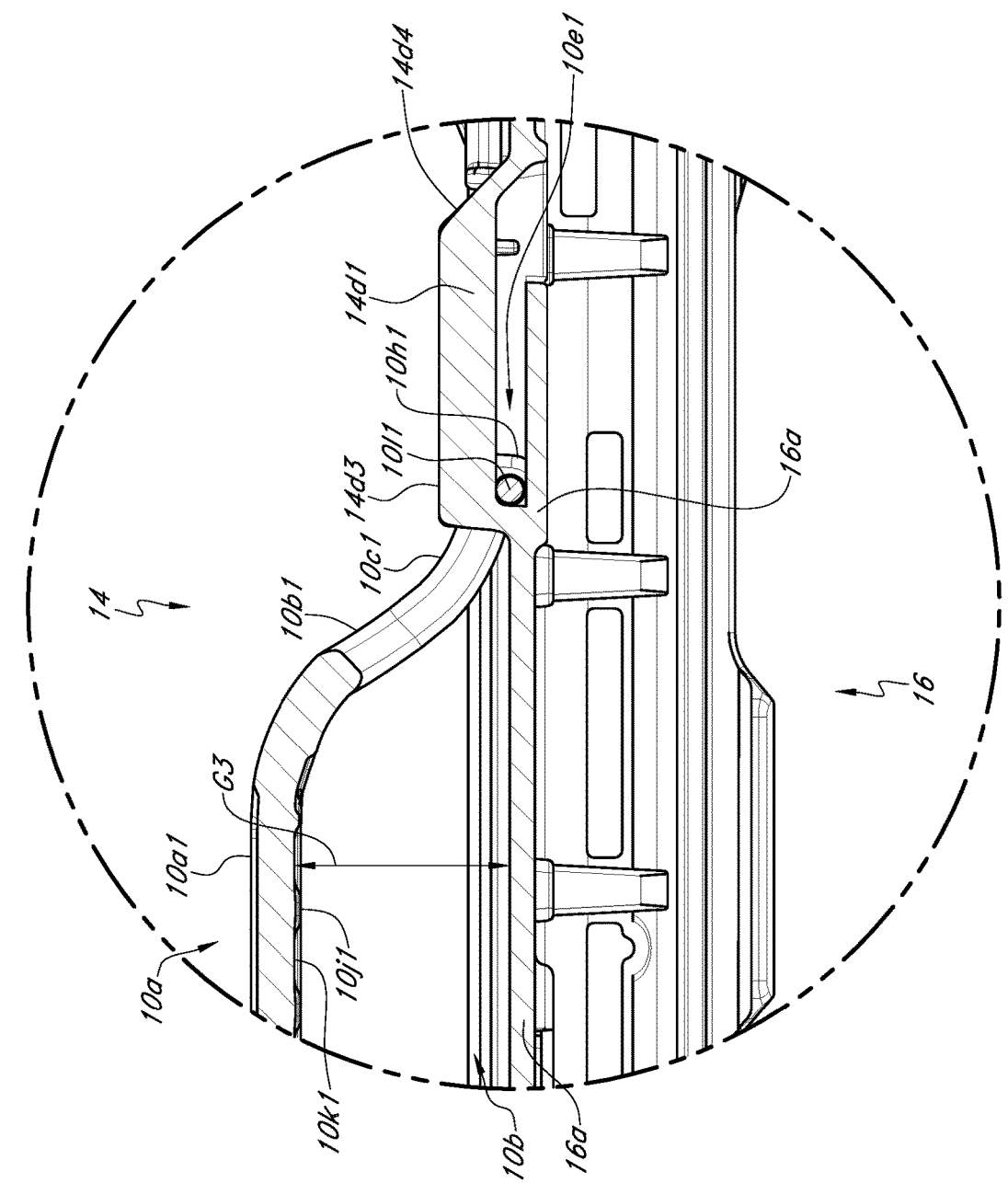
FIG. 28 is an enlarged cross-sectional view of a dashed-circle portion of the tablet case assembly, hand strap, and track pin of FIG. 27 labeled "28" shown in FIG. 27 with the hand strap depicted as coupled in third positional adjustment with the tablet case assembly.

Turning to FIG. 28, depicted therein is an enlarged cross-sectional view of dashed-circle portion of tablet case assembly 12, hand strap 10, and track pin 10/1a of FIG. 27 labeled "28" shown in FIG. 27 with hand strap 10 depicted as coupled in third positional adjustment with third gap distance G3 from tablet case assembly 12. As depicted, third gap distance G3 is greater than second gap distance G2. As depicted, second gap distance G2 is greater than first gap distance G1.

Figure 29:
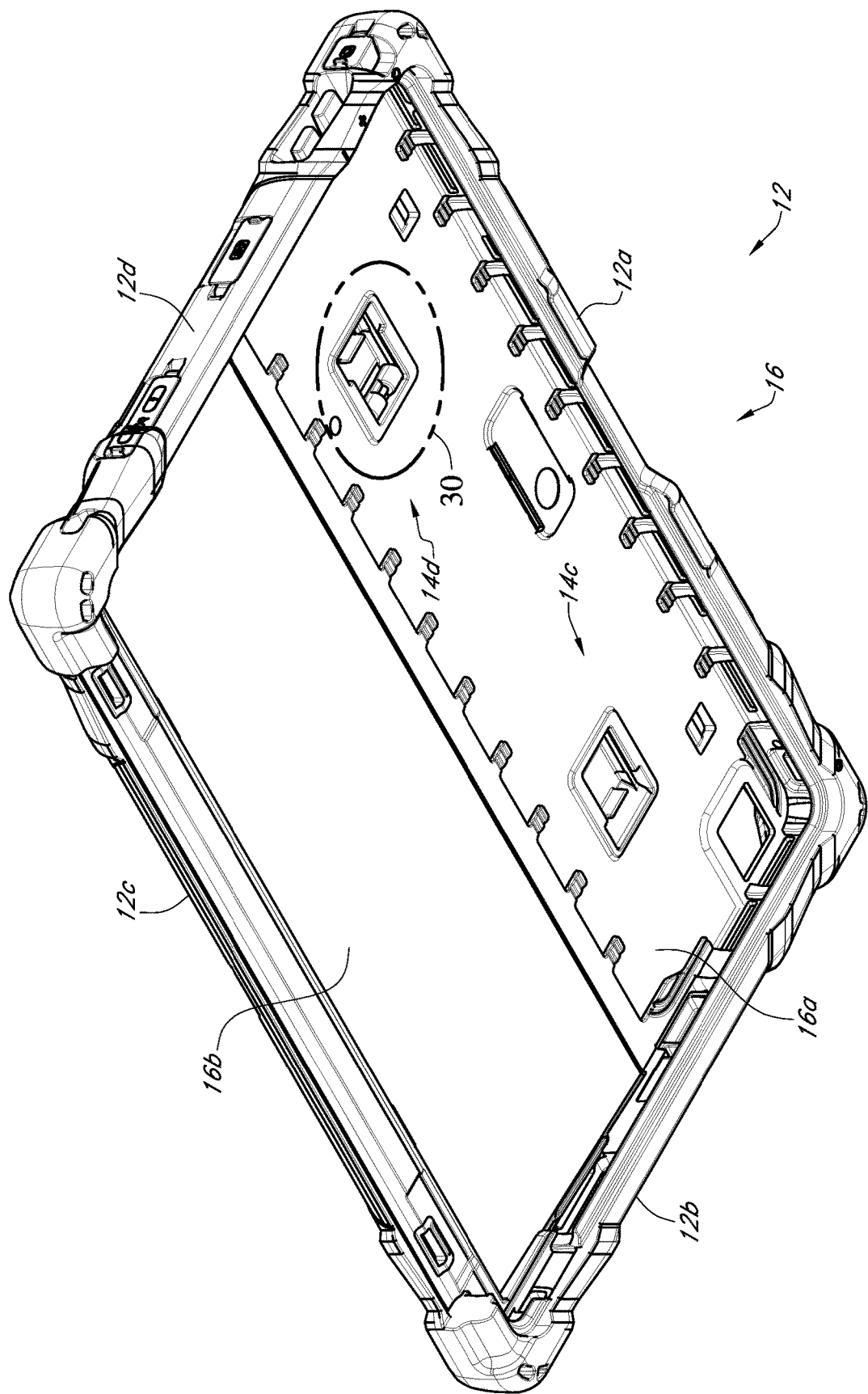
FIG. 29 is an anterior perspective view of the tablet case assembly of FIG. 4 along with hand strap of FIG. 1 engaged with the track pin of FIG. 9 with the hand strap depicted as coupled in third positional adjustment with the tablet case assembly.

Turning to FIG. 29, depicted therein is an anterior perspective view of tablet case assembly 12 of FIG. 4 along with hand strap 10 of FIG. 1 engaged with track pin 10/1a of FIG. 9 with hand strap 10 depicted as coupled in third positional adjustment with tablet case assembly 12.

Figure 30:
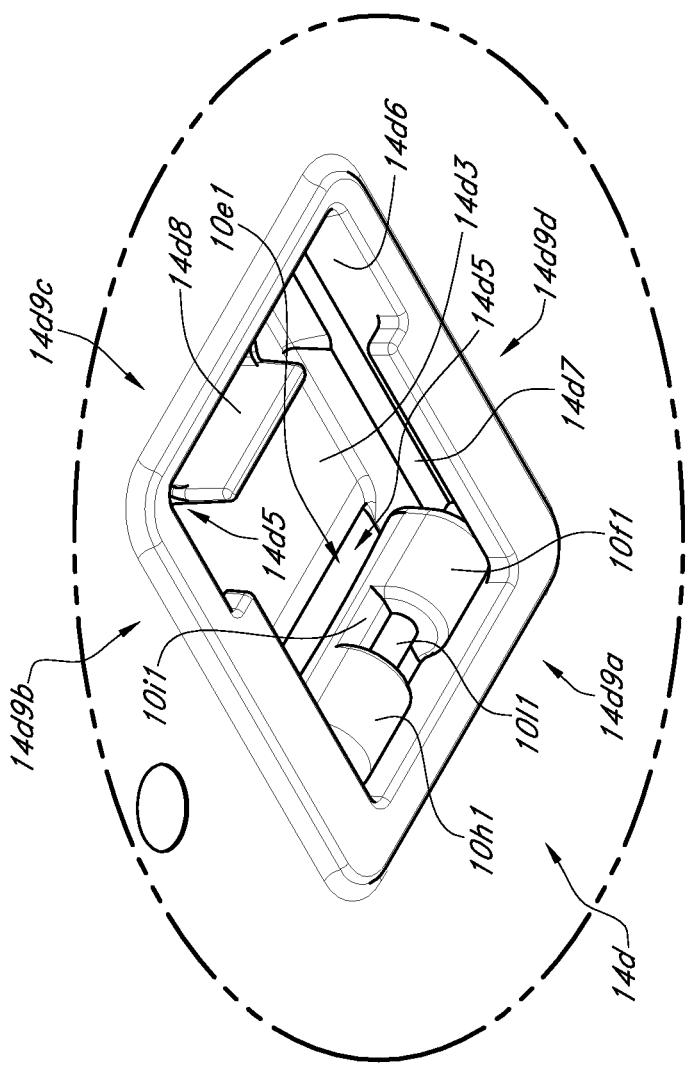
FIG. 30 is an enlarged perspective view of a dashed-circle portion of the tablet case assembly, hand strap, and track pin of FIG. 29 labeled "30" shown in FIG. 29 with the hand strap depicted as coupled in third positional adjustment with the tablet case assembly.

Turning to FIG. 30, depicted therein is an enlarged perspective view of dashed-circle portion of tablet case assembly 12, hand strap 10, and track pin 10/1a of FIG. 29 labeled "30" shown in FIG. 29 with hand strap 10 depicted as coupled in third positional adjustment with tablet case assembly 12.

Turning to FIG. 31, depicted therein is posterior perspective view of tablet case assembly 12 of FIG. 4 depicted as containing tablet computing assembly 100 along with hand strap 10 of FIG. 1 engaged with track pin 10/1a of FIG. 9 with hand strap 10 depicted as coupled in first positional adjustment with tablet case assembly 12. In implementations, tablet computing assembly 100 includes tablet edge 100a.

Figure 32:
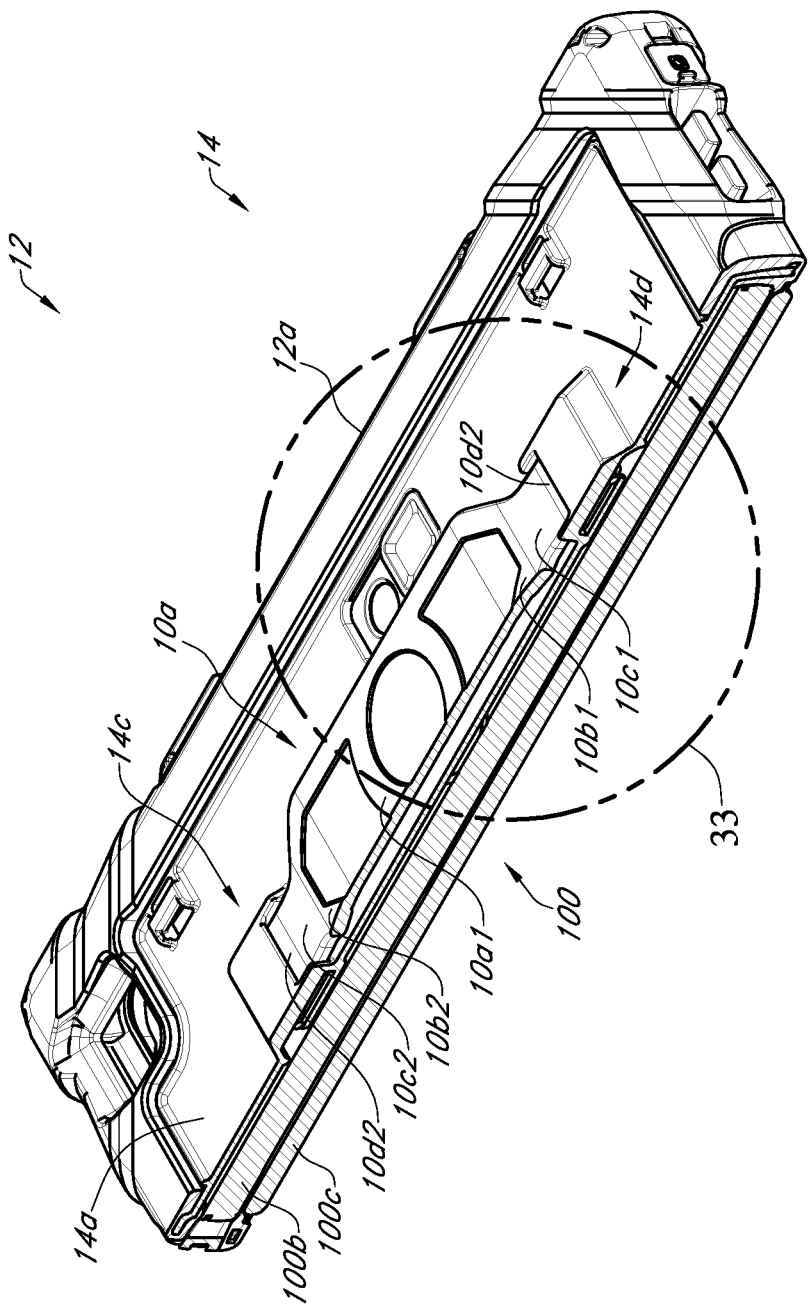
FIG. 32 is a cross-sectional posterior perspective view of the tablet case assembly, tablet computing assembly, hand strap, and track pin of FIG. 31 taken along the cut line 32-32 shown in FIG. 31 with the hand strap depicted as coupled in first positional adjustment with the tablet case assembly.

Turning to FIG. 32, depicted therein is cross-sectional posterior perspective view of tablet case assembly 12, tablet computing assembly, hand strap 10, and track pin 10/1a of FIG. 31 taken along cut line 32-32 shown in FIG. 31 with hand strap 10 depicted as coupled in first positional adjustment with tablet case assembly 12. In implementations, tablet computing assembly 100 includes tablet computing device 100b and keyboard 100c.

Figure 33:
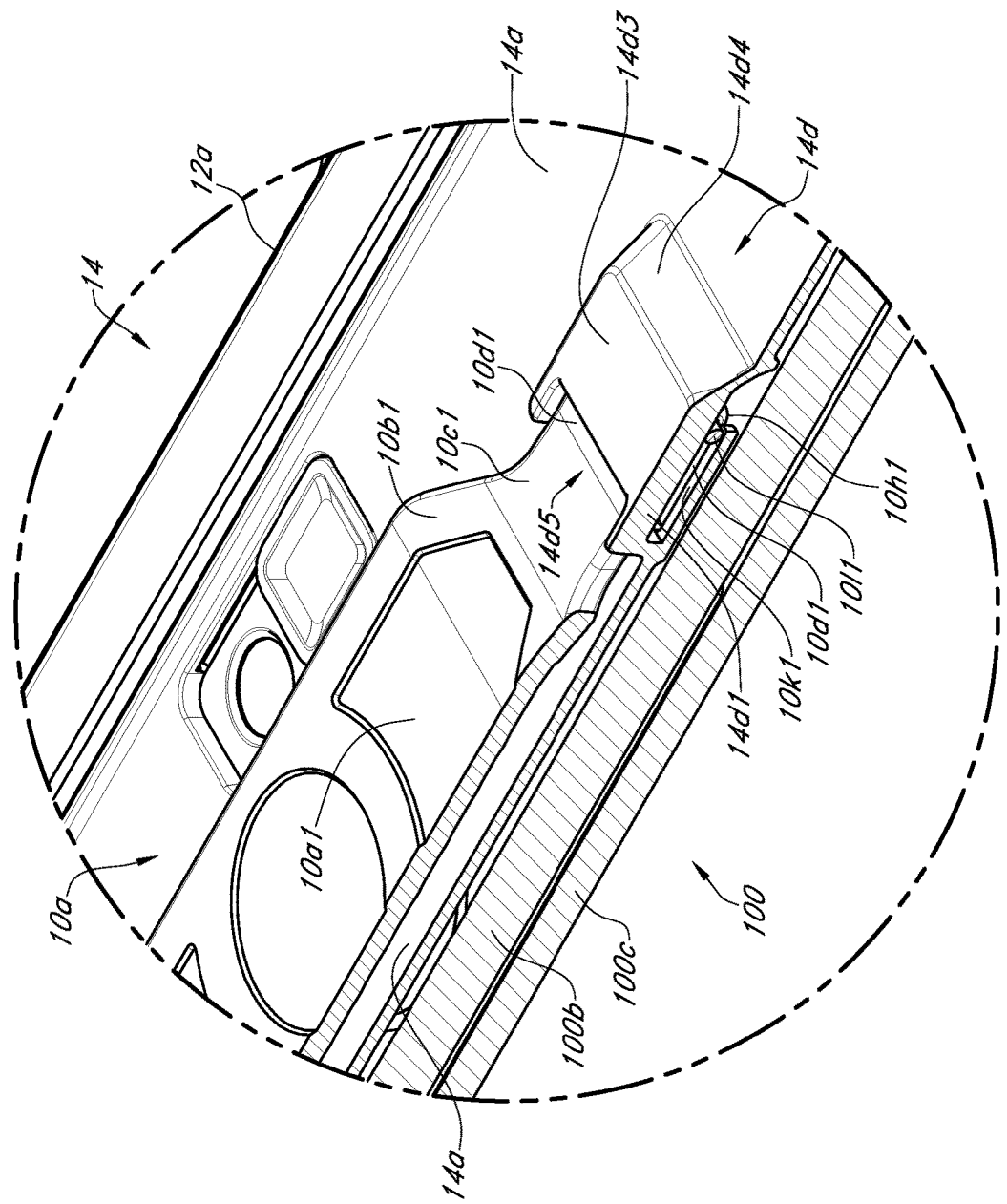
FIG. 33 is an enlarged perspective view of a dashed-circle portion of the tablet case assembly, tablet computing assembly, hand strap, and track pin of FIG. 32 labeled "33" shown in FIG. 32 with the hand strap depicted as coupled in first positional adjustment with the tablet case assembly.

Turning to FIG. 33, depicted therein is an enlarged perspective view of dashed-circle portion of tablet case assembly 12, tablet computing assembly, hand strap 10, and track pin 10/1a of FIG. 32 labeled "33" shown in FIG. 32 with hand strap 10 depicted as coupled in first positional adjustment with tablet case assembly 12.

Figure 34:
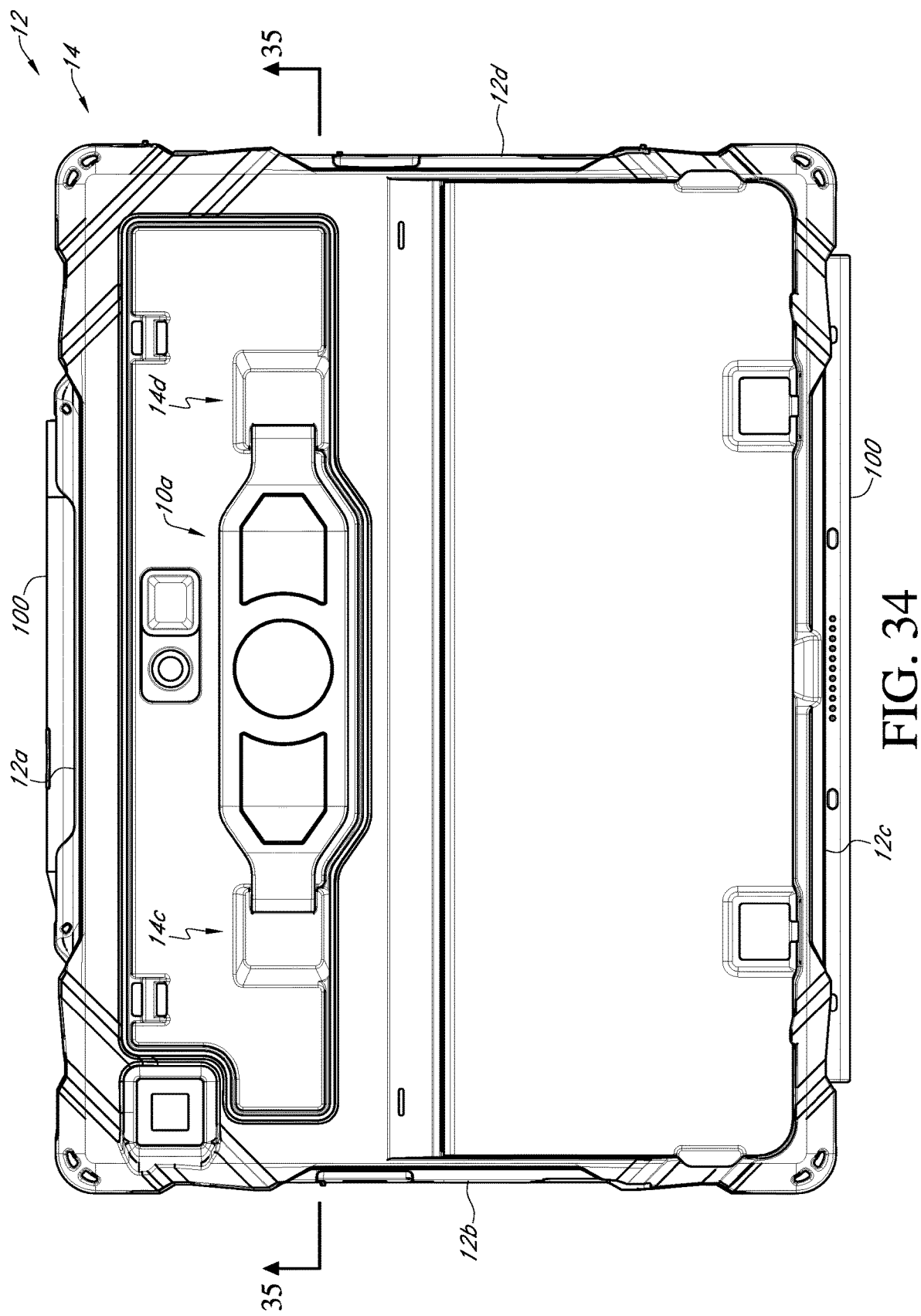
FIG. 34 is a top plan view of the tablet case assembly of FIG. 4 containing tablet computing assembly of FIG. 31 along with hand strap of FIG. 1 engaged with the track pin of FIG. 9 with the hand strap depicted as coupled in first positional adjustment with the tablet case assembly.

Turning to FIG. 34, depicted therein is top plan view of tablet case assembly 12 of FIG. 4 containing tablet computing assembly of FIG. 31 along with hand strap 10 of FIG. 1 engaged with track pin 10/1a of FIG. 9 with hand strap 10 depicted as coupled in first positional adjustment with tablet case assembly 12.

Figure 35:
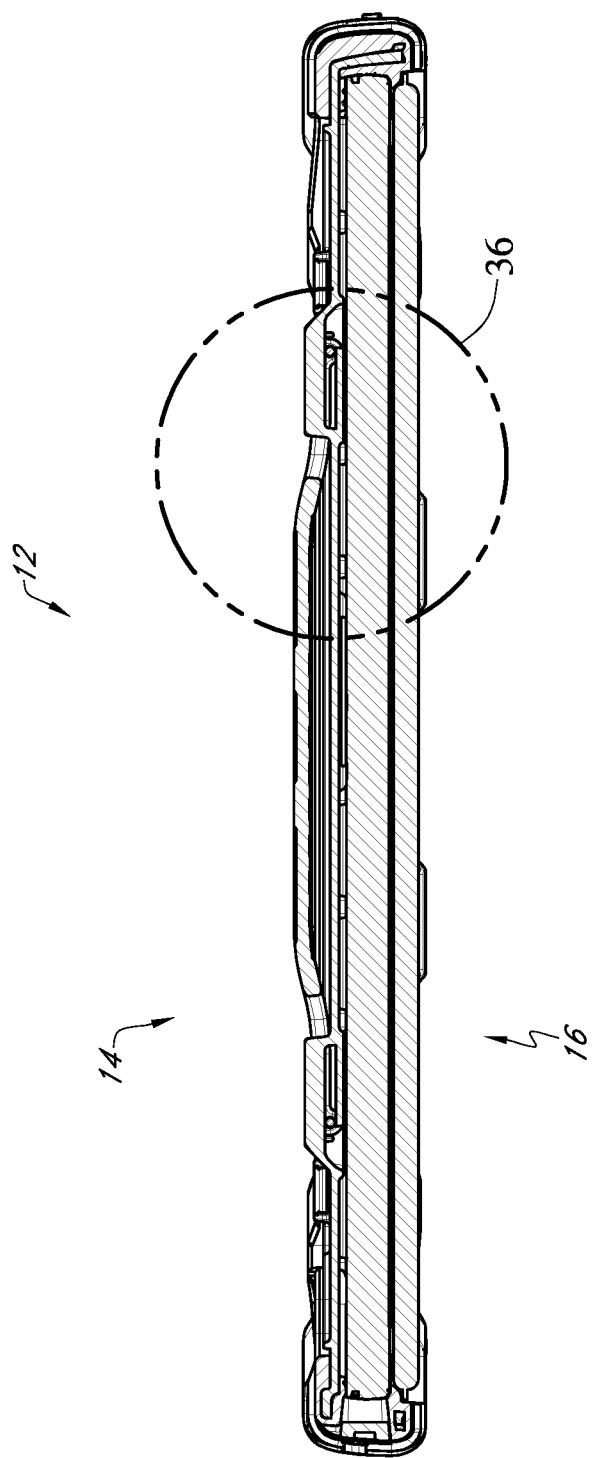
FIG. 35 is a side elevational cross-sectional view of the tablet case assembly, tablet computing assembly, hand strap, and track pin of FIG. 34 taken along the cut line 35-35 shown in FIG. 34 with the hand strap depicted as coupled in first positional adjustment with the tablet case assembly.

Turning to FIG. 35, depicted therein is side elevational cross-sectional view of tablet case assembly 12, tablet computing assembly, hand strap 10, and track pin 10/1a of FIG. 34 taken along cut line 35-35 shown in FIG. 34 with hand strap 10 depicted as coupled in first positional adjustment with tablet case assembly 12.

Figure 36:
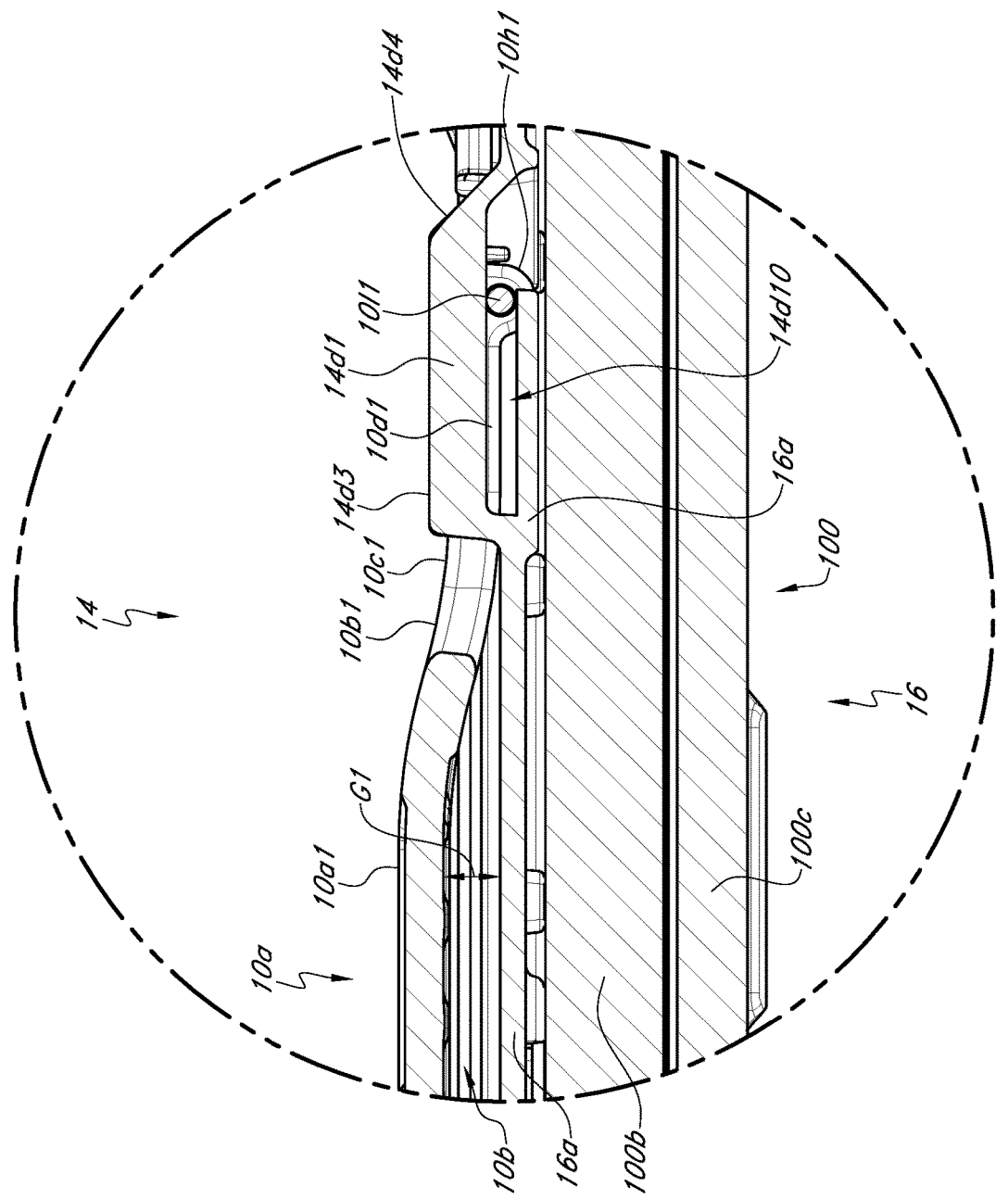
FIG. 36 is an enlarged elevational cross-sectional view of a dashed-circle portion of the tablet case assembly, tablet computing assembly, hand strap, and track pin of FIG. 35 labeled "36" shown in FIG. 35 with the hand strap depicted as coupled in first positional adjustment with the tablet case assembly.

Turning to FIG. 36, depicted therein is an enlarged elevational cross-sectional view of dashed-circle portion of tablet case assembly 12, tablet computing assembly, hand strap 10, and track pin 10/1a of FIG. 35 labeled "36" shown in FIG. 35 with hand strap 10 depicted as coupled in first positional adjustment with tablet case assembly 12.

Figure 37:
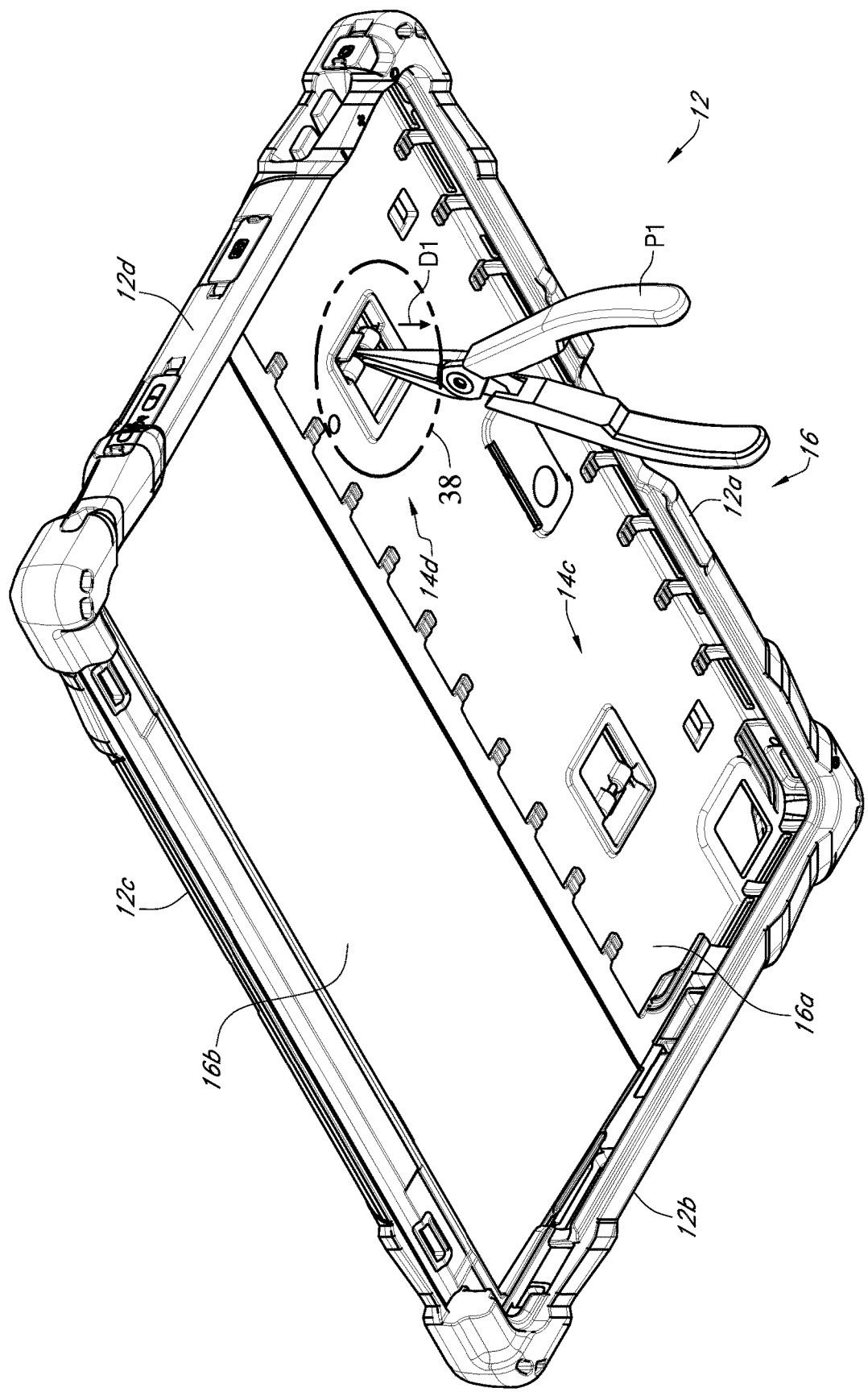
FIG. 37 is an anterior perspective view of the tablet case assembly of FIG. 4 along with hand strap of FIG. 1 engaged with the track pin of FIG. 9 with the hand strap and track pin starting to be pushed against stop tab by pliers for the hand strap and track pin to be disassembled from the tablet case assembly.

Turning to FIG. 37, depicted therein is an anterior perspective view of tablet case assembly 12 of FIG. 4 along with hand strap 10 of FIG. 1 engaged with track pin 10/1a of FIG. 9 with hand strap 10 and track pin 10/1a starting to be pushed against stop tab as unflexed 14d8 with force being less than a threshold force to causing flexing by pliers P1 for hand strap 10 and track pin 10/1a to be disassembled from tablet case assembly 12. In implementations, pliers P1 is used to grab track pin 10/1 as exposed by gap 10i1 to pull in first direction D1 for removal of track pin 10/1 from tablet case assembly 12.

Figure 38:
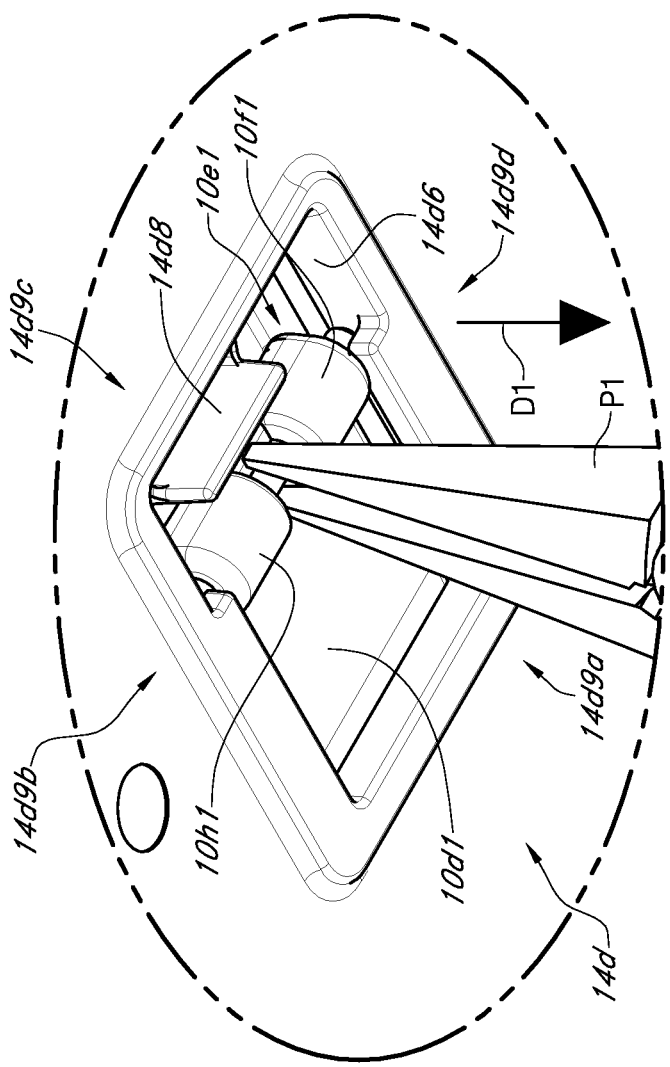
FIG. 38 is an enlarged perspective view of a dashed-circle portion of the tablet case assembly, hand strap, track pin, stop tab, pliers of FIG. 37 labeled "38" shown in FIG. 37.

Turning to FIG. 38, depicted therein is an enlarged perspective view of dashed-circle portion of tablet case assembly 12, hand strap 10, track pin 10/1a, stop tab as unflexed 14d8, pliers of FIG. 37 labeled "38" shown in FIG. 37.

Figure 38A:
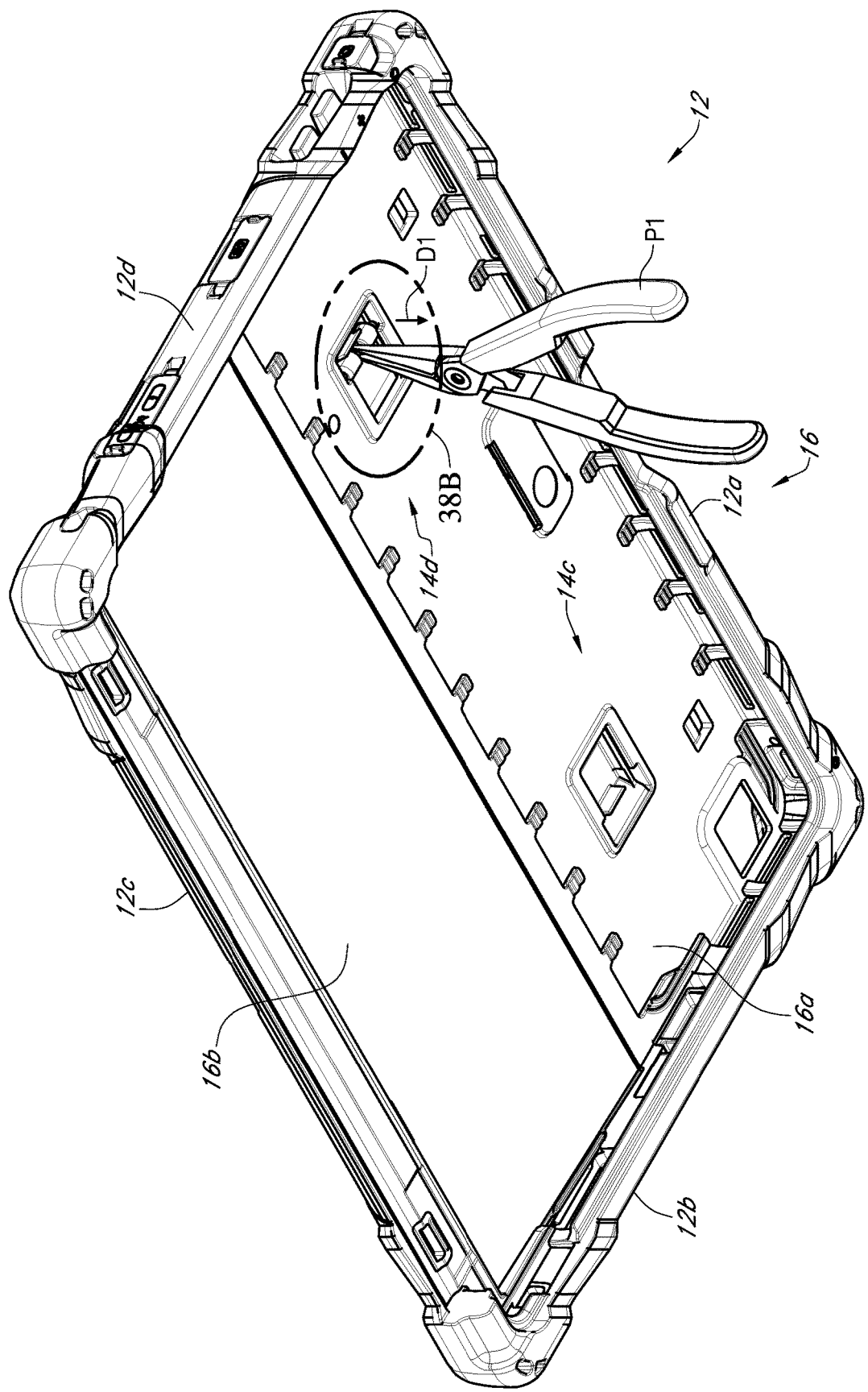
FIG. 38A is an anterior perspective view of the tablet case assembly of FIG. 4 along with hand strap of FIG. 1 engaged with the track pin of FIG. 9 with the hand strap and track pin starting to be removed from the tablet case assembly by pliers for the hand strap and track pin to be disassembled from the tablet case assembly.

Turning to FIG. 38A, depicted therein is an anterior perspective view of tablet case assembly 12 of FIG. 4 along with hand strap 10 of FIG. 1 engaged with track pin 10/1a of FIG. 9 with hand strap 10 and track pin 10/1a starting to be removed from tablet case assembly 12 by pliers for hand strap 10 and track pin 10/1a to be disassembled from tablet case assembly 12.

Figure 38B:
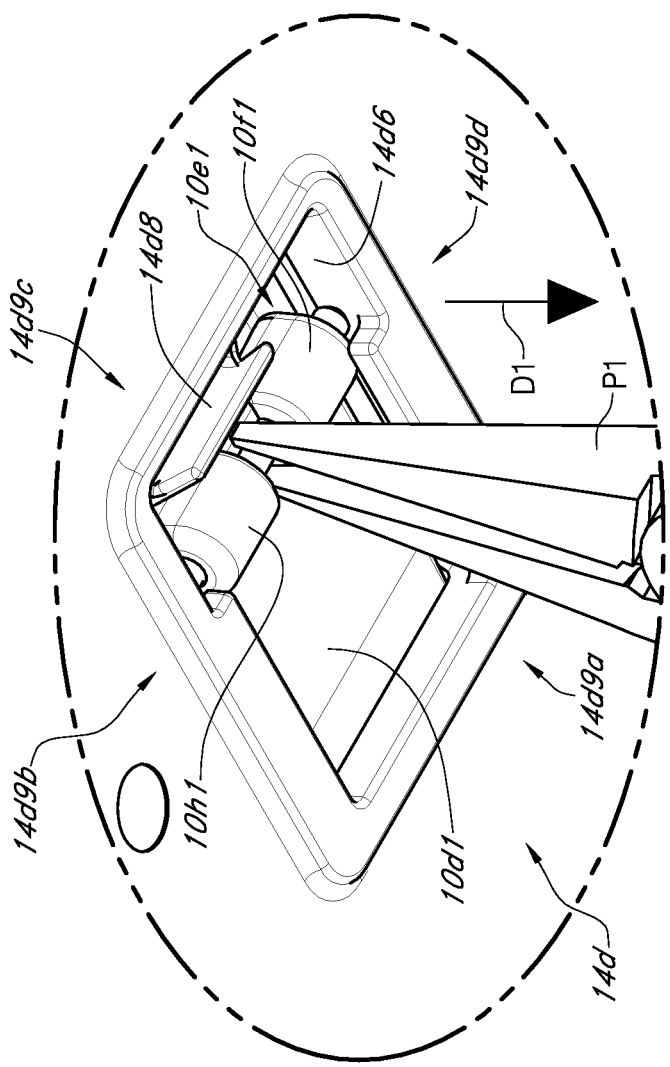
FIG. 38B is an enlarged perspective view of a dashed-circle portion of the tablet case assembly, hand strap, track pin, stop tab, pliers of FIG. 38A labeled "38B" shown in FIG. 38A.

Turning to FIG. 38B, depicted therein is an enlarged perspective view of dashed-circle portion of tablet case assembly 12, hand strap 10, track pin 10/1a, stop tab as flexed 14d10, pliers of FIG. 38 labeled "38B" shown in FIG. 38A.

Figure 38C:
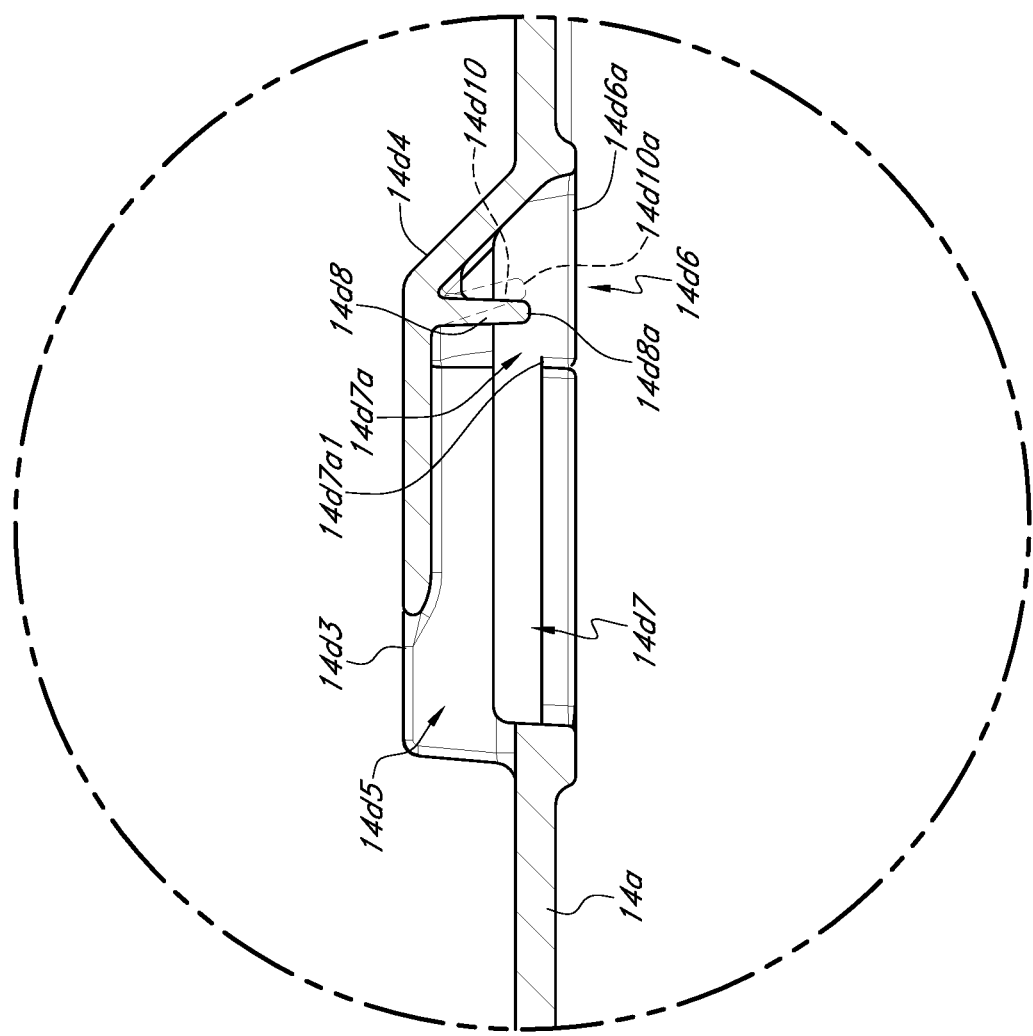
FIG. 38C is an enlarged perspective view of a dashed-circle portion of the tablet case assembly of FIG. 6D labeled "6E" shown in FIG. 6D with additional elaboration regarding stop tab of FIG. 38B.

Turning to FIG. 38C, depicted therein is an enlarged perspective view of dashed-circle portion of tablet case assembly 12 of FIG. 6D labeled "6E" shown in FIG. 6D with additional elaboration regarding stop tab as flexed 14d10 of FIG. 38B.

Figure 39:
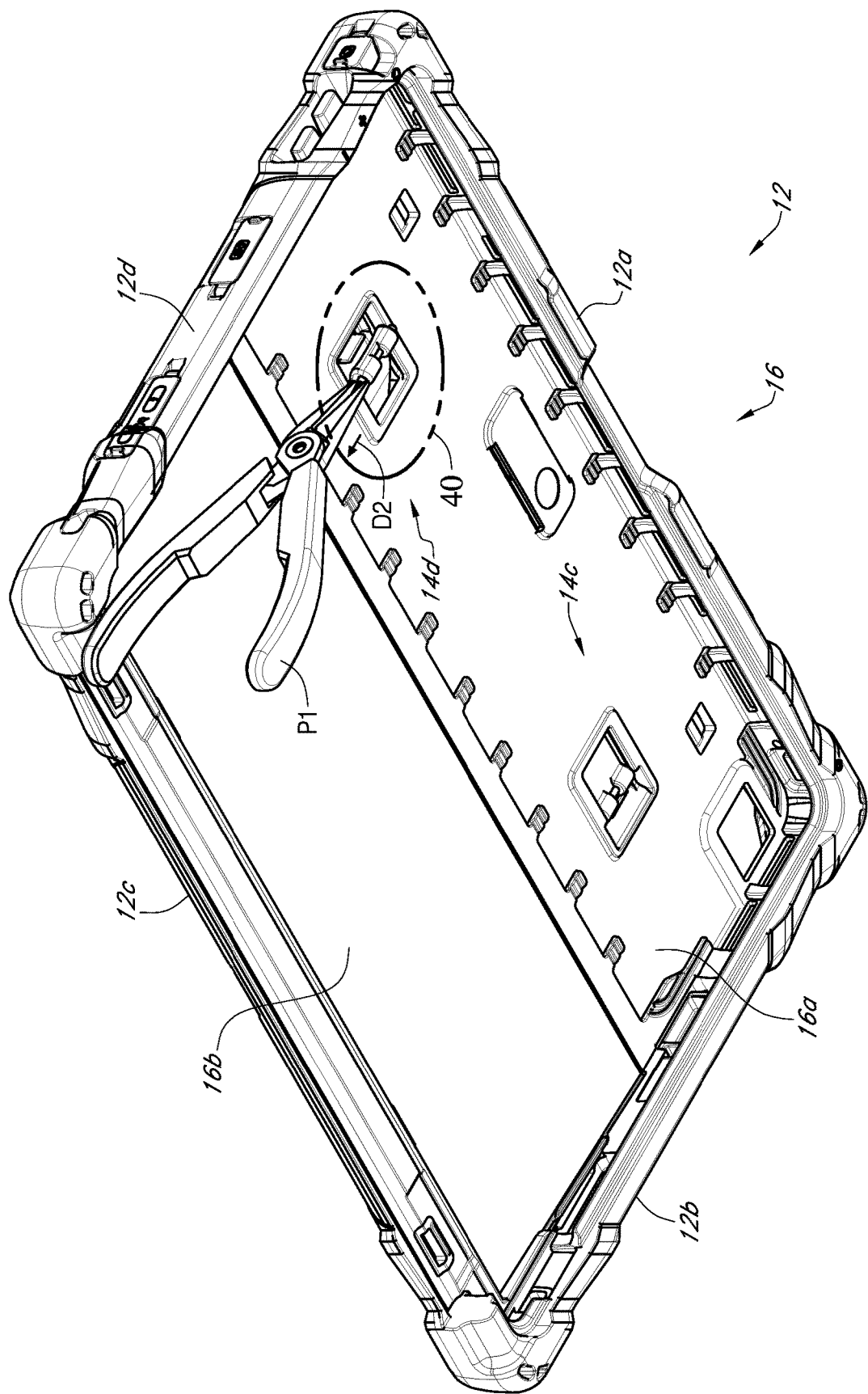
FIG. 39 is an anterior perspective view of the tablet case assembly of FIG. 4 along with hand strap of FIG. 1 engaged with the track pin of FIG. 9 with the hand strap partially removed and track pin removed from the tablet case assembly and being removed from hand strap by pliers for the hand strap and track pin to be disassembled from the tablet case assembly.

Turning to FIG. 39, depicted therein is an anterior perspective view of tablet case assembly 12 of FIG. 4 along with hand strap 10 of FIG. 1 engaged with track pin 10/1a of FIG. 9 with hand strap 10 partially removed and track pin 10/1a removed from tablet case assembly 12 and being removed from hand strap 10 by pliers for hand strap 10 and track pin 10/1a to be disassembled from tablet case assembly 12. In implementations, pliers P1 is depicted grabbing second end portion 10/1b to pull in second direction D2 for removal of second end portion 10/1b from hand strap 10.

Figure 40:
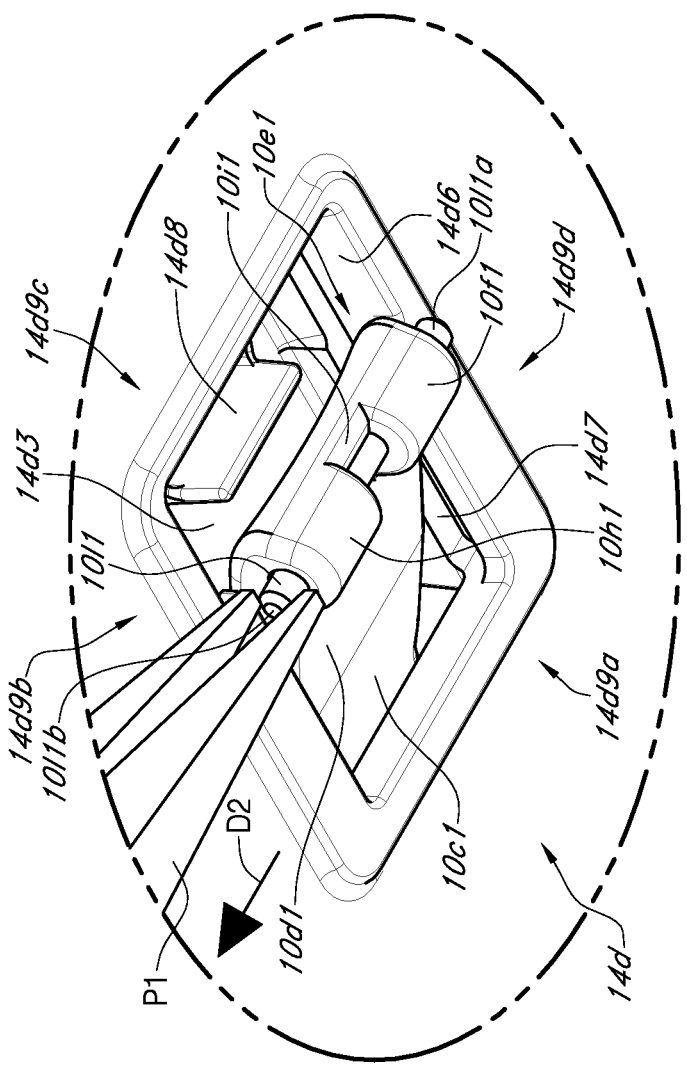
FIG. 40 is an enlarged perspective view of a dashed-circle portion of the tablet case assembly, hand strap, track pin, stop tab, pliers of FIG. 39 labeled "40" shown in FIG. 39.

Turning to FIG. 40, depicted therein is an enlarged perspective view of dashed-circle portion of tablet case assembly 12, hand strap 10, track pin 10/1a, stop tab, pliers of FIG. 39 labeled "40" shown in FIG. 39.

Figure 41:
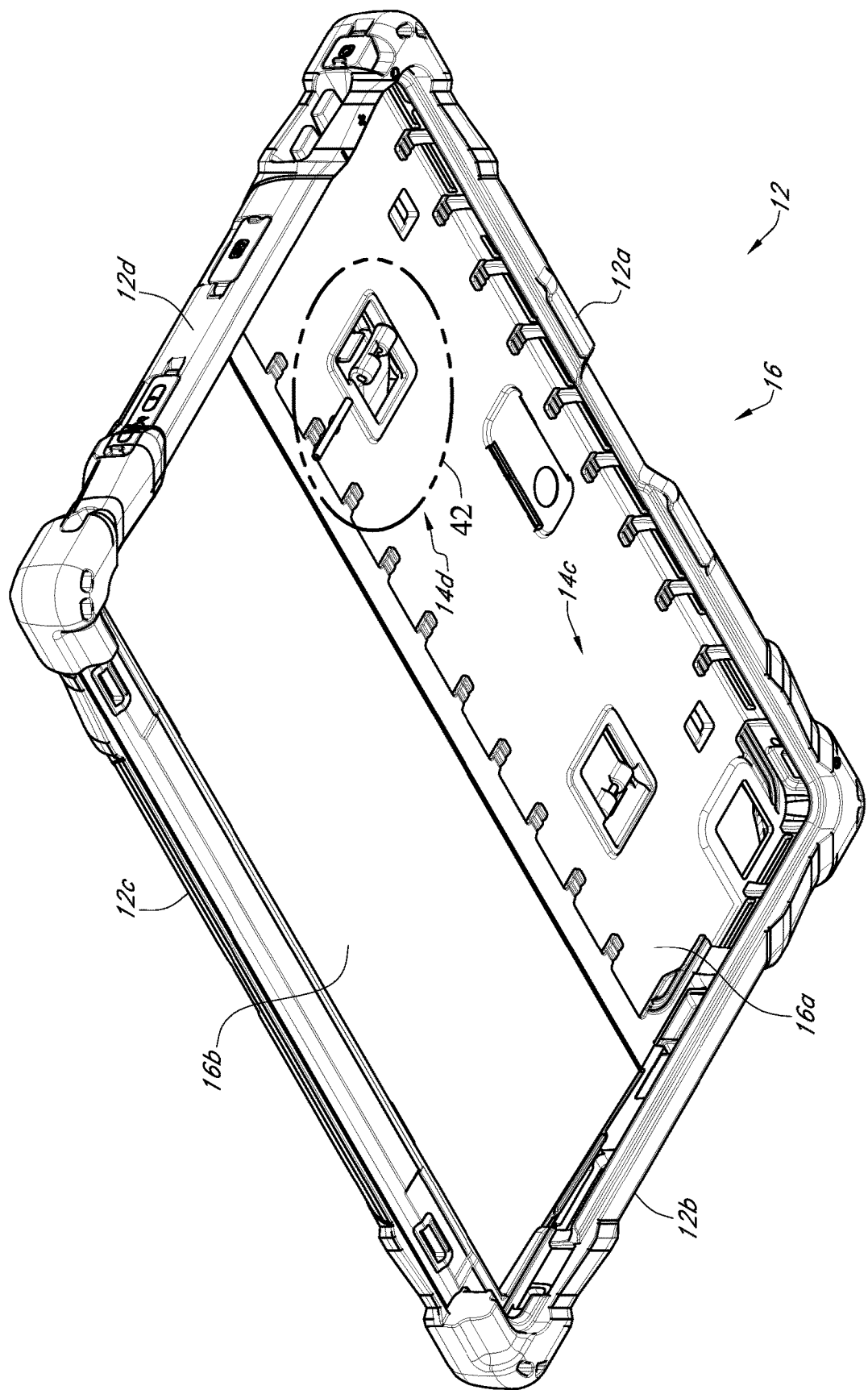
FIG. 41 is an anterior perspective view of the tablet case assembly of FIG. 4 along with hand strap of FIG. 1 engaged with the track pin of FIG. 9 with the hand strap partially removed and track pin removed from the tablet case assembly and removed from hand strap so that the hand strap can be disassembled from the tablet case assembly.

Turning to FIG. 41, depicted therein is an anterior perspective view of the tablet case assembly 12 of FIG. 4 along with hand strap 10 of FIG. 1 engaged with the track pin 10/1 of FIG. 9 with hand strap 10 partially removed and track pin 10/1*a* removed from tablet case assembly 12 and removed from hand strap 10 so that hand strap 10 can be disassembled from tablet case assembly 12 by pulling hand strap 10 out of tablet case assembly 12.

Figure 42:
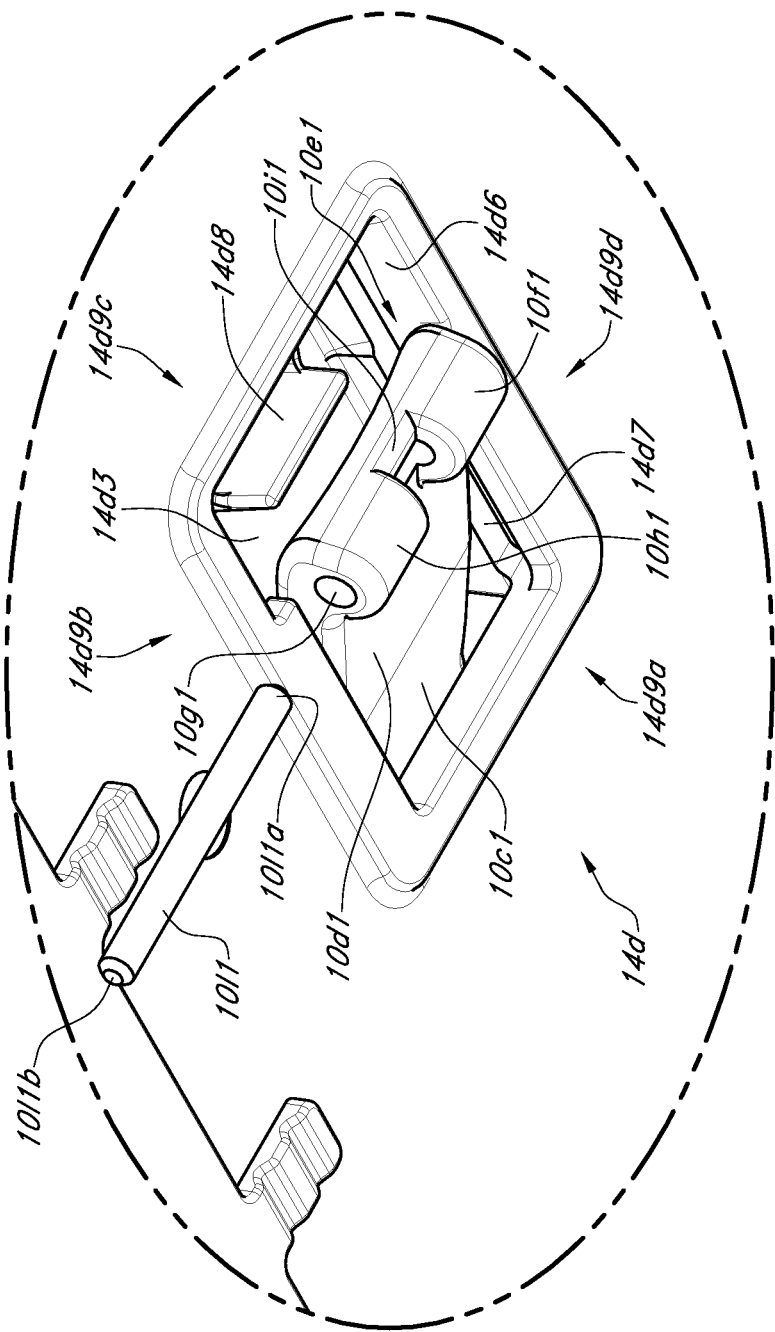
FIG. 42 is an enlarged perspective view of a dashed-circle portion of the tablet case assembly, hand strap, track pin, stop tab, pliers of FIG. 41 labeled "42" shown in FIG. 41.

Turning to FIG. 42, depicted therein is an enlarged perspective view of a dashed-circle portion of the tablet case assembly 12, hand strap 10, track pin 10/1*a*, stop tab as unflexed 14*d*8, pliers P1 of FIG. 41 labeled "42" shown in FIG. 41.

As shown by one or more of FIGS. 1-42, implementations can include a system for a tablet computing assembly 100, the system including (I) a tablet case assembly 12 including a first side wall 12*a*, a second side wall 12*b*, a third side wall 12*c*, a fourth side wall 12*d*, and a case front side 16, the case front side 16 including a first front surface portion 16*a*, wherein the first side wall 12*a*, the second side wall 12*b*, the third side wall 12*c*, the fourth side wall 12*d* extend perpendicularly to the first front surface portion 16*a* to at least in part receive the tablet computing assembly 100, (A) the tablet case assembly 12 including a case rear side 14, a first attachment assembly 14*c*, and a second attachment assembly 14*d*, the case rear side 14 including a first rear surface portion 14*a*, wherein the first attachment assembly 14*c*, and the second attachment assembly 14*d* extend outwardly away from the first rear surface portion 14*a*; and (II) a hand strap 10 including a first end portion 10*e*1, a second end portion 10*e*2, an exterior side 10*a*, and an interior side 10*b*, (A) the first end portion 10*e*1 of the hand strap 10 being adjustably and removably coupled to the second attachment assembly 14*d* of the tablet case assembly 12, and (B) the first end portion 10*e*1 of the hand strap 10 being adjustably and removably coupled to the second attachment assembly 14*d* of the tablet case assembly 12 and the second end portion 10*e*2 of the hand strap 10 being adjustably and removably coupled to first attachment assembly 14*c* of the tablet case assembly 12 to allow for at least one positional adjustment of the hand strap 10 relative to the first rear surface portion 14*a* of the case rear side 14 of the tablet case assembly 12, (1) at least a portion the exterior side 10*a* of the hand strap 10 facing in a first direction V1 away from the first rear surface portion 14*a* of the case rear side 14 of the tablet case assembly 12, (2) at least a portion of the interior side 10*b* of the hand strap 10 facing in a second direction V2 toward the first rear surface portion 14*a* of the case rear side 14 of the tablet case assembly 12, (3) the first direction V1 being opposite in direction of the second direction V2, (4) the at least one positional adjustment of the hand strap 10 relative to the first rear surface portion 14*a* of the case rear side 14 of the tablet case assembly 12 including (a) a first positional adjustment having a first gap distance G1 between the first rear surface portion 14*a* of the case rear side 14 of the tablet case assembly 12 and at least a portion of the interior side 10*b* of the hand strap 10, (b) a second positional adjustment having a second gap distance G2 between the first rear surface portion 14*a* of the case rear side 14 of the tablet case assembly 12 and at least a portion of the interior side 10*b* of the hand strap 10, (c) a third positional adjustment having a third gap distance G3 between the first rear surface portion 14*a* of the case rear side 14 of the tablet case assembly 12 and at least a portion of the interior side 10*b* of the hand strap 10, (d) the first gap distance G1 being smaller than the second gap distance G2, and (e) the second gap distance G2 being smaller than the third gap distance G3.

Implementations can include wherein the hand strap 10 includes a thickness dimension T along the first direction V1 and a width dimension W perpendicular to the first direction V1, the thickness dimension T being smaller than the width dimension W.

Implementations can include wherein the interior side 10*b* of the hand strap 10 includes a plurality of at least one ridge portion 10*j*1 and at least one flush portion 10*k*1, the plurality of at least one ridge portion 10*j*1 projecting from the at least one flush portion 10*k*1.

Implementations can include at least one track pin 10/1 including a first end portion 10/1*a* and second end portion 10/1*b* wherein the first end portion 10*e*1 of the hand strap 10 includes at least one protrusion 10*f*1 with at least one aperture portion 10*g*1 to receive the at least one track pin 10/1.

Implementations can include wherein the second attachment assembly 14*d* includes a first track groove 14*d*7 sized and shaped to couple with the first end portion 10/1*a* of the at least one track pin 10/1 and a second track groove 14*d*11 sized and shaped to couple with the first end portion 10/1*a* of the at least one track pin 10/1.

Implementations can include wherein the first end portion 10*e*1 of the hand strap 10 further includes at least one protrusion 10*h*1 and a gap 10*i*1, the gap 10*i*1 being positioned between the at least one protrusion 10*f*1 and the at least one protrusion 10*h*1 to allow for access to a mid-portion of the at least one track pin 10/1 being received by the at least one aperture portion 10*g*1 of the at least one protrusion 10*f*1 of the hand strap 10.

Implementations can include wherein the second attachment assembly 14*d* further includes a stop tab as unflexed 14*d*8, (A) the stop tab as unflexed 14*d*8 positioned to be in contact with the first end portion 10*e*1 of the hand strap 10 when the hand strap 10 is in the first positional adjustment, and (B) the stop tab as unflexed 14*d*8 positioned to be in non-contact with the first end portion 10*e*1 of the hand strap 10 when the hand strap 10 is in the second positional adjustment.

Implementations can include wherein the second attachment assembly 14*d* further includes a first receiving groove 14*d*6 and a second track groove 14*d*11, the first receiving groove 14*d*6 positioned non-parallel to and in communication with the first track groove 14*d*7, the first receiving groove 14*d*6 including a first receiving groove entry opening 14*d*6*a*, the second receiving groove 14*d*12 positioned non-parallel to and in communication with the second track groove 14*d*11, and the second receiving groove 14*d*12 including a second receiving groove entry opening 14*d*12*a*.

Implementations can include at least one track pin 10/1, the at least one track pin 10/1 including a first end portion 10/1*a* and second end portion 10/1*b*, the first end portion 10*e*1 of the hand strap 10 being coupled with the least one track pin 10/1, (A) the second attachment assembly 14*d* further including a stop tab as flexed 14*d*10 with a stop-tab-as-flexed end 14*d*10*a* when (1) the first end portion 10*e*1 of the hand strap 10 is in a first location in contact with the stop tab as unflexed 14*d*8, (2) the first end portion 10/1*a* of the track pin 10/1 is coupled with at least a portion of the first receiving groove 14*d*6 of the second attachment assembly 14*d*, and (3) the second end portion 10/1*b* of the track pin 10/1 is coupled with at least a portion of the second receiving groove 14*d*12 of the second attachment assembly 14*d*; and (B) the second attachment assembly 14*d* further including the stop tab as unflexed 14*d*8 with a stop-tab-as-unflexed end 14*d*8*a* when (1) the first end portion 10/1*a* of the track pin 10/1 is coupled with at least a portion of the first track groove 14*d*7 of the second attachment assembly 14*d*, and (2) the second end portion 10/1*b* of the track pin 10/1 is coupled with at least a portion of the second track groove 14*d*11 of the second attachment assembly 14*d*.

Implementations can include a first transition area 14*d*7*a*, the first transition area 14*d*7*a* including a restriction point 14*d*7*a*1, wherein (A) the first receiving groove 14*d*6 is positioned in communication with the first track groove 14*d*7 and the second receiving groove 14*d*12 is positioned in communication with the second track groove 14*d*11 through at least in part the first transition area 14*d*7*a*, and (B) the stop-tab-as-flexed end 14*d*10*a* of the stop tab as flexed 14*d*10 being distanced from the restriction point 14*d*7*a*1 a first distance and the stop-tab-as-unflexed end 14*d*8*a* of the stop tab as unflexed 14*d*8 being distanced from the restriction point 14*d*7*a*1 a second distance, the first distance being greater than the second distance.

Implementations can include wherein the stop tab as flexed 14*d*10 of the second attachment assembly 14*d* receives a first force imparted by the first end portion 10*e*1 of the hand strap 10, the first force being greater than a threshold force.

Implementations can include wherein the stop tab as unflexed 14*d*8 of the second attachment assembly 14*d* receives one of the following forces imparted by the first end portion 10*e*1 of the hand strap 10: a second force being smaller than the threshold force and a third force being zero.

Implementations can include wherein (A) when (1) the first end portion 10/1*a* of the track pin 10/1 is coupled with at least a portion of the first track groove 14*d*7 of the second attachment assembly 14*d*, and (2) the second end portion 10/1*b* of the track pin 10/1 is coupled with at least a portion of the second track groove 14*d*11 of the second attachment assembly 14*d*, and (3) the stop tab as unflexed 14*d*8 remains in an unflexed condition, (B) then (1) the first end portion 10/1*a* of the track pin 10/1 remains coupled with at least a portion of the first track groove 14*d*7 of the second attachment assembly 14*d*, and (2) the second end portion 10/1*b* of the track pin 10/1 remains coupled with at least a portion of the second track groove 14*d*11 of the second attachment assembly 14*d*.

Implementations can include wherein the second attachment assembly 14*d* further includes a first side wall 14*d*1 and a second side wall 14*d*2 parallel to and spaced apart from the first side wall 14*d*1, the first side wall 14*d*1 including the first receiving groove 14*d*6 and the first track groove 14*d*7, and the second side wall 14*d*2 including the second track groove 14*d*11 and the second receiving groove 14*d*12.

Implementations can include wherein the second attachment assembly 14*d* further includes a spanning member 14*d*3, the spanning member 14*d*3 coupled to the first side wall 14*d*1 and coupled to the second side wall 14*d*2.

Implementations can include wherein the stop tab as unflexed 14*d*8 is coupled to the spanning member 14*d*3 and the stop tab as flexed 14*d*10 is coupled to the spanning member 14*d*3.

Implementations can include wherein the first end portion 10*e*1 of the hand strap 10 being adjustably and removably coupled to the second attachment assembly 14*d* of the tablet case assembly 12 and the second end portion 10*e*2 of the hand strap 10 being adjustably and removably coupled to first attachment assembly 14*c* of the tablet case assembly 12 without disassembly of any portion of the tablet case assembly 12 from any other portion of the tablet case assembly 12.

Implementations can include wherein the hand strap 10 includes a first material and the tablet case assembly 12 includes a second material, the first material including at least one of the following: a thermoplastic elastomer material, a silicone material, and a thermoplastic polyurethane and the second material including at least plastic material of a hardness greater than the first material.

As shown by one or more of FIGS. 1-42, implementations can include a system for a tablet computing assembly 100, the system including (I) a tablet case assembly 12 including a first front surface portion 16*a*, the first front surface portion 16*a* configured to at least in part receive the tablet computing assembly 100 to be positioned in a parallel orientation with respect to a largest physical dimension of the tablet computing assembly 100, (A) the tablet case assembly 12 including a case rear side 14, the case rear side 14 including a first rear surface portion 14*a* oriented in parallel with the first front surface portion 16*a*; and (II) a hand strap 10 including a first end portion 10*e*1, (A) wherein the first end portion 10*e*1 of the hand strap 10 being adjustably coupled to the first rear surface portion 14*a* of the case rear side 14 of the tablet case assembly 12 to allow for at least one positional adjustment of the hand strap 10 relative to the first rear surface portion 14*a* of the case rear side 14 of the tablet case assembly 12, and (B) the first end portion 10*e*1 of the hand strap 10 being removably coupled to the first rear surface portion 14*a* of the case rear side 14 of the tablet case assembly 12.

As shown by one or more of FIGS. 1-42, implementations can include A system for a tablet computing assembly 100, the system can include (I) a tablet case assembly 12 including a case rear side 14 and a first front surface portion 16*a*, the first front surface portion 16*a* to at least in part receive the tablet computing assembly 100; (II) at least one track pin 10/1 adjustably coupled to the case rear side 14 of the tablet case assembly 12; and (III) a hand strap 10 coupled to the at least one track pin 10/1, (A) the hand strap 10 being adjustably coupled to the case rear side 14 of the tablet case assembly 12 via the at least one track pin 10/1 being adjustably coupled to the case rear side 14 of the tablet case assembly 12, (B) the hand strap 10 being adjustably coupled to the case rear side 14 of the tablet case assembly 12 to allow for at least one positional adjustment of the hand strap 10 relative to the first rear surface portion 14*a* of the case rear side 14 of the tablet case assembly 12, and (C) the hand strap 10 being removably coupled to the case rear side 14 of the tablet case assembly 12 without requirement of disassembly of any portions of the tablet case assembly 12.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for a tablet computing assembly, the system comprising:
   (I) a tablet case assembly including a first side wall, a second side wall, a third side wall, a fourth side wall, and a case front side, the case front side including a first front surface portion, wherein the first side wall, the second side wall, the third side wall, the fourth side wall extend perpendicularly to the first front surface portion to at least in part receive the tablet computing assembly,
       (A) the tablet case assembly including a case rear side, a first attachment assembly, and a second attachment assembly, the case rear side including a first rear surface portion, wherein the first attachment assembly, and the second attachment assembly extend outwardly away from the first rear surface portion; and
   (II) a hand strap including a first end portion, a second end portion, an exterior side, and an interior side,
       (A) the first end portion of the hand strap being adjustably and removably coupled to the second attachment assembly of the tablet case assembly, and
       (B) the first end portion of the hand strap being adjustably and removably coupled to the second attachment assembly of the tablet case assembly and the second end portion of the hand strap being adjustably and removably coupled to first attachment assembly of the tablet case assembly to allow for at least one positional adjustment of the hand strap relative to the first rear surface portion of the case rear side of the tablet case assembly,
           (1) at least a portion the exterior side of the hand strap facing in a first direction away from the first rear surface portion of the case rear side of the tablet case assembly,
           (2) at least a portion of the interior side of the hand strap facing in a second direction toward the first rear surface portion of the case rear side of the tablet case assembly,
           (3) the first direction being opposite in direction of the second direction,
           (4) the at least one positional adjustment of the hand strap relative to the first rear surface portion of the case rear side of the tablet case assembly including
               (a) a first positional adjustment having a first gap distance between the first rear surface portion of the case rear side of the tablet case assembly and at least a portion of the interior side of the hand strap,
               (b) a second positional adjustment having a second gap distance between the first rear surface portion of the case rear side of the tablet case assembly and at least a portion of the interior side of the hand strap,
               (c) a third positional adjustment having a third gap distance between the first rear surface portion of the case rear side of the tablet case assembly and at least a portion of the interior side of the hand strap,
               (d) the first gap distance being smaller than the second gap distance, and
               (e) the second gap distance being smaller than the third gap distance;
   further including at least one track pin including a first end portion and second end portion wherein the first end portion of the hand strap includes at least one protrusion with at least one aperture portion to receive the at least one track pin,
   wherein the second attachment assembly includes a first track groove sized and shaped to couple with the first end portion of the at least one track pin and a second track groove sized and shaped to couple with the first end portion of the at least one track pin.

2. A system for a tablet computing assembly, the system comprising:
   (I) a tablet case assembly including a first side wall, a second side wall, a third side wall, a fourth side wall, and a case front side, the case front side including a first front surface portion, wherein the first side wall, the second side wall, the third side wall, the fourth side wall extend perpendicularly to the first front surface portion to at least in part receive the tablet computing assembly,
- (A) the tablet case assembly including a case rear side, a first attachment assembly, and a second attachment assembly, the case rear side including a first rear surface portion, wherein the first attachment assembly, and the second attachment assembly extend outwardly away from the first rear surface portion; and (II) a hand strap including a first end portion, a second end portion, an exterior side, and an interior side,
- (A) the first end portion of the hand strap being adjustably and removably coupled to the second attachment assembly of the tablet case assembly, and
- (B) the first end portion of the hand strap being adjustably and removably coupled to the second attachment assembly of the tablet case assembly and the second end portion of the hand strap being adjustably and removably coupled to first attachment assembly of the tablet case assembly to allow for at least one positional adjustment of the hand strap relative to the first rear surface portion of the case rear side of the tablet case assembly,
  - (1) at least a portion the exterior side of the hand strap facing in a first direction away from the first rear surface portion of the case rear side of the tablet case assembly,
  - (2) at least a portion of the interior side of the hand strap facing in a second direction toward the first rear surface portion of the case rear side of the tablet case assembly,
  - (3) the first direction being opposite in direction of the second direction,
  - (4) the at least one positional adjustment of the hand strap relative to the first rear surface portion of the case rear side of the tablet case assembly including
    - (a) a first positional adjustment having a first gap distance between the first rear surface portion of the case rear side of the tablet case assembly and at least a portion of the interior side of the hand strap,
    - (b) a second positional adjustment having a second gap distance between the first rear surface portion of the case rear side of the tablet case assembly and at least a portion of the interior side of the hand strap,
    - (c) a third positional adjustment having a third gap distance between the first rear surface portion of the case rear side of the tablet case assembly and at least a portion of the interior side of the hand strap,
    - (d) the first gap distance being smaller than the second gap distance, and
    - (e) the second gap distance being smaller than the third gap distance;

further including at least one track pin including a first end portion and second end portion wherein the first end portion of the hand strap includes at least one protrusion with at least one aperture portion to receive the at least one track pin, wherein the first end portion of the hand strap further includes at least one protrusion and a gap, the gap being positioned between the at least one protrusion and the at least one protrusion to allow for access to a mid-portion of the at least one track pin being received by the at least one aperture portion of the at least one protrusion of the hand strap.

3. A system for a tablet computing assembly, the system comprising:
- (I) a tablet case assembly including a first side wall, a second side wall, a third side wall, a fourth side wall, and a case front side, the case front side including a first front surface portion, wherein the first side wall, the second side wall, the third side wall, the fourth side wall extend perpendicularly to the first front surface portion to at least in part receive the tablet computing assembly,
  - (A) the tablet case assembly including a case rear side, a first attachment assembly, and a second attachment assembly, the case rear side including a first rear surface portion, wherein the first attachment assembly, and the second attachment assembly extend outwardly away from the first rear surface portion; and
- (II) a hand strap including a first end portion, a second end portion, an exterior side, and an interior side,
  - (A) the first end portion of the hand strap being adjustably and removably coupled to the second attachment assembly of the tablet case assembly, and
  - (B) the first end portion of the hand strap being adjustably and removably coupled to the second attachment assembly of the tablet case assembly and the second end portion of the hand strap being adjustably and removably coupled to first attachment assembly of the tablet case assembly to allow for at least one positional adjustment of the hand strap relative to the first rear surface portion of the case rear side of the tablet case assembly,
    - (1) at least a portion the exterior side of the hand strap facing in a first direction away from the first rear surface portion of the case rear side of the tablet case assembly,
    - (2) at least a portion of the interior side of the hand strap facing in a second direction toward the first rear surface portion of the case rear side of the tablet case assembly,
    - (3) the first direction being opposite in direction of the second direction,
    - (4) the at least one positional adjustment of the hand strap relative to the first rear surface portion of the case rear side of the tablet case assembly including
      - (a) a first positional adjustment having a first gap distance between the first rear surface portion of the case rear side of the tablet case assembly and at least a portion of the interior side of the hand strap,
      - (b) a second positional adjustment having a second gap distance between the first rear surface portion of the case rear side of the tablet case assembly and at least a portion of the interior side of the hand strap,
      - (c) a third positional adjustment having a third gap distance between the first rear surface portion of the case rear side of the tablet case assembly and at least a portion of the interior side of the hand strap,
      - (d) the first gap distance being smaller than the second gap distance, and
      - (e) the second gap distance being smaller than the third gap distance wherein the second attachment assembly further includes a stop tab as unflexed, (A) the stop tab as unflexed positioned to be in contact with the first end portion of the hand strap when the hand strap is in the first positional adjustment, and (B) the stop tab as unflexed positioned to be in non-contact with the first end portion of the hand strap when the hand strap is in the second positional adjustment.

4. The system of claim 3 wherein the hand strap includes a thickness dimension along the first direction and a width dimension perpendicular to the first direction, the thickness dimension being smaller than the width dimension.

5. The system of claim 3 wherein the first end portion of the hand strap being adjustably and removably coupled to the second attachment assembly of the tablet case assembly and the second end portion of the hand strap being adjustably and removably coupled to first attachment assembly of the tablet case assembly without disassembly of any portion of the tablet case assembly from any other portion of the tablet case assembly.

6. A system for a tablet computing assembly, the system comprising:

(I) a tablet case assembly including a first side wall, a second side wall, a third side wall, a fourth side wall, and a case front side, the case front side including a first front surface portion, wherein the first side wall, the second side wall, the third side wall, the fourth side wall extend perpendicularly to the first front surface portion to at least in part receive the tablet computing assembly, (A) the tablet case assembly including a case rear side, a first attachment assembly, and a second attachment assembly, the case rear side including a first rear surface portion, wherein the first attachment assembly, and the second attachment assembly extend outwardly away from the first rear surface portion; and (II) a hand strap including a first end portion, a second end portion, an exterior side, and an interior side, (A) the first end portion of the hand strap being adjustably and removably coupled to the second attachment assembly of the tablet case assembly, and (B) the first end portion of the hand strap being adjustably and removably coupled to the second attachment assembly of the tablet case assembly and the second end portion of the hand strap being adjustably and removably coupled to first attachment assembly of the tablet case assembly to allow for at least one positional adjustment of the hand strap relative to the first rear surface portion of the case rear side of the tablet case assembly, (1) at least a portion the exterior side of the hand strap facing in a first direction away from the first rear surface portion of the case rear side of the tablet case assembly, (2) at least a portion of the interior side of the hand strap facing in a second direction toward the first rear surface portion of the case rear side of the tablet case assembly, (3) the first direction being opposite in direction of the second direction, (4) the at least one positional adjustment of the hand strap relative to the first rear surface portion of the case rear side of the tablet case assembly including (a) a first positional adjustment having a first gap distance between the first rear surface portion of the case rear side of the tablet case assembly and at least a portion of the interior side of the hand strap, (b) a second positional adjustment having a second gap distance between the first rear surface portion of the case rear side of the tablet case assembly and at least a portion of the interior side of the hand strap, (c) a third positional adjustment having a third gap distance between the first rear surface portion of the case rear side of the tablet case assembly and at least a portion of the interior side of the hand strap, (d) the first gap distance being smaller than the second gap distance, and (e) the second gap distance being smaller than the third gap distance, wherein the second attachment assembly further includes a first receiving groove and a second track groove, the first receiving groove positioned non-parallel to and in communication with the first track groove, the first receiving groove including a first receiving groove entry opening, the second receiving groove positioned non-parallel to and in communication with the second track groove, and the second receiving groove including a second receiving groove entry opening.

7. The system of claim 6 wherein the interior side of the hand strap includes a plurality of at least one ridge portion and at least one flush portion, the plurality of at least one ridge portion projecting from the at least one flush portion.

8. The system of claim 6 further including at least one track pin, the at least one track pin including a first end portion and second end portion, the first end portion of the hand strap being coupled with the least one track pin, (A) the second attachment assembly further including a stop tab as flexed with a stop-tab-as-flexed end when (1) the first end portion of the hand strap is in a first location in contact with the stop tab as unflexed, (2) the first end portion of the track pin is coupled with at least a portion of the first receiving groove of the second attachment assembly, and (3) the second end portion of the track pin is coupled with at least a portion of the second receiving groove of the second attachment assembly; and (B) the second attachment assembly further including the stop tab as unflexed with a stop-tab-as-unflexed end when (1) the first end portion of the track pin is coupled with at least a portion of the first track groove of the second attachment assembly, and (2) the second end portion of the track pin is coupled with at least a portion of the second track groove of the second attachment assembly.

9. The system of claim 8, the second attachment assembly further including a first transition area, the first transition area including a restriction point, wherein (A) the first receiving groove is positioned in communication with the first track groove and the second receiving groove is positioned in communication with the second track groove through at least in part the first transition area, and (B) the stop-tab-as-flexed end of the stop tab as flexed being distanced from the restriction point a first distance and the stop-tab-as-unflexed end of the stop tab as unflexed being distanced from the restriction point a second distance, the first distance being greater than the second distance.

10. The system of claim 8, wherein the stop tab as flexed of the second attachment assembly receives a first force imparted by the first end portion of the hand strap, the first force being greater than a threshold force.

11. The system of claim 10 wherein the stop tab as unflexed of the second attachment assembly receives one of the following forces imparted by the first end portion of the hand strap: a second force being smaller than the threshold force and a third force being zero.

12. The system of claim 11 wherein
   (A) when
      (1) the first end portion of the track pin is coupled with at least a portion of the first track groove of the second attachment assembly, and
      (2) the second end portion of the track pin is coupled with at least a portion of the second track groove of the second attachment assembly, and
      (3) the stop tab as unflexed remains in an unflexed condition,
   (B) then
      (1) the first end portion of the track pin remains coupled with at least a portion of the first track groove of the second attachment assembly, and
      (2) the second end portion of the track pin remains coupled with at least a portion of the second track groove of the second attachment assembly.

13. A system for a tablet computing assembly, the system comprising:
   (I) a tablet case assembly including a first side wall, a second side wall, a third side wall, a fourth side wall, and a case front side, the case front side including a first front surface portion, wherein the first side wall, the second side wall, the third side wall, the fourth side wall extend perpendicularly to the first front surface portion to at least in part receive the tablet computing assembly,
      (A) the tablet case assembly including a case rear side, a first attachment assembly, and a second attachment assembly, the case rear side including a first rear surface portion, wherein the first attachment assembly, and the second attachment assembly extend outwardly away from the first rear surface portion; and
   (II) a hand strap including a first end portion, a second end portion, an exterior side, and an interior side,
      (A) the first end portion of the hand strap being adjustably and removably coupled to the second attachment assembly of the tablet case assembly, and
      (B) the first end portion of the hand strap being adjustably and removably coupled to the second attachment assembly of the tablet case assembly and the second end portion of the hand strap being adjustably and removably coupled to first attachment assembly of the tablet case assembly to allow for at least one positional adjustment of the hand strap relative to the first rear surface portion of the case rear side of the tablet case assembly,
         (1) at least a portion the exterior side of the hand strap facing in a first direction away from the first rear surface portion of the case rear side of the tablet case assembly,
         (2) at least a portion of the interior side of the hand strap facing in a second direction toward the first rear surface portion of the case rear side of the tablet case assembly,
         (3) the first direction being opposite in direction of the second direction,
         (4) the at least one positional adjustment of the hand strap relative to the first rear surface portion of the case rear side of the tablet case assembly including
            (a) a first positional adjustment having a first gap distance between the first rear surface portion of the case rear side of the tablet case assembly and at least a portion of the interior side of the hand strap,
            (b) a second positional adjustment having a second gap distance between the first rear surface portion of the case rear side of the tablet case assembly and at least a portion of the interior side of the hand strap,
            (c) a third positional adjustment having a third gap distance between the first rear surface portion of the case rear side of the tablet case assembly and at least a portion of the interior side of the hand strap,
            (d) the first gap distance being smaller than the second gap distance, and
            (e) the second gap distance being smaller than the third gap distance
   wherein the second attachment assembly further includes a first side wall and a second side wall parallel to and spaced apart from the first side wall, the first side wall including the first receiving groove and the first track groove, and the second side wall including the second track groove and the second receiving groove.

14. The system of claim 13 wherein the second attachment assembly further includes a spanning member, the spanning member coupled to the first side wall and coupled to the second side wall.

15. The system of claim 14 wherein the stop tab as unflexed is coupled to the spanning member and the stop tab as flexed is coupled to the spanning member.

16. The system of claim 13 wherein the hand strap includes a first material and the tablet case assembly includes a second material, the first material including at least one of the following: a thermoplastic elastomer material, a silicone material, and a thermoplastic polyurethane and the second material including at least plastic material of a hardness greater than the first material.

* * * * *